United States Patent
Kim et al.

(10) Patent No.: US 11,700,649 B2
(45) Date of Patent: Jul. 11, 2023

(54) METHOD AND APPARATUS FOR SUPPORTING NETWORK CONNECTION OF TERMINAL IN NEXT GENERATION MOBILE COMMUNICATION SYSTEM

(71) Applicant: Samsung Electronics Co., Ltd., Suwon-si (KR)

(72) Inventors: Donggun Kim, Suwon-si (KR); Soenghun Kim, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 16/407,646

(22) Filed: May 9, 2019

(65) Prior Publication Data

US 2019/0350015 A1    Nov. 14, 2019

(30) Foreign Application Priority Data

May 10, 2018 (KR) .................. 10-2018-0053520
Jun. 1, 2018 (KR) .................. 10-2018-0063771

(51) Int. Cl.
*H04W 76/10* (2018.01)
*H04W 76/11* (2018.01)
(Continued)

(52) U.S. Cl.
CPC ............ *H04W 76/10* (2018.02); *H04W 8/26* (2013.01); *H04W 76/11* (2018.02); *H04W 84/042* (2013.01)

(58) Field of Classification Search
CPC ............................ H04W 76/10; H04W 84/042
See application file for complete search history.

(56) References Cited

U.S. PATENT DOCUMENTS

2015/0036589 A1* 2/2015 Piercy ................ H04W 8/18
370/328
2016/0338116 A1* 11/2016 Bergstrom ............ H04W 8/24
(Continued)

FOREIGN PATENT DOCUMENTS

KR    10-2016-0132368 A    11/2016
KR    10-2018-0106506 A    10/2018
(Continued)

OTHER PUBLICATIONS

3GPP, "3GPP TS 23.003 V15.3.0 3rd Generation Partnership Project; Technical Specification Group Core Network and Terminals; Numbering, addressing and identification", Mar. 2018, 3GPP. (Year: 2018).*
Ericsson, "Impact from 48 bit 5G-S-TMSI (LTE and NR)", Apr. 16-20, 2018, 3GPP, R2-1804858. (Year: 2018).*
(Continued)

*Primary Examiner* — Peter P Chau
(74) *Attorney, Agent, or Firm* — Jefferson IP Law, LLP

(57) ABSTRACT

A communication scheme and a system thereof for converging an internet of things (IoT) technology and a fifth generation (5G) communication system for supporting a high data transmission rate beyond that of a fourth generation (4G) system are provided. The disclosure may be applied to a smart service (e.g., a smart home, a smart building, a smart city, a smart car or connected car, healthcare, digital education, retail business, a security and security related service, or the like) based on a 5G communication technology and an IoT related technology. The disclosure relates to a method and an apparatus for supporting a terminal to set up connection to a network in a next generation mobile communication system.

13 Claims, 25 Drawing Sheets

(51) Int. Cl.
*H04W 8/26* (2009.01)
*H04W 84/04* (2009.01)

(56) References Cited

U.S. PATENT DOCUMENTS

| | | |
|---|---|---|
| 2017/0019930 A1 | 1/2017 | Lee et al. |
| 2018/0227871 A1* | 8/2018 | Singh .................... H04W 60/00 |
| 2018/0295497 A1 | 10/2018 | Kim et al. |
| 2019/0037629 A1 | 1/2019 | Ryu et al. |
| 2019/0045573 A1* | 2/2019 | Schliwa-Bertling ........................ H04W 76/11 |
| 2019/0053175 A1* | 2/2019 | Kubota ................. H04W 16/14 |
| 2019/0110243 A1* | 4/2019 | Chun .................... H04W 76/10 |
| 2019/0141776 A1 | 5/2019 | Kim et al. |
| 2019/0150221 A1 | 5/2019 | Tseng et al. |
| 2019/0306764 A1 | 10/2019 | Da Silva et al. |
| 2019/0335523 A1 | 10/2019 | Wu |
| 2019/0350002 A1 | 11/2019 | Chen et al. |
| 2020/0120477 A1* | 4/2020 | Mildh ................... H04W 60/04 |
| 2020/0359260 A1 | 11/2020 | Gao et al. |
| 2020/0374924 A1 | 11/2020 | Liu et al. |
| 2021/0022200 A1* | 1/2021 | Mildh ................... H04W 76/38 |
| 2021/0044964 A1* | 2/2021 | Lindheimer ............ H04W 8/26 |
| 2021/0067945 A1 | 3/2021 | Liu et al. |
| 2021/0127445 A1* | 4/2021 | da Silva ................ H04W 76/30 |
| 2021/0219355 A1* | 7/2021 | Lindheimer .......... H04W 76/11 |

FOREIGN PATENT DOCUMENTS

| | | | |
|---|---|---|---|
| WO | 2017/052335 A1 | 3/2017 | |
| WO | WO-2017052335 A1 * | 3/2017 | .............. H04W 8/08 |
| WO | 2017/126922 A1 | 7/2017 | |
| WO | WO-2017126922 A1 * | 7/2017 | ............. H04W 76/19 |
| WO | 2017/188758 A1 | 11/2017 | |
| WO | WO-2017188758 A1 * | 11/2017 | ............. H04W 76/20 |
| WO | 2019/193562 A1 | 10/2019 | |

OTHER PUBLICATIONS

Vivo, "Discussion on the larger space of 5G-S-TMSI in eLTE", Apr. 20, 2018, 3GPP, R2-1804888. (Year: 2018).*
Huawei and HiSilicon, "Discussion on the size of 5G-S-TMSI", Apr. 16-20, 2018, 3GPP, R2-1805577. (Year: 2018).*
Ericsson, "Offline discussion report on [101#10][LTE/5GC] 5G-S-TMSI size in LTE connected to 5GC", Apr. 16-20, 2018, 3GPP, R2-1806475. (Year: 2018).*
Ericsson, Impact from 48bit 5G-S-TMSI (LTE and NR), 3GPP TSG RAN WG2 Meeting #101 bis, R2-1804858, Sanya, P.R. of China, Apr. 6, 2018.
Vivo, Remaining FFS issues on MSG3/4/5 content for NR RRC connection control, 3GPP TSG RAN WG2 Meeting #101 bis, R2-1804598, Sanya, China, Apr. 6, 2018.
International Search Report dated Aug. 13, 2019, issued in the International Application No. PCT/KR2019/005560.
Korean Office Action dated Oct. 18, 2019, issued in the Korean Application No. 10-2018-0063771.
ZTE et al: "Consideration on extending the code space for 5G-STMSI", 3GPP Draft; R2-1804461, 3rd Generation Partnership Project (3GPP), Mobile Competence Centre; 650, Route Des Lucioles ; F-06921 Sophia-Antipolis, vol. RAN WG2, No. Sanya, China; Apr. 16, 2018-2018042, Apr. 5, 2018.
European Search Report dated Apr. 26, 2021, issued in European Application No. 19800193.5.
Indian Office Action dated Sep. 2, 2022, issued in Indian Application No. 202037047801.
"3rd Generation Partnership Project; TechnicalSpecification GroupRadio Access Network; Evolved Universal Terrestrial Radio Access (E-UTRA) and Evolved Universal Terrestrial Radio Access Network(E-UTRAN); Overall description; Stage 2 (Release 15)", 3GPP TS 36.300, 3GPP MobileCompetence Centre; 650, Route Des Lucioles; F-06921Sophia-Antipolis Cedex; France, vol. RAN WG2, No. V15.1.0, Apr. 3, 2018.
European Search Report dated Jan. 30, 2023, issued in European Application No. 19 800 193.5.

* cited by examiner

METHOD AND APPARATUS FOR SUPPORTING NETWORK CONNECTION OF TERMINAL IN NEXT GENERATION MOBILE COMMUNICATION SYSTEM

CROSS-REFERENCE TO RELATED APPLICATION(S)

This application is based on and claims priority under 35 U.S.C. § 119(a) of a Korean patent application number 10-2018-0053520, filed on May 10, 2018, in the Korean Intellectual Property Office, and of a Korean patent application number 10-2018-0063771, filed on Jun. 1, 2018, in the Korean Intellectual Property Office, the disclosure of each of which is incorporated by reference herein in its entirety.

BACKGROUND

1. Field

The disclosure relates to a method and an apparatus for supporting a terminal to set up connection to a network in a next generation mobile communication system. More particularly, the disclosure relates to a method and an apparatus for supporting contention resolution when a terminal desires to set up connection to a network in a next generation mobile communication system.

2. Description of Related Art

In order to meet wireless data traffic demands that have increased since the commercialization of the fourth generation (4G) communication system, efforts to develop an improved fifth generation (5G) communication system or a pre-5G communication system have been made. For this reason, the 5G communication system or the pre-5G communication system is called a beyond 4G network communication system or a post long term evolution (LTE) system.

In order to achieve a high data transmission rate, implementation of the 5G communication system in an ultrahigh frequency millimeter wave (mmWave) band (e.g., 60 GHz band) is being considered. In association with the 5G communication system, technologies, such as beamforming, massive multiple input multiple output (MIMO), full dimensional MIMO (FD-MIMO), array antenna, analog beamforming, and large scale antenna are being discussed as means to mitigate a propagation path loss in the ultrahigh frequency band and increase a propagation transmission distance.

Further, in association with the 5G communication system, technologies, such as an evolved small cell, an advanced small cell, a cloud radio access network (RAN), an ultra-dense network, device to device communication (D2D), a wireless backhaul, a moving network, cooperative communication, coordinated multi-points (CoMP), and received interference cancellation have been developed, in order to improve the system network. In addition, in association with the 5G system, advanced coding modulation (ACM) schemes, such as hybrid frequency shift keying (FSK) and quadrature amplitude modulation (QAM) modulation (FQAM) and sliding window superposition coding (SWSC), and advanced access technologies, such as filter bank multi carrier (FBMC), non-orthogonal multiple access (NOMA), and sparse code multiple access (SCMA) have been developed.

In the 5G system, supporting various services, compared to the existing 4G system, are being considered. For example, representative services may include an enhanced mobile broad band (eMBB) communication service, an ultra-reliable and low latency communication (URLLC) service, a massive machine type communication (mMTC) service, an evolved multimedia broadcast/multicast service (eMBMS), and the like. A system that provides the URLLC service may be referred to as a URLLC system, and a system that provides the eMBB service may be referred to as an eMBB system, or the like. In addition, the terms "service" and "system" may be interchangeably used.

The URLLC service is a service that the 5G system newly considers to provide, unlike the 4G system of the related art. Compared to other services, the URLLC service requires ultra-high reliability (e.g., a packet error rate of approximately $10^{-5}$) and a low latency (e.g., approximately 0.5 msec). To satisfy the strict requirements, the URLLC service may need to apply a transmission time interval (TTI) shorter than that of the eMBB service, and various operation schemes using the same are being considered.

Meanwhile, the Internet has been evolved from a human-oriented connection network in which humans generate and consume information to an internet of things (IoT) network in which distributed components, such as objects exchange and process information. An internet of everything (IoE) technology in which a big data processing technology via a connection with a cloud server or the like is combined with the IoT technology has emerged. In order to implement IoT, technical factors, such as sensing technology, wired/wireless communication, network infrastructure, service-interface technology, and security technology are required, and research on technologies, such as a sensor network, machine-to-machine (M2M) communication, machine-type communication (MTC), and the like for connection between objects has recently been conducted. In an IoT environment, via collection and analysis of data generated from connected objects, an intelligent internet technology (IT) service to create new value for peoples' lives may be provided. The IoT may be applied to fields, such as a smart home, a smart building, a smart city, a smart car or connected car, a smart grid, health care, a smart home appliance, or high-tech medical services, via the convergence of the information technology (IT) of the related art and various industries.

Accordingly, various attempts to apply the 5G communication to the IoT network are made. For example, technologies, such as a sensor network, M2M, and MTC are implemented by beamforming, MIMO, and array antenna schemes. The application of a cloud RAN as the big data processing technology may be an example of convergence of the 5G technology and the IoT technology.

The above information is presented as background information only to assist with an understanding of the disclosure. No determination has been made, and no assertion is made, as to whether any of the above might be applicable as prior art with regard to the disclosure.

SUMMARY

In a next generation mobile communication system, a large number of devices in addition to cell phones, narrow-band IoT (NB-IoT) devices, and sensors, may set up connection to a network. Therefore, in order to manage the large number of wireless communication devices, the next generation mobile communication system may need to introduce a new identifier having a larger length, and may need to allocate different identifiers to the wireless communication devices, so as to manage the wireless communication devices. However, when a new identifier having a larger length is used, there is a desire for a method that enables wireless communication devices which are assigned with new identifiers and wireless communication devices which are assigned with normal identifiers to separately connect to a network.

In addition, a plurality of wireless communication devices may connect to the network at the same time, and thus, there is a desire for a method of effectively performing contention resolution.

The technical subjects pursued in the disclosure may not be limited to the above mentioned technical subjects, and other technical subjects which are not mentioned may be clearly understood, via the following descriptions, by those skilled in the art of the disclosure.

Aspects of the disclosure are to address at least the above-mentioned problems and/or disadvantages and to provide at least the advantages described below. Accordingly, an aspect of the disclosure is to provide a method and an apparatus for supporting contention resolution when a terminal desires to set up connection to a network in a next generation mobile communication system.

Additional aspects will be set forth in part in the description which follows and, in part, will be apparent from the description, or may be learned by practice of the presented embodiments.

In accordance with an aspect of the disclosure, a method of a terminal in a wireless communication system is provided. The method comprises transmitting, to a base station, a first message for requesting radio resource control (RRC) connection establishment including a first part of a first identifier, in case that the first identifier has been assigned to the terminal; receiving, from the base station, a second message for the RRC connection establishment in response to the first message; and transmitting, to the base station, a third message for confirming the RRC connection establishment including a second part of the first identifier in response to the second message, wherein the first identifier identifies the terminal.

In an embodiment of the disclosure, the first part of the first identifier is a first number of predetermined rightmost bits of the first identifier, and the second part of the first identifier is a second predetermined leftmost bits of the first identifier.

In an embodiment of the disclosure, the first identifier is included in a second identifier assigned to the terminal, the second identifier is a 5G globally unique temporary identifier (5G-GUTI) and the first identifier is 5G S-temporary mobile subscription identifier (5G-S-TMSI), and the 5G-GUTI has been assigned upon a successful registration of the terminal.

In an embodiment of the disclosure, the first message is transmitted on a common control channel (CCCH).

In an embodiment of the disclosure, the first message includes a random value, in case that the first identifier is not assigned to the terminal.

In accordance with another aspect of the disclosure, a method of a base station in a wireless communication system is provided. The method comprises receiving, from a terminal, a first message for requesting radio resource control (RRC) connection establishment including a first part of a first identifier, in case that the first identifier has been assigned to the terminal; transmitting, to the terminal, a second message for the RRC connection establishment in response to the first message; and receiving, from the terminal, a third message for confirming the RRC connection establishment including a second part of the first identifier in response to the second message, wherein the first identifier identifies the terminal.

In an embodiment of the disclosure, the first part of the first identifier is a first number of predetermined rightmost bits of the first identifier, and the second part of the first identifier is a second predetermined leftmost bits of the first identifier.

In an embodiment of the disclosure, the first identifier is included in a second identifier assigned to the terminal, the second identifier is a 5G 5G-GUTI and the first identifier is 5G S-temporary mobile subscription identifier (5G-S-TMSI), and wherein the 5G-GUTI has been assigned upon a successful registration of the terminal.

In an embodiment of the disclosure, the first message is transmitted on a common control channel (CCCH).

In an embodiment of the disclosure, the first message includes a random value, in case that the first identifier is not assigned to the terminal.

In accordance with another aspect of the disclosure, a terminal in a wireless communication system is provided. The terminal comprises a transceiver; and a controller configured to control the transceiver to transmit, to a base station, a first message for requesting radio resource control (RRC) connection establishment including a first part of a first identifier, in case that the first identifier has been assigned to the terminal, control the transceiver to receive, from the base station, a second message for the RRC connection establishment in response to the first message, and control the transceiver to transmit, to the base station, a third message for confirming the RRC connection establishment including a second part of the first identifier in response to the second message, wherein the first identifier identifies the terminal.

In accordance with another aspect of the disclosure, a base station in a wireless communication system is provided. The base station comprises a transceiver; and a controller configured to: control the transceiver to receive, from a terminal, a first message for requesting radio resource control (RRC) connection establishment including a first part of a first identifier, in case that the first identifier has been assigned to the terminal, control the transceiver to transmit, to the terminal, a second message for the RRC connection establishment in response to the first message, and control the transceiver to receive, from the terminal, a third message for confirming the RRC connection establishment including a second part of the first identifier in response to the second message, wherein the first identifier identifies the terminal.

According to an embodiment of the disclosure, if a wireless communication system (i.e., a long term evolution (LTE) system) allocates normal identifiers to different terminals, and a next generation mobile communication system allocates new identifiers to different terminals, whether a base station or a cell to which each terminal desires to connect is connected to the LTE system or the next generation mobile communication system is determined based on system information, when the corresponding terminal connects to a network. If the base station or cell is connected to the LTE system, a connection procedure and RRC message information appropriate therefor may be proposed. Based on the system information, if it is determined that the base station or cell is connected to the next generation mobile communication system, a connection procedure and RRC message information appropriate therefor may be proposed.

In the next generation mobile communication system, since a larger number of wireless communication devices are supported, contention and collision may easily occur when a plurality of wireless communication devices in an RRC idle mode or RRC inactive mode attempt connection. Therefore, there is a desire for a method of effectively performing contention resolution.

A terminal may determine whether a base station or a cell to which the terminal desires to connect is connected to an LTE system or a next generation mobile communication system, when the terminal connects to a network. If the base station or cell is connected to the LTE system, a connection procedure and RRC message information appropriate therefor may be proposed. If it is determined that the base station or cell is connected to the next generation mobile communication system, based on the system information, a connection procedure and RRC message information appropriate therefor may be proposed. Accordingly, the terminal may effectively connect to the LTE system and the next generation mobile communication system.

In addition, the disclosure provides a method in which a terminal, which is registered with a fifth generation (5G) core network (5G CN) of the next generation mobile communication system, performs a connection procedure when attempting connection to the network again, and provides a method of performing a connection procedure when the terminal attempts reconnection to the network in an RRC inactive mode. In addition, the disclosure provides a contention resolution method such that a terminal can avoid contention and collision that may occur when a plurality of terminals in an RRC idle mode or RRC inactive mode attempt connection.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which.

Throughout the drawings, like reference numerals will be understood to refer to like parts, components, and structures.

DETAILED DESCRIPTION

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

In describing the disclosure below, a detailed description of related known configurations or functions incorporated herein will be omitted when it is determined that the detailed description thereof may unnecessarily obscure the subject matter of the disclosure. Hereinafter, embodiments of the disclosure will be described with reference to the accompanying drawings.

In the descriptions below, a term used for identifying an access node, terms indicating network entities, terms indicating messages, a term indicating an interface between network entities, terms indicating various pieces of identification information, and the like are used for ease of description. Therefore, the disclosure may not be limited by the terminologies provided below, and other terms that indicate subjects having equivalent technical meanings may be used.

For ease of description, the disclosure uses terms and names defined in the 3rd generation partnership project long term evolution (3GPP LTE). However, the disclosure is not limited to the terms and the names, and may be equally applied to systems that comply with other standards. For ease of description, an evolved nodeB (eNB) and a "gNB" may be interchangeably used in the disclosure. That is, a base station that is described as an eNB may indicate a gNB. In addition, the term "terminal" may indicate cell phones, narrowband IoT (NB-IoT) devices, sensors, and other wireless communication devices.

Embodiment A

Figure 1A:
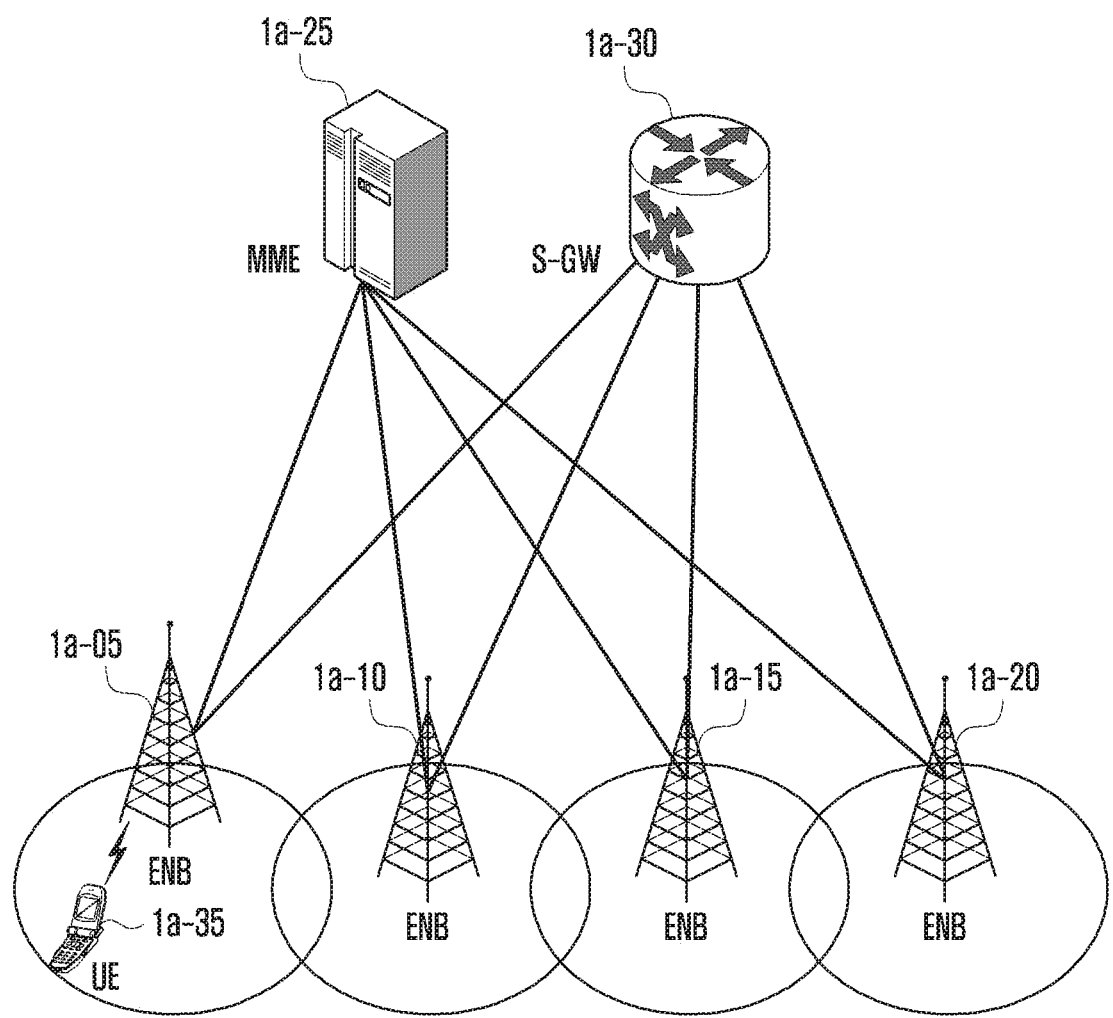
FIG. 1A is a diagram illustrating a structure of a long term evolution (LTE) system according to various embodiments of the disclosure.

FIG. 1A is a diagram illustrating a structure of a long term evolution (LTE) system to according to various embodiments of the disclosure.

Referring to FIG. 1A, as illustrated in the drawings, a radio access network of an LTE system is configured with next generation base stations (an evolved node B (ENB), a Node B, or a base station) 1a-05, 1a-10, 1a-15, and 1a-20, a mobility management entity (MME) 1a-25, and a serving-gateway (S-GW) 1a-30. A user equipment (UE) (or a terminal) 1a-35 may access an external network via the ENB 1a-05 to a-20, and the S-GW 1a-30.

In FIG. 1A, the ENB 1a-05 to 1a-20 may correspond to a legacy node B in a universal mobile telecommunications system (UMTS) system. The ENB is connected to the UE 1a-35 via a wireless channel, and performs a more complicated role than the legacy node B. In the LTE system, real-time services, such as a voice over IP (VoIP) via an Internet protocol, and all user traffic may be provided via a shared channel. Accordingly, there is a desire for a device that performs scheduling by collecting state information of user equipment (UEs), such as a buffer state, an available transmission power state, a channel state, and the like, and the ENB 1a-05 to 1a-20 may be in charge of scheduling. One ENB generally controls a plurality of cells. In order to implement a transmission rate of 100 Mbps, the LTE system uses an orthogonal frequency division multiplexing (OFDM) as a wireless access technology in a bandwidth of 20 MHz. In addition, an adaptive modulation & coding (AMC) scheme that determines a modulation scheme and a channel coding rate may be applied based on the channel state of a UE. The S-GW 1a-30 is a device for providing a data bearer, and generates or removes a data bearer under the control of the MME 1a-25. The MME is a device that is in charge of various control functions in addition to a mobility management function associated with a UE, and may be connected to a plurality of base stations.

Figure 1B:
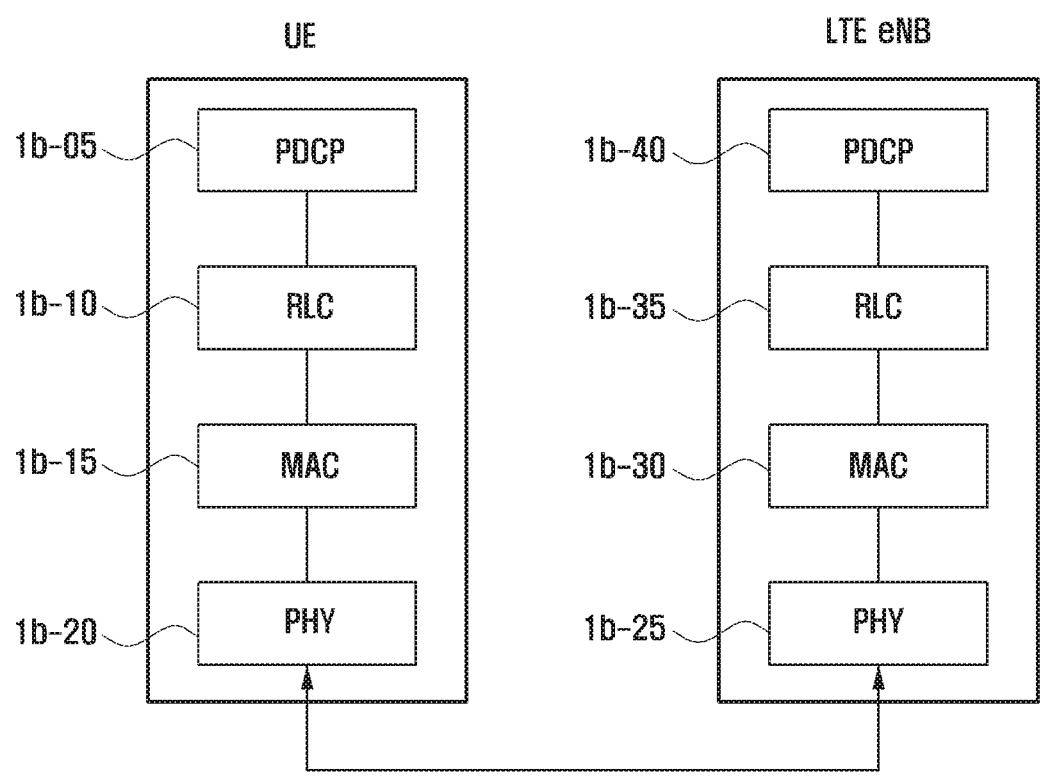
FIG. 1B is a diagram illustrating a structure of a radio protocol in an LTE system according to various embodiments of the disclosure.

FIG. 1B is a diagram illustrating a structure of a radio protocol in an LTE system according to various embodiments of the disclosure.

Referring to FIG. 1B, the radio protocol of the LTE system includes a packet data convergence protocol (PDCP) 1b-05 and 1b-40, a radio link control (RLC) 1b-10 and 1b-35, a medium access control (MAC) 1b-15 and 1b-30, and a physical layer (PHY) 1b-20 and 1b-25 for each of a UE and an ENB. The PDCP 1b-05 and 1b-40 may take charge of IP header compression/decompression, or the like. The main functions of the PDCP may be summarized as follows:

Header compression and decompression: robust header compression (ROHC) only

Transfer of user data

In-sequence delivery (in-sequence delivery of upper layer packet data units (PDUs) at PDCP re-establishment procedure for radio link control acknowledged mode (RLC AM))

Reordering (for split bearers in DC (only support for RLC AM): PDCP PDU routing for transmission and PDCP PDU reordering for reception)

Duplicate detection (duplicate detection of lower layer service data units (SDUs) at PDCP re-establishment procedure for RLC AM)

Retransmission (retransmission of PDCP SDUs at handover and, for split bearers in DC, of PDCP PDUs at PDCP data-recovery procedure, for RLC AM)

Ciphering and deciphering

Timer-based SDU discard (timer-based SDU discard in uplink)

The RLC 1b-10 and 1b-35 may reconfigure a PDCP PDU into an appropriate size, and perform ARQ or the like. The main functions of an RLC may be summarized as follows:

Transfer of data (transfer of upper layer PDUs)

Automatic repeat query (ARQ) (error correction through ARQ (only for AM data transfer))

Concatenation, segmentation, and reassembly (concatenation, segmentation and reassembly of RLC SDUs (only for un-acknowledge mode (UM) and AM data transfer))

Re-segmentation (re-segmentation of RLC data PDUs (only for AM data transfer))

Reordering (reordering of RLC data PDUs (only for UM and AM data transfer)

Duplicate detection (duplicate detection (only for UM and AM data transfer))

Error detection (protocol error detection (only for AM data transfer))

RLC SDU discard (RLC SDU discard (only for UM and AM data transfer))

RLC re-establishment

The MAC 1b-15 and 1b-30 may be connected to various RLC layer devices configured for one UE, and may perform multiplexing of RLC PDUs to a MAC PDU and demultiplexing of RLC PDUs from a MAC PDU. The main functions of the MAC may be summarized as follows:

Mapping (mapping between logical channels and transport channels)

Multiplexing and demultiplexing (multiplexing/demultiplexing of MAC SDUs belonging to one or different logical channels into/from transport blocks (TB) delivered to/from the physical layer on transport channels)

Scheduling information reporting

Hybrid automatic repeat request (HARQ) (error correction through HARQ)

Priority handling between logical channels (priority handling between logical channels of one UE)

Priority handling between UEs (priority handling between UEs by means of dynamic scheduling)

multimedia broadcast/multicast service (MBMS) service identification

Transport format selection

Padding

The physical (PHY) layer 1b-20 and 1b-25 may perform an operation of channel-coding and modulating higher layer data to produce an OFDM symbol and transmitting the OFDM symbol to a wireless channel, or demodulating and channel-decoding an OFDM symbol received via a wireless channel and transmitting the demodulated and channel-decoded OFDM symbol to a higher layer.

Figure 1C:
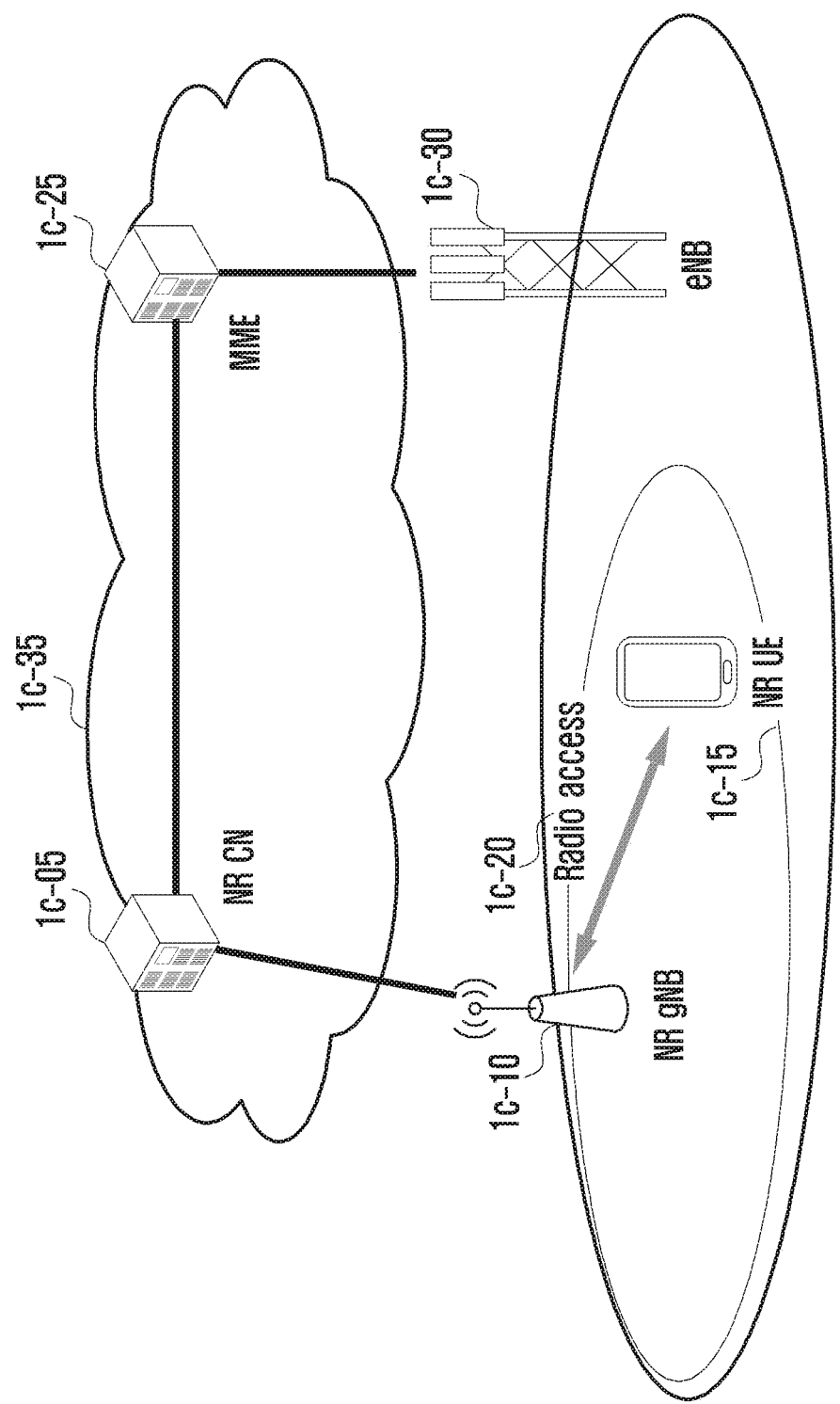
FIG. 1C is a diagram illustrating a structure of a next generation mobile communication system according to various embodiments of the disclosure.

FIG. 1C is a diagram illustrating a structure of a next generation mobile communication system according to various embodiments of the disclosure.

Referring to FIG. 1C, as illustrated in the drawing, a radio access network of the next generation mobile communication system (hereinafter NR or 2g) may be configured with a next generation base station (new radio node B (NR gNB or NR base station) 1c-10 and a new radio core network (NR CN) 1c-05. A user equipment (new radio user equipment (NR UE) or terminal) 1c-15 may access an external network 1c-35 via the NR gNB 1c-10 and the NR CN 1c-05.

In FIG. 1C, the NR gNB 1c-10 may correspond to an evolved Node B (eNB) in the legacy LTE system. The NR gNB is connected to the NR UE 1c-15 via a wireless channel, and may provide a better service compared to the legacy nodeB. In the next generation mobile communication system, all user traffics are serviced via a shared channel and thus, a device that collects state information of UEs, such as a buffer status, an available transmission power status, a channel status or the like, and performs scheduling is needed, and the NR NB 1c-10 takes charge of the same. One NR gNB generally controls a plurality of cells. In order to implement high-speed data transmission when compared to the currently used LTE, a bandwidth greater than or equal to the legacy maximum bandwidth may be needed, and an orthogonal frequency division multiplexing (OFDM) is used as a radio access technology, and beamforming technology is additionally used. Also, an adaptive modulation & coding (AMC) scheme that determines a modulation scheme and a channel coding rate may be applied based on the channel state of a UE. The NR CN 1c-05 may support mobility, configures a bearer, or configures quality of service (QoS) .The NR CN 1c-05 is a device that is in charge of various control functions in addition to a mobility management function associated with the UE 1c-15, and may be connected to a plurality of base stations. Also, the next generation mobile communication system may interoperate with the legacy LTE system, and the NR CN 1c-05 may be connected to the MME 1c-25 via a network interface. The MME 1c-25 may be connected to the eNB 1c-30 which is a legacy base station.

Figure 1D:
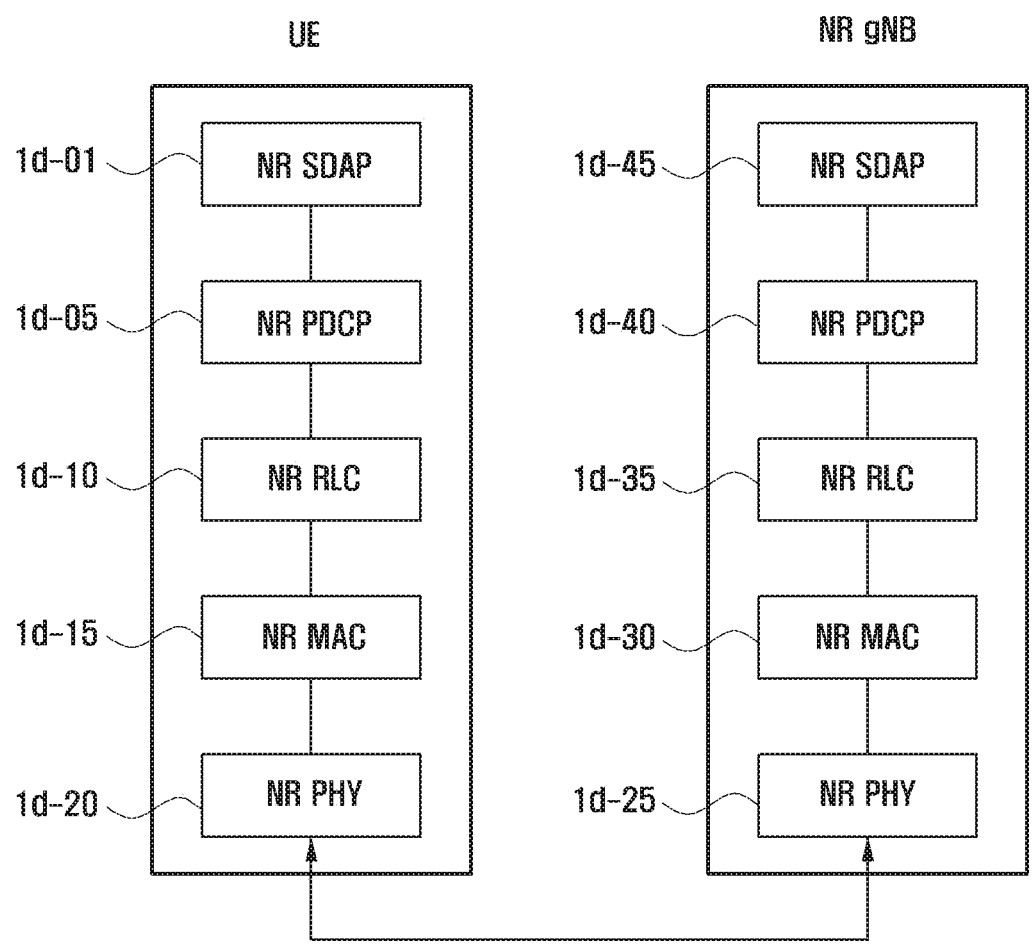
FIG. 1D is a diagram illustrating a structure of a radio protocol in a next generation mobile communication system according to various embodiments of the disclosure.

FIG. 1D is a diagram illustrating a structure of a radio protocol in a next generation mobile communication system according to various embodiments of the disclosure.

Referring to FIG. 1D, a radio protocol of a next generation mobile communication system is configured with an NR service data adaptation protocol (SDAP) 1d-01 and 1d-45, an NR PDCP 1d-05 and 1d-40, an NR RLC 1d-10 and 1d-35, and an NR MAC 1d-15 and 1d-30 for each of a UE and an NR base station.

The main functions of the NR SDAP 1d-01 and 1d-45 may include a part of the functions as follows:

Transfer of user data (transfer of user plane data)

Mapping between a QoS flow and a data radio bearer (DRB) for both downlink (DL) and uplink (UL)

marking QoS flow identify (ID) for both DL and UL (marking QoS flow ID in both DL and UL packets)

mapping reflective QoS flow to DRB for the UL SDAP PDUs (reflective QoS flow to DRB mapping for the UL SDAP PDUs)

A UE may receive, via an radio resource control (RRC) message, a configuration associated with whether to use a header of the SDAP layer device or whether to use a function of the SDAP layer device, for each PDCP layer device, or for each bearer, or for each logical channel. When a SDAP header is configured, the UE is directed, by a one-bit non-access stratum (NAS) reflective QoS indicator (NAS reflective QoS) and a one-bit AS reflective QoS indicator (AS reflective QoS) of the SDAP header, to update or reconfigure mapping information between a data bearer and a QoS flow of an uplink and a downlink. The SDAP header may include QoS flow ID information indicating QoS. The QoS information may be used as data processing priority for supporting smooth services, scheduling information or the like.

The main functions of the NR PDCP 1d-05 and 1d-40 may include a part of the functions as follows:

Header compression and decompression: ROHC only

Transfer of user data

In-sequence delivery (in-sequence delivery of upper layer PDUs)

Out-of-sequence delivery (out-of-sequence delivery of upper layer PDUs)

Reordering (PDCP PDU reordering for reception)

Duplicate detection (duplicate detection of lower layer SDUs)

Retransmission (retransmission of PDCP SDUs)

Ciphering and deciphering

Timer-based SDU discard (timer-based SDU discard in uplink)

The reordering function of the NR PDCP 1d-05 and 1d-40 may indicate a function of reordering PDCP PDUs received from a lower layer sequentially according to a PDCP sequence number (SN). The reordering function may include a function of sequentially transferring reordered data to a higher layer, may include a function of immediately transferring data without considering order, may include a function of performing reordering and recording lost PDCP PDUs, may include a function of reporting the states of lost PDCP PDUs to a transmission side, and may include a function of requesting retransmission of lost PDCP PDUs.

The main functions of the NR RLC 1d-10 and 1d-35 may include a part of the functions as follows:

Transfer of data (transfer of upper layer PDUs)

In-sequence delivery (in-sequence delivery of upper layer PDUs)

Out-of-sequence delivery (out-of-sequence delivery of upper layer PDUs)

ARQ (error correction through ARQ)

Concatenation, segmentation, and reassembly (concatenation, segmentation and reassembly of RLC SDUs)

Re-segmentation (re-segmentation of RLC data PDUs)

Reordering (reordering of RLC data PDUs)

Duplicate detection

Error detection (protocol error detection)

RLC SDU discard

RLC re-establishment

The in-sequence delivery function of the NR RLC device may indicate a function of sequentially transferring RLC SDUs, received from a lower layer, to a higher layer. The in-sequence delivery function may include a function of reassembling RLC SDUs, which are segmented from an originally single RLC SDU, and transferring an RLC SDU, may include a function of reordering received RLC PDUs based on an RLC sequence number (SN) or PDCP sequence number (SN), may include a function of performing reordering and recording lost RLC PDUs, may include a function of reporting the states of lost RLC PDUs to a transmission side, may include a function of requesting retransmission of lost RLC PDUs, may include a function of sequentially transferring, to a higher layer, only RLC SDUs before a lost RLC SDU if a lost RLC SDU exists, may include a function of sequentially transferring, to a higher layer, all RLC SDU received before a timer starts if the timer expires although a lost RLC SDU exists, or may include a function of sequentially transferring, to a higher layer, all RLC SDUs received up to date, if a predetermined timer expires, although a lost RLC SDU exists. The RLC PDUs may be processed in order of arrival (irrespective of a sequence number) and may be transferred to a PDCP device randomly (out-of sequence delivery). In the case of segments, a single RLC PDU is reconfigured by receiving segments which are stored in a buffer or are to be received in the future, and the RLC PDU may be transferred to the PDCP device. The NR RLC layer 1d-10 and 1d-35 may not include a concatenation function, and the function may be performed by the NR MAC layer 1d-15 and 1d-30 or may be replaced with the multiplexing function of the NR MAC layer 1d-10 and 1d-35.

The out-of-sequence deliver function of the NR RLC device may indicate a function of immediately transferring RLC SDUs, received from a lower layer, to a higher layer in any order. The out-of sequence delivery function may include a function of reassembling RLC SDUs which are segmented from an originally single RLC SDU, and transferring an RLC SDU, and may include a function of storing an RLC SN or PDCP SN of received RLC PDUs, performing reordering, and recording lost RLC PDUs.

The NR MAC layer 1d-15 and 1d-30 may be connected to a plurality of NR RLC layer devices configured for a single UE, and the main functions of the NR MAC 1d-15 and 1d-30 may include a part of the functions as follows:

Mapping (mapping between logical channels and transport channels)

Multiplexing/demultiplexing (multiplexing/demultiplexing of MAC SDUs)

Scheduling information reporting

HARQ (error correction through HARQ)

Priority handling between logical channels (priority handling between logical channels of one UE)

Priority handling between UEs (priority handling between UEs by means of dynamic scheduling)

MBMS service identification

Transport format selection

Padding

The NR PHY layer 1d-20 and 1d-25 may perform an operation of channel-coding and modulating higher layer data to produce an OFDM symbol and transmitting the OFDM symbol to a wireless channel, or demodulating and channel-decoding an OFDM symbol received via a wireless channel and transmitting the demodulated and channel-decoded OFDM symbol to a higher layer.

Figure 1E:
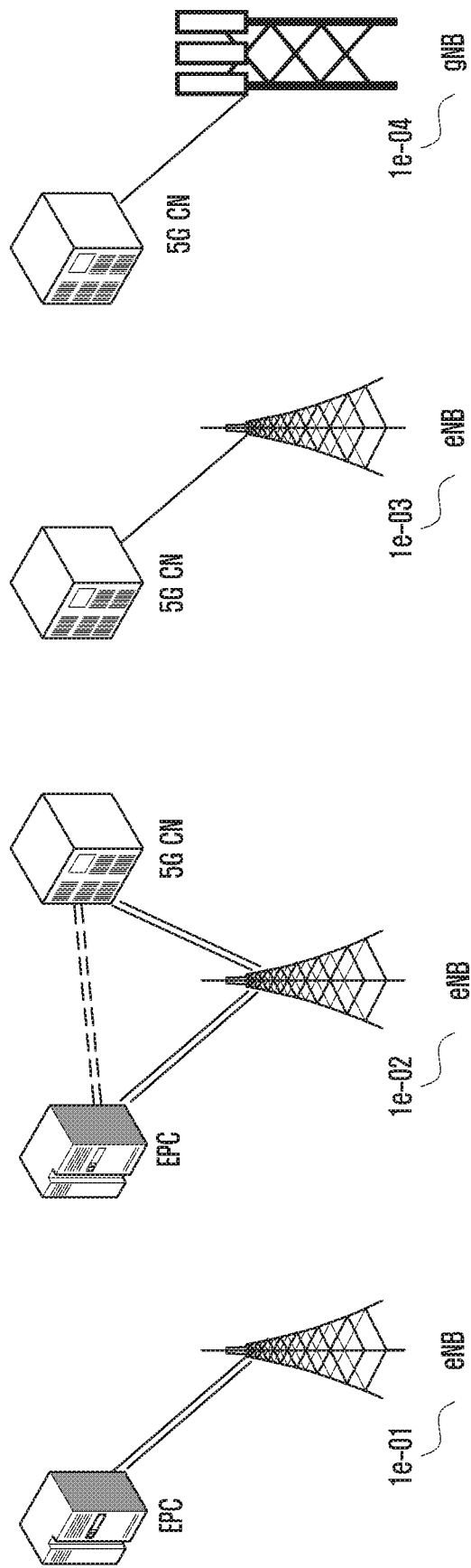
FIG. 1E is a diagram illustrating connection relationships among an LTE base station (eNB), an NR base station (gNB), an evolved packet core (EPC) (LTE core network), and a 5G core network (CN) (NR core network) supported by a wireless communication system (long term evolution (LTE) system of FIG. 1A) and a next generation mobile communication system (NR system of FIG. 1C) according to various embodiments of the disclosure.
Figure 1F:
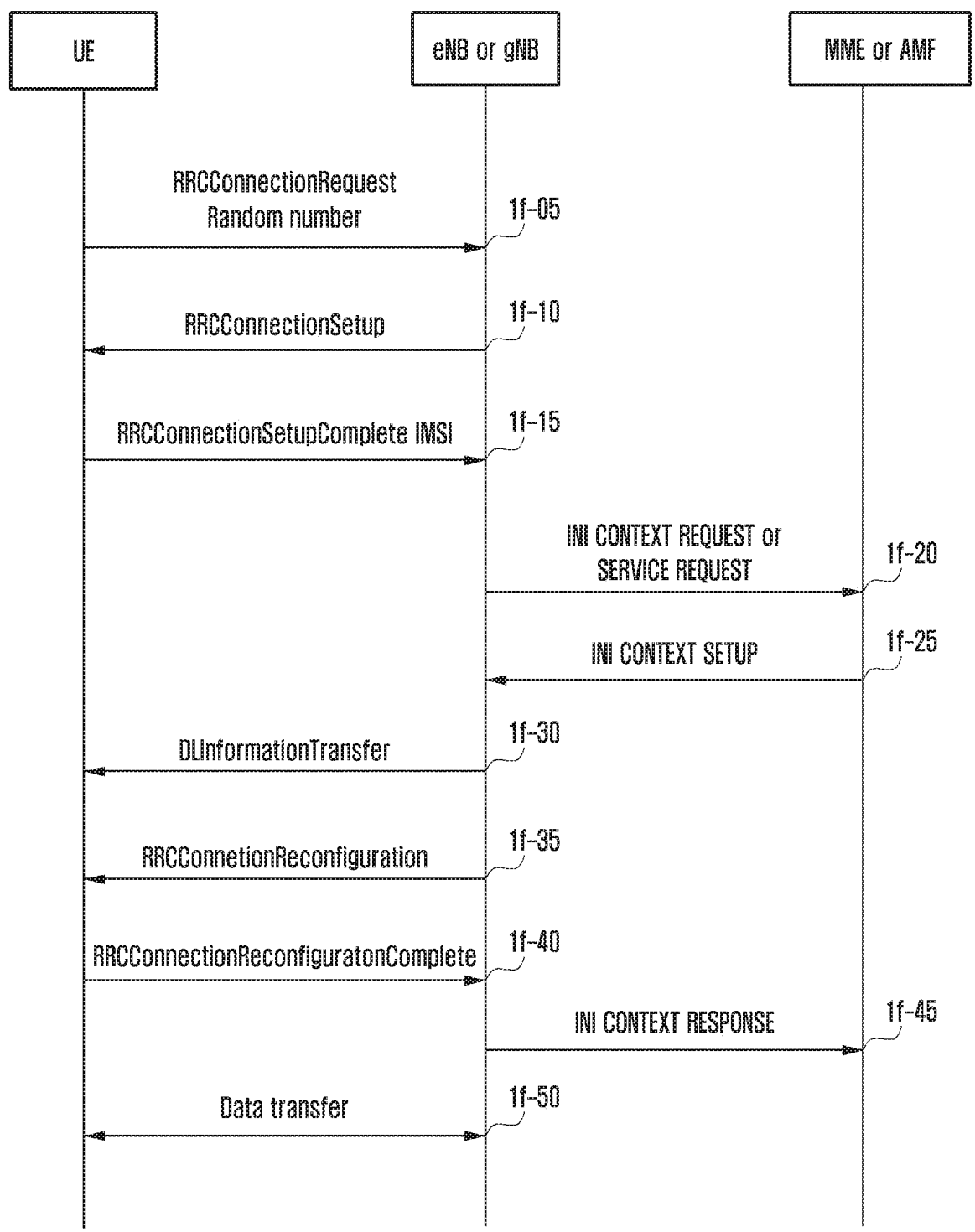
FIG. 1F is a signal diagram illustrating a terminal that attempts connection to a network for a first time being assigned with a unique identifier from a network, and sets up connection to the network according to various embodiments of the disclosure.

FIG. 1E is a diagram illustrating connection relationships among an LTE base station (eNB), an NR base station (gNB), an evolved packet core (EPC) (LTE core network), and a 5G core network (CN) (NR core network) supported by a wireless communication system (LTE system of FIG. 1A) and a next generation mobile communication system (NR system of FIG. 1C) according to an embodiment of the disclosure. The EPC is a network including a MME, and the 5G CN is a network including an access management function (AMF).

Referring to FIG. 1E, a case 1e-01 in which an LTE base station (eNB) is connected to only an EPC may be supported. A case 1e-02 in which an LTE base station (eNB) is connected to both an EPC and a 5G CN may be supported. A case 1e-03 in which an LTE base station (eNB) is connected to only a 5G CN may be supported. A case 1e-04 in which an NR base station (gNB) is connected to only a 5G CN may be supported.

Therefore, the disclosure provides a terminal's network connection method and RRC message information, which may support all connection relationships among an LTE base station (eNB), an NR base station (gNB), an evolved packet core (EPC) (LTE core network), and a 5G core network (CN) (NR core network), which have been described in FIG. 1E.

The disclosure proposes a first identifier that an LTE system may allocate to a terminal, and a second identifier that an NR system may allocate to a terminal, and may provide a procedure that a terminal connects to a network using the identifiers, and information that a terminal needs to include in an RRC message for transmission. The EPC of the LTE system may allocate, to a terminal that performs connection for the first time, a first unique identifier (e.g., GUTI) which may be identified by the LTE system. A first identifier (e.g., an S-TMSI) identified by LTE base stations (access stratum) may be configured using a part of the first unique identifier, and may be used. In addition, the 5G CN of the NR system may allocate, to a terminal that performs connection for the first time, a second unique identifier (e.g., 5G-GUTI) which may be identified by the NR system. A second identifier (e.g., 5G-S-TMSI) identified by NR base stations (access stratum) may be configured using a part of the second unique identifier, and may be used.

Each of the first unique identifier and the second unique identifier may be configured to be a combination of a core network identifier and a terminal identifier. The first unique identifier may include, for example, an MCC (12 bits), an MNC (12 bits), an MME Group (16 bits), an MME code (8 bits), and an M-TMSI (32 bits), and may have a size of 10 byte (80 bits). In addition, lower 40 bits (LSB, MME code, and M-TMSI) which are a part of the first unique identifier may be defined to be the first identifier (e.g., S-TMSI), and may be used. In the same manner as the first unique identifier, the second unique identifier may be configured to be a combination of a network identifier and a terminal identifier. The lower bits of the second unique identifier may be defined to be the second identifier (e.g., 5G-S-TMSI) and may be used.

The next generation mobile communication system may introduce an identifier that has a space greater than or equal to that of a first unique identifier as a second unique identifier, and may introduce an identifier having a space greater than or equal to that of a first identifier (S-TMSI of 40 bits) as a second identifier (e.g., 5G-S-TISI of 48 bits), in order to identify and manage a larger number of wireless communication devices, and to support connection to a network.

The disclosure proposes a procedure in which a terminal is assigned with a first unique identifier for an LTE system, a first identifier, a second unique identifier for an NR system, and a second identifier, and effectively connects to a network using the identifiers, and proposes a procedure in which the terminal includes the identifiers in an RRC message and transfers the same.

FIG. IF is a signal diagram illustrating a terminal that attempts connection to a network for a first time being assigned with a unique identifier from the network, and sets up connection to the network according to various embodiments of the disclosure.

A terminal that attempts connection to the network for the first time indicates a terminal that has never been registered with an LTE system and an NR system. That is, the terminal has not been assigned with a first unique identifier or a second unique identifier from the LTE system or the NR system.

In FIG. IF, an RRC idle mode terminal may start discovering a cell when attempting connection to the network, discover a suitable cell by performing cell selection/reselection, and camp on the suitable cell. The terminal may be synchronized with the cell that the UE camps on, and perform a random access procedure. In the random access procedure, when the terminal transmits a message 3 (e.g., 56 bits (a MAC header of 8 bits and a CCCH SDU of 48 bits)) on a common control channel (CCCH), the terminal may include random values having a predetermined length (e.g., 40 bits) in the message 3 (CCCH SDU) such that a base station may solve contention (contention resolution) among terminals, in operation 1*f*-05. To solve contention, the base station that receives the message 3 may duplicate first 6 bytes of the received message 3 (CCCH SDU), may include the same in MAC control information (MAC control element, contention resolution MAC CE), and may transmit the same to the UE via a message 4 in operation 1*f*-10. The UE that receives the message 4 may identify contention resolution, and may transmit a message 5 to the base station in operation 1*f*-15. The terminal may contain a terminal's unique identifier (e.g., IMSI) in a NAS container (dedicatedInfoNAS) of the message 5 and may transmit the same to a network such that the network may identify the terminal's unique identifier and may register the same with the network.

In an exemplary embodiment, the base station may receive the message 5, identify network information from the message 5, and route a message of the terminal to the core network. The base station may include the NAS container information included in the message 5 in a NAS message (e.g., INITIAL CONTEXT REQUEST) and may transmit the same to the core network (EPC or 5G CN) in operation 1*f*-20. The core network may identify the terminal's unique identifier, may register the terminal with the core network, may determine to allocate a unique identifier (e.g., a first unique identifier or a second unique identifier) which enables the network system (LTE system or NR system) to identify the terminal, and may include the unique identifier in a NAS message (e.g., INITIAL CONTEXT SETUP) and transmit the NAS message to the base station in order to transfer the unique identifier to the terminal in operation 1*f*-25. The base station may transfer the message to the terminal in operation 1*f*-30. When it is identified that the terminal is registered with the LTE system via the message in 1*f*-30, the terminal may identify a first unique identifier. When the terminal is registered with the NR system, the terminal may identify a second unique identifier, and may store the same in a NAS layer device of the terminal in operation 1*f*-30. When the base station transmits an RRC Connection Reconfiguration message for RRC connection configuration in operation 1*f*-35, the terminal receives the RRC message and receives each bearer configuration information, completes configuration in operation 1*f*-35, and transmits an RRC Connection Reconfiguration Complete message to the base station so as to complete connection configuration in operation 1*f*-40. When the base station completes configuration of connection to the terminal, the base station transmits a response indicating that initial connection and context setup has been completed to the core network in operation 1*f*-45. The terminal completes configuration of connection to the network and may exchange data in operation 1*f*-50.

Figure 1G:
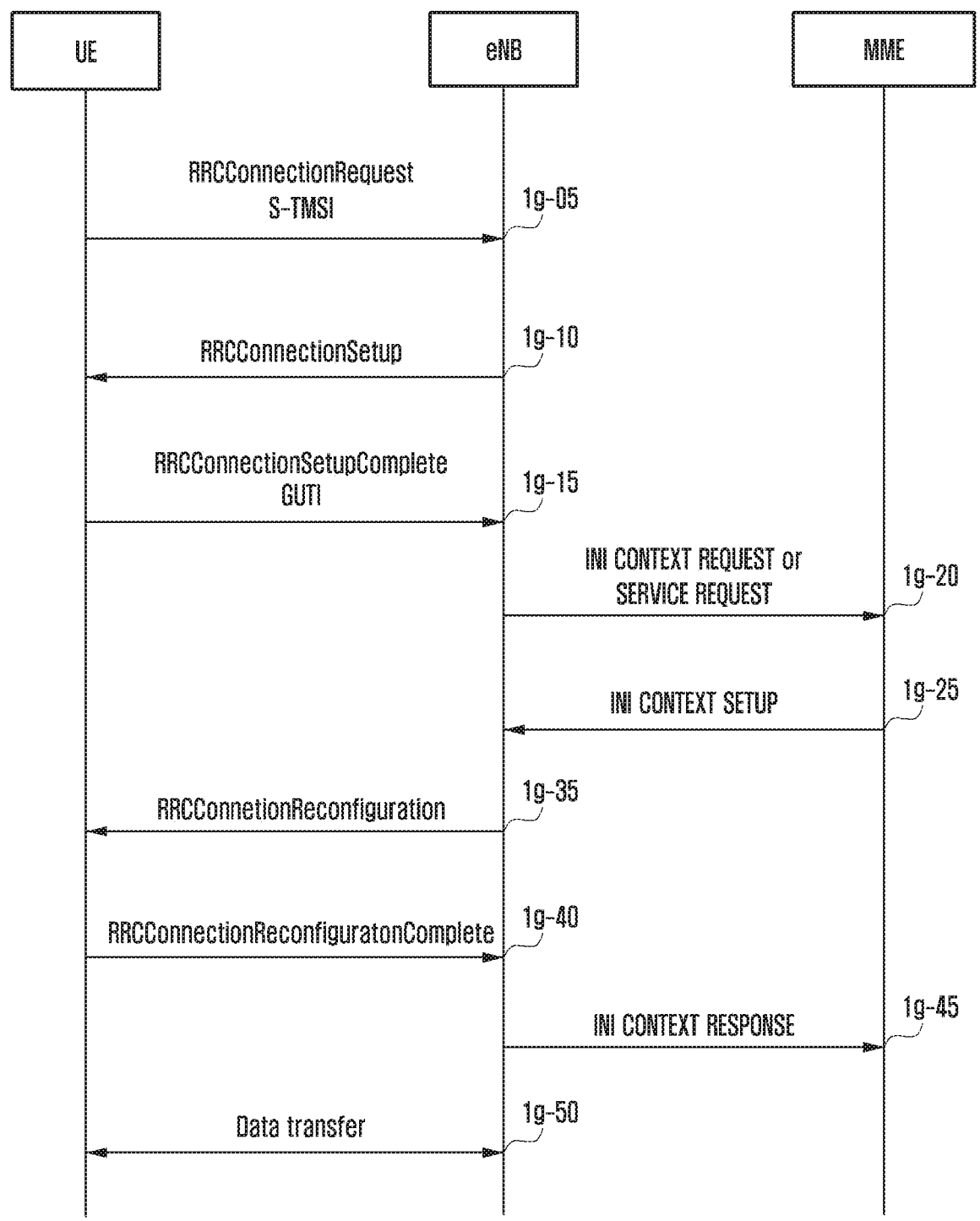
FIG. 1G is a signal diagram illustrating a method in which a terminal that has been assigned with a first unique identifier from an LTE system sets up connection to a network according to various embodiments of the disclosure.

FIG. 1G is a signal diagram illustrating a method in which a terminal that has been assigned with a first unique identifier from an LTE system sets up connection to a network, according to various embodiments of the disclosure.

The terminal that has been assigned with the first unique identifier from the LTE system indicates a terminal that was registered with the LTE system and currently stores the first unique identifier.

In FIG. 1G, when an RRC idle mode terminal receives a paging message, needs to update a tracking area, or needs to transmit data in an uplink, the terminal may attempt connection to a network again. The terminal may start discovering a cell first, may perform cell selection/reselection to discover a suitable cell, and may camp on the suitable cell. The terminal may be synchronized with the cell that the terminal camps on, and perform a random access procedure. In the random access procedure, when the terminal transmits a message 3 (e.g., 56 bits (a MAC header of 8 bits and a CCCH SDU of 48 bits)) on a common control channel (CCCH), the terminal may define a part of the first unique identifier, which was allocated from the LTE system, as a first identifier (e.g., an S-TMSI) that enables base stations to identify the terminal, and may include the first identifier in the message 3, instead of including random values, so that a base station may solve contention (contention resolution) among terminals. That is, lower bits (e.g., lower 40 bits (LSB)) of the first unique identifier (e.g., GUTI) that the terminal stores may be included in the message 3 (CCCH SDU) as the first identifier (e.g., S-TMSI), and may be transmitted in operation 1g-05. In the message 3, an indicator indicating whether a value corresponding to the identifier included in the message 3 is a random value or a first identifier may be defined and included, so that a base station may identify the random value of the first embodiment and the first identifier of the second embodiment of the disclosure. In an exemplary embodiment, the random value or the first identifier may be indicated by a one-bit indicator. To solve contention, the base station that receives the message 3 may duplicate the first 6 bytes (48 bits) of the received message 3 (CCCH SDU), may include the same in MAC control information (MAC control element, contention resolution MAC CE), and may transmit the same to the terminal as a message 4 in operation 1g-10. The terminal that receives the message 4 may identify contention resolution, and may transmit a message 5 to the base station in operation 1g-15. The terminal may contain the first unique identifier (e.g., GUTI), which has been allocated from the LTE system and has been stored by the terminal, in a NAS container (dedicatedInfoNAS) of the message 5, and may transmit the same, so that the network identifies the identifier and identifies the terminal The base station may identify the first identifier (S-TMSI), may receive the message 5, may identify network information from the message 5, and may route a message of the terminal to the core network. The base station may contain the NAS container information included in the message 5 in a NAS message (e.g., INITIAL CONTEXT REQUEST or SERVICE REQUEST) and may transmit the same to the core network (EPC or 5G CN) in operation 1g-20. The base station identifies the first identifier, and identifies that the terminal is a registered terminal and reconnects to request a service, the base station may transmit a SERVICE REQUEST message to the core network. The core network may identify the terminal's unique identifier, that is, the network system (LTE system or NR system) may identify the terminal, may identify context, may include the context in a NAS message (e.g., INITIAL CONTEXT SETUP) to allow the terminal to access, and may transmit the NAS message to the base station in operation 1g-25. When required, the base station may transmit the message to the terminal. When the base station transmits an RRC Connection Reconfiguration message for RRC connection configuration in operation 1g-35, the terminal receives the RRC message and receives each bearer configuration information, and completes configuration in operation 1g-35, and transmits an RRC Connection Reconfiguration Complete message to the base station so as to complete connection configuration in operation 1g-40. When the base station completes configuration of connection to the terminal, the base station transmits a response indicating that initial connection and context setup has been completed to the core network in operation 1g-45. The terminal completes setup of connection to the network and may exchange data in operation 1g-50.

Figure 1H:
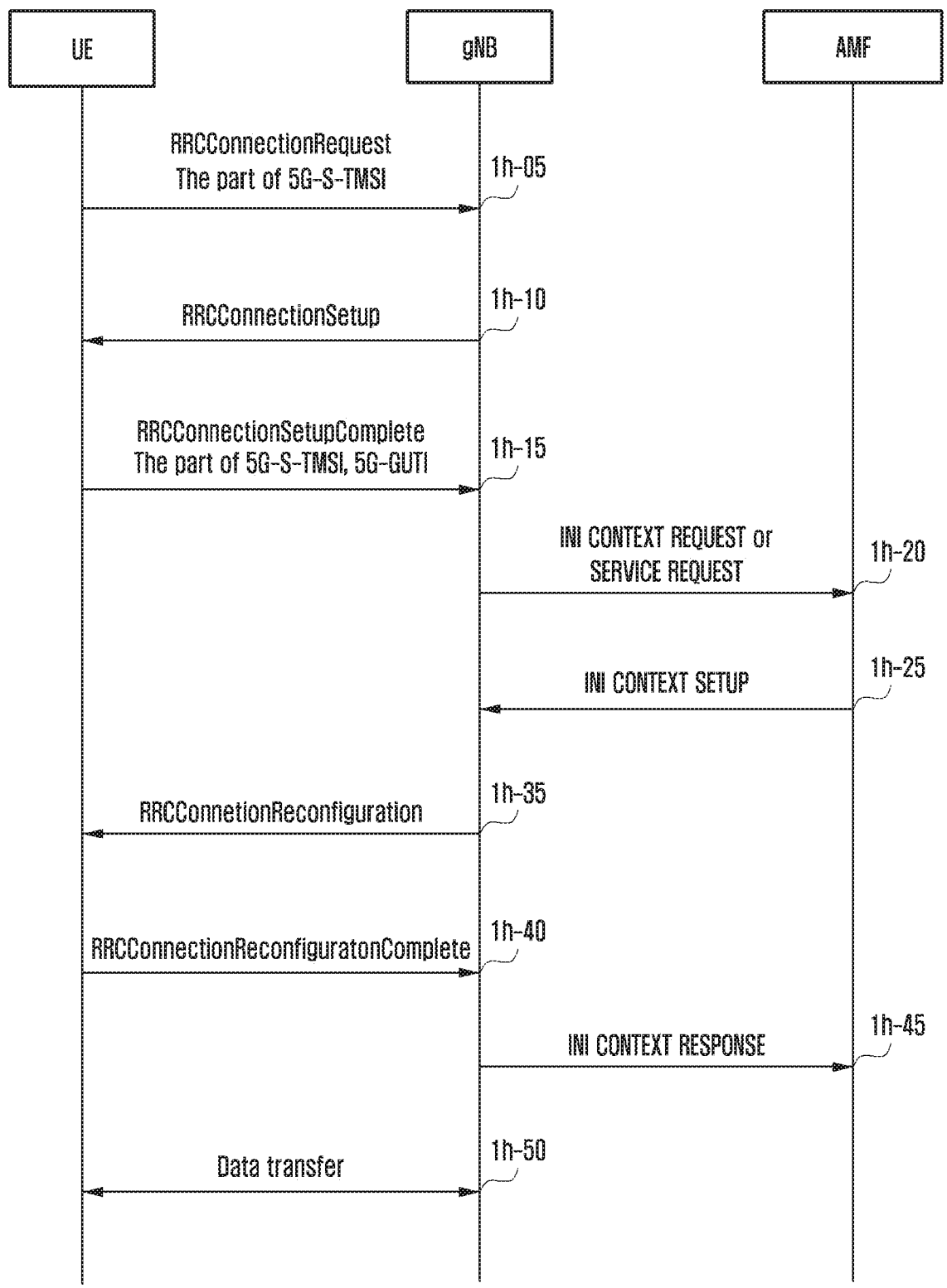
FIG. 1H is a signal diagram illustrating a method in which a terminal that has been assigned with a second unique identifier from an NR system sets up connection to a network according to various embodiments of the disclosure.

FIG. 1H is a signal diagram illustrating a method in which a terminal that has been assigned with a second unique identifier from an NR system sets up connection to a network, according to various embodiments of the disclosure.

The terminal that has been assigned with the second unique identifier from the NR system indicates a terminal that was registered with the NR system and currently stores the second unique identifier.

The next generation mobile communication system may introduce an identifier having a space greater than that of a first unique identifier (GUTI) as a second unique identifier (5G-GUTI), and may introduce an identifier having a space greater than that of a first identifier (S-TMSI of 40 bits) as a second identifier (e.g., 5G-S-TMSI of 48 bits), in order to identify and manage wireless communication devices, and to support connection to a network.

In the disclosure, since a message 3 is transmitted to a CCCH, and is important for the terminal to set up connection to the network, coverage is a significantly important issue. The coverage may be increased when data in a size as small as possible is transmitted. Accordingly, the disclosure may limit the size of the message 3 to the minimum transport block size, so as to maximize the coverage. For example, the size of the message 3 may be 56 bits. However, in the disclosure, a second unique identifier (5G-GUTI) having the same or larger space is introduced, and accordingly, the terminal may use a second identifier having the same or larger space when connecting to the network. That is, since the minimum transport block size is used, the size may be insufficient to include a new second identifier. Therefore, according to a method provided by the disclosure, when the terminal attempts to connect to the network using a second identifier which has a larger space, the terminal uses an indicator of the message 3 so as to indicate that a part of the second identifier is included in the message 3 and is transmitted, and to indicate that the remaining part of the second identifier is included in a message 5 and is transmitted, so that a base station normally receives the second identifier having a larger space. According to another method, when the terminal attempts to connect to the network using a second identifier (5G-S-TMSI) having a larger space, the terminal may use an indicator of the message 3 so as to indicate that a part of the second identifier is included in the message 3 and is transmitted. The part of the second identifier may be a combination of, for example, a network identifier and a terminal identifier, according to a predetermined rule, and may be defined as a third truncated identifier (truncated 5G-S-TMSI), and may be used as an identifier having a small size (in this instance, the remaining part of the second identifier may not be transmitted by being included in the message 5).

In FIG. 1H, when an RRC idle mode terminal receives a paging message, needs to update a tracking area, or needs to transmit data in an uplink, the terminal may attempt connection to the network again. The terminal starts discovering a cell first, may perform cell selection/reselection to discover a suitable cell, and may camp on the suitable cell. The terminal is synchronized with the cell that the terminal camps on, and performs a random access procedure. In the random access procedure, when the terminal transmits the message 3 (e.g., 56 bits (a MAC header of 8 bits and a CCCH SDU of 48 bits)) on a CCCH, the terminal may define a part of a second unique identifier which was allocated from the NR system as a second identifier (e.g., a 5G-S-TMSI) that enables base stations to identify the terminal, may include the second identifier in the message 3, instead of including random values, and may transmit the same, so that a base station may solve contention (contention resolution) among terminals. However, the size of the second identifier may be in a large size, for example, a size of 48 bits, the terminal may divide the second identifier between the message 3 and the message 5, and transmit the same to a base station. That is, lower bits (e.g., the lower 40 bits (LSB)) of the second identifier (e.g., 5G-S-TMSI) that the terminal has been storing may be included in the message 3 (CCCH SDU) and may be transmitted in operation 1h-05. In the message 3, indicators indicating whether a value corresponding to an identifier included in the message 3 is a random value, a first identifier, or a second identifier may be defined and included, so that a base station may identify a random value of the first embodiment of the disclosure, a first identifier of the second embodiment of the disclosure, and a part of a second identifier of the third embodiment of the disclosure. For example, each of a random value, a first identifier, or a part of a second identifier (e.g., 40-bit LSB) may be indicated by a two-bit indicator. In addition, the fact that a part of the second identifier (e.g., 40-bit LSB) is included in the message 3, indicated by the indicator of the message 3, may indicate that the remaining part of the second identifier may be included in the message 5 and may be transmitted by the terminal. To solve contention, a base station that receives the message 3 may duplicate first 6 bytes (48 bits) of the received message 3 (CCCH SDU), may include the same in MAC control information (MAC control element, contention resolution MAC CE), and may transmit the same to the terminal via a message 4 in operation 1h-10. The terminal that receives the message 4 may identify contention resolution, and may transmit the message 5 to the base station in operation 1h-15. The terminal may include, in the message 5, the remaining part of the second identifier (e.g., 8-bit MSB) remaining after excluding the part of the second identifier which was included in the message 3 and was transmitted, and may transmit the same. In addition, the terminal may contain the second unique identifier (e.g., 5G-GUTI), which has been allocated from the NR system and has been stored by the terminal, in a NAS container (dedicatedInfoNAS) of the message 5, and may transmit the same to the network, so that the network identifies the identifier and identifies the terminal.

The base station may identify the second identifier (5G-S-TMSI) which is divided between the message 3 and message 5, may identify network information from the message 5, and may route a message of the terminal to the core network. The base station may contain the NAS container information included in the message 5 in a NAS message (e.g., INITIAL CONTEXT REQUEST or SERVICE REQUEST) and may transmit the same to the core network (EPC or 5G CN) in operation 1h-20. The base station identifies the second identifier, and identifies that the terminal has been registered and reconnects to request a service, the base station may transmit a SERVICE REQUEST message to the core network. The core network may identify the terminal's unique identifier, that is, the network system (LTE system or NR system) identifies the terminal, may identify context, may include the context in a NAS message (e.g., INITIAL CONTEXT SETUP) to allow the terminal to access, and may transmit the NAS message to the base station in operation 1h-25. When required, the base station may transmit the message to the terminal. When the base station transmits an RRC Connection Reconfiguration message for RRC connection configuration in operation 1h-35, the terminal receives the RRC message and receives each bearer configuration information, and completes configuration in operation 1h-35, and transmits an RRC Connection Reconfiguration Complete message to the base station so as to complete connection configuration in operation 1h-40. When the base station completes configuration of connection to the terminal, the base station transmits a response indicating that initial connection and context setup has been completed to the core network in operation 1h-45. The terminal completes configuration of connection to the network and may exchange data in operation 1h-50.

When dividing the second identifier between messages, the terminal may include a lower part (lower 40 bits) of the second identifier (e.g., 48 bits) in the message 3 and transmit the same, and may include an upper part (upper 8 bits) of the second identifier (e.g., 48 bits) in the message 5 and transmit the same. The lower part of the second identifier includes a terminal identifier, and the upper part includes a network identifier. Accordingly, via the division of the second identifier between messages, a possibility of contention resolution of the message 4 may be improved when the base station desires to solve contention using the message 3.

According to another method, when dividing the second identifier between messages, the terminal may include an upper part (upper 40 bits) of the second identifier (e.g., 48 bits) in the message 3 and transmit the same, and may include a lower part (lower 8 bits) of the second identifier (e.g., 48 bits) in the message 5 and transmit the same. The lower part of the second identifier includes a terminal identifier, and the upper part includes a network identifier. Accordingly, when the base station receives the message 3 from the terminal, the base station identifies the traffic of the network. When excessive traffic is expected or overload occurs, the base station identifies the network identifier of the message 3, and rejects the terminal immediately.

Figure 1I:
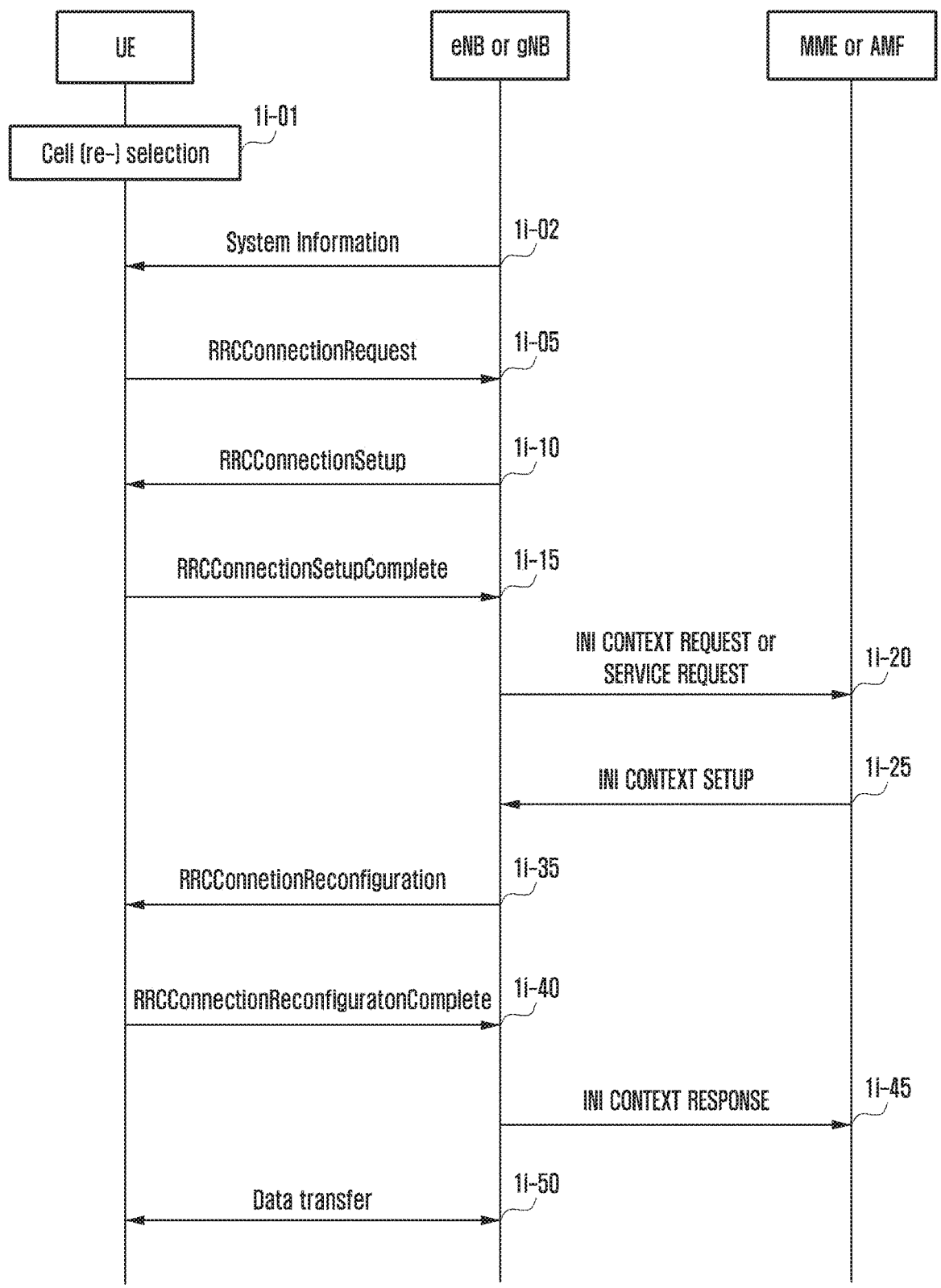
FIG. 1I is a signal diagram illustrating a method in which a terminal sets up connection to a network by taking into consideration a core network connection state of a cell that the terminal camps on when establishing connection to the network, system information, whether connection of the terminal is initial connection, and an identifier that the terminal stores, according to various embodiments of the disclosure.

FIG. 1I is a signal diagram illustrating a method in which a terminal sets up connection to a network by taking into consideration a core network connection state of a cell that the terminal camps on when setting up connection to the network, system information, whether connection of the terminal is initial connection, and an identifier that the terminal stores, which is a fourth embodiment of the disclosure.

The next generation mobile communication system may introduce an identifier having a space greater than that of a first unique identifier (GUTI) as a second unique identifier (5G-GUTI), and may introduce an identifier having a space greater than that of a first identifier (S-TMSI of 40 bits) as a second identifier (e.g., 5G-S-TMSI of 48 bits), in order to identify and manage wireless communication devices, and to support connection to a network.

In the disclosure, since a message 3 is transmitted to a CCCH, and is important for the terminal to establish connection to the network, coverage is a significantly important issue. The coverage may be increased when data in a size as small as possible is transmitted. Accordingly, the disclosure may limit the size of the message 3 to the minimum transport block size, so as to maximize the coverage. For example, the size of the message 3 may be 56 bits. However, in the disclosure, a second unique identifier (5G-GUTI) having the same or larger space is introduced, and accordingly, the terminal may use a second identifier having the same or larger space when connecting to the network. That is, since the minimum transport block size is used, the size may be insufficient to include a new second identifier. Therefore, according to a method provided by the disclosure, when the terminal attempts to connect to the network using the second identifier which has a larger space, the terminal uses an indicator of the message 3 so as to indicate that a part of the second identifier is included in the message 3 and is transmitted, and to indicate that the remaining part of the second identifier is included in the message 5 and is transmitted, so that a base station normally receives the second identifier having a larger space. Conversely, when the terminal has a first identifier, the terminal may use the indicator of the message 3 to indicate that the first identifier is included in the message 3 and is transmitted, so that the terminal is capable of set up connection to the base station, like the second embodiment.

In FIG. 1I, when an RRC idle mode terminal receives a paging message, needs to update a tracking area, or needs to transmit data in an uplink, the terminal may attempt connection to the network again. The terminal starts discovering a cell first, may perform cell selection/reselection to discover a suitable cell, and may camp on the suitable cell in operation 1*i*-01. The terminal is synchronized with the cell that the terminal camps on, and performs a random access procedure. When the terminal is synchronized with the cell, the terminal may recognize whether the cell that the terminal camps on is an LTE cell of an LTE base station or an NR cell of an NR base station. When the terminal is synchronized with the LTE cell, a synchronization signal (a primary SS or a secondary SS) may be used. When the terminal is synchronized with the NR cell, a synchronization signal block (SSB) is used. Accordingly, the terminal may recognize whether the cell that the terminal is to camp on is the LTE cell (or LTE base station) or the NR cell (or the NR base station). In addition, the terminal may identify the system information of the cell that the terminal camps on, and may recognize whether the cell is an LTE cell (or LTE base station) or an NR cell (or NR base station) in operation 1*i*-02.

In addition, the terminal may identify the system information and may identify whether the cell (or a base station) that the terminal camps on is an LTE cell (or an LTE base station) or an NR cell (or an NR base station). The terminal may identify, from the system information, an indicator indicating whether the current cell that the terminal camps on is connected to a 5G CN, and may identify whether an LTE cell (or LTE base station) or an NR cell (or NR base station) is connected to an EPC or a 5G CN. That is, when a core network type (CN type) is the EPC in the system information, connection to the EPC is identified. When the core network type is the 5G CN, connection to the 5G CN is identified. That is, an access stratum (AS) layer device of the terminal identifies whether the cell that the terminal camps on or the base station is connected to the EPC or the 5G CN, based on the synchronization signal or system information, and may report the information to a Non-Access Stratum (NAS) layer device of the terminal, and the NAS layer device may generate a message and information appropriate therefor, and may proceed with connection to the network.

Therefore, based on a synchronization signal or system information, the terminal may attempt to connect to a cell or base station as below in operation 1*i*-05, according to the above-described scenarios in FIG. 1E, and may transmit an RRC message and identifiers as below so as to set up connection in operation 1*i*-10.

1. LTE Cell (or LTE Base Station) Connected to EPC

A. When a terminal accesses for the first time (when the terminal has never been assigned with a first or second unique identifier):

i. Like the first embodiment of the disclosure, the terminal includes random values together with an indicator, which indicates that random values having a predetermined length (e.g., 40 bits) are included, in a message 3, transmits the same, and proceeds with a procedure of connecting to a network like the first embodiment.

B. When a terminal has been assigned with a first unique identifier and currently stores the first unique identifier (when the terminal has been registered with the EPC):

i. Like the second embodiment of the disclosure, the terminal includes a first identifier together with an indicator, which indicates that the first identifier having a predetermined length (e.g., 40 bits) is included, in a message 3, transmits the same, and proceeds with a procedure of connecting to a network like the second embodiment.

C. When a terminal has been assigned with a second unique identifier, and currently stores the second unique identifier (when the terminal has been registered with the 5G CN):

i. The second unique identifier received from the 5G CN is changed to a first unique identifier that the EPC may understand, according to a predetermined rule. Like the second embodiment of the disclosure, the terminal includes a first identifier together with an indicator, which indicates that the first identifier having a predetermined length (e.g., 40 bits) is included, in a message 3, transmits the same, and proceeds with a procedure of connecting to a network like the second embodiment.

ii. The terminal may proceed with a procedure of connecting to the network according to the first embodiment of the disclosure. That is, as another example, the terminal determines that the terminal is incapable of connecting to the network using the second unique identifier which the terminal has been assigned with, proceeds with the procedure described in the first embodiment as if the terminal accesses the network for the first time, so as to be assigned with a new first unique identifier, and attempts connection to the cell.

2. LTE Cell (or LTE Base Station) Connected to 5G CN

A. When a terminal accesses for the first time (when the terminal has never been assigned with a first or second unique identifier):

i. Like the first embodiment of the disclosure, the terminal includes random values together with an indicator, which indicates that random values having a predetermined length (e.g., 40 bits) are included, in a message 3, transmits the same, and proceeds with a procedure of connecting to a network according to the first embodiment.

B. When a terminal has been assigned with a second unique identifier, and currently stores the second unique identifier (when the terminal has been registered with the 5G CN):

i. Like the third embodiment of the disclosure, the terminal includes a part of a second identifier together with an indicator, which indicates that the part (e.g., lower 40 bits) of the second identifier (e.g., 48 bits) having a predetermined length (e.g., 40 bits) is included, in a message 3, transmits the same, receives a message 4, includes the remaining part (e.g., upper 8 bits) of the second identifier (e.g., 48 bits) in a message 5, transmits the same, and proceeds with a procedure of connecting to a network according to the third embodiment. When a third truncated identifier (truncated 5G-S-TMSI) is used in the third embodiment of the disclosure, the remaining part of the second identifier may not need to be transmitted via the message 5.

C. When a terminal has been assigned with a first unique identifier (when the terminal has been registered with the EPC):

i. The first unique identifier received from EPC is changed to a second unique identifier that the 5G CN may understand, according to a predetermined rule, or the first unique identifier is used as it is. Like the second embodiment of the disclosure, the terminal includes a first identifier (or the second unique identifier) together with an indicator, which indicates that the first identifier (or the second unique identifier) having a predetermined length (e.g., 40 bits) is included, in a message 3, transmits the same, and proceeds with a procedure of connecting to a network according to the second embodiment (or the third embodiment).

ii. The terminal may proceed with a procedure of connecting to the network according to the first embodiment of the disclosure. That is, as another example, the terminal determines that the terminal is incapable of connecting to the network using the first unique identifier which the terminal has been assigned with, proceeds with the procedure described in the first embodiment as if the terminal accesses the network for the first time, so as to be assigned with a new second unique identifier, and attempts connection to the cell.

3. LTE Cell (or LTE Base Station) Connected to EPC and 5G CN

A. When a base station is connected to the 5G CN and the EPC, it is assumed that a terminal is connected preferentially to the 5G CN.

B. When a terminal accesses for the first time (when the terminal has never been assigned with a first or second unique identifier):

i. Like the first embodiment of the disclosure, the terminal includes random values together with an indicator, which indicates that random values having a predetermined length (e.g., 40 bits) are included, in a message 3, and transmits the same, and proceeds with a procedure of connecting to a network according to the first embodiment.

C. When a terminal has been assigned with a second unique identifier, and currently stores the second unique identifier (when the terminal has been registered with the 5G CN):

i. Like the third embodiment of the disclosure, the terminal includes a part of a second identifier together with an indicator, which indicates that the part (e.g., lower 40 bits) of the second identifier (e.g., 48 bits) having a predetermined length (e.g., 40 bits) is included, in a message 3, transmits the same, receives a message 4, includes the remaining part (e.g., upper 8 bits) of the second identifier (e.g., 48 bits) in a message 5, transmits the same, and proceeds with a procedure of connecting to a network according to the third embodiment. When a third truncated identifier (truncated 5G-S-TMSI) is used in the third embodiment of the disclosure, the remaining part of the second identifier may not need to be transmitted via the message 5.

D. When a terminal has been assigned with a first unique identifier, and currently stores the first unique identifier (when the terminal has been registered with the EPC):

A. The first unique identifier received from the EPC is changed to a second unique identifier that the 5G CN may understand, according to a predetermined rule, or the first unique identifier is used as it is. Like the second embodiment of the disclosure, the terminal includes a first identifier (or the second unique identifier) together with an indicator, which indicates that the first identifier (or the second unique identifier) having a predetermined length (e.g., 40 bits) is included, in a message 3, transmits the same, and proceeds with a procedure of connecting to a network according to the second embodiment (or the third embodiment).

ii. The terminal may proceed with a procedure of connecting to the network according to the first embodiment of the disclosure. That is, the terminal determines that the terminal is incapable of connecting to the network using the first unique identifier which the terminal has been assigned with, proceeds with the procedure described in the first embodiment as if the terminal accesses the network for the first time, so as to be assigned with a new second unique identifier, and attempts connection to the cell 4. NR Cell (or NR Base Station) Connected to 5G CN A. When a terminal accesses for the first time (when the terminal has never been assigned with a first or second unique identifier):

i. Like the first embodiment of the disclosure, the terminal includes random values together with an indicator, which indicates that random values having a predetermined length (e.g., 40 bits) are included, in a message 3, and transmits the same, and proceeds with a procedure of connecting to a network according to the first embodiment.

B. When a terminal has been assigned with a second unique identifier, and currently stores the second unique identifier (when the terminal has been registered with the 5G CN):

i. Like the third embodiment of the disclosure, the terminal includes a part of a second identifier together with an indicator, which indicates that the part (e.g., lower 40 bits) of the second identifier (e.g., 48 bits) having a predetermined length (e.g., 40 bits) is included, in a message 3, transmits the same, receives a message 4, includes the remaining part (e.g., upper 8 bits) of the second identifier (e.g., 48 bits) in a message 5, transmits the same, and proceeds with a procedure of connecting to a network according to the third embodiment. When a third truncated identifier (truncated 5G-S-TMSI) is used in the third embodiment of the disclosure, the remaining part of the second identifier may not need to be transmitted via the message 5.

C. When a terminal has been assigned with a first unique identifier, and currently stores the first unique identifier (when the terminal has been registered with the EPC):

i. The first unique identifier received from the EPC is changed to a second unique identifier that the 5G CN may understand, according to a predetermined rule, or the first unique identifier is used as it is. Like the second embodiment of the disclosure, the terminal includes a first identifier (or the second unique identifier) together with an indicator, which indicates that the first identifier (or the second unique identifier) having a predetermined length (e.g., 40 bits) is included, in a message 3, transmits the same, and proceeds with a procedure of connecting to a network according to the second embodiment.

ii. The terminal may proceed with a procedure of connecting to the network according to the first embodiment of the disclosure. That is, the terminal determines that the terminal is incapable of connecting to the network using the first unique identifier which the terminal has been assigned with, proceeds with the procedure described in the first embodiment as if the terminal accesses the network for the first time, so as to be assigned with a new second unique identifier, and attempts connection to the cell As another example, an access stratum (AS) layer device of the terminal identifies whether the cell that the terminal camps on or the base station is connected to the EPC or the 5G CN, based on a synchronization signal or system information, and may report the information to a non-access stratum (NAS) layer device of the terminal, and the NAS layer device may generate a message and information appropriate therefor, and may proceed with connection to the network as follows.

That is, based on system information, the terminal may determine the CN type of a CN connected to a cell as follows:

When a cell is an LTE cell and a 5G CN indicator exists, or when a cell is an NR cell, the corresponding cell is connected to the 5G CN.

When a cell is an LTE cell and a 5G CN indicator does not exist, the corresponding cell is not connected to the 5G CN and is connected to the EPC.

The AS of the terminal reports a supported CN type (5GCN, EPC or Both) to the NAS of the terminal, and the NAS of the terminal requests RRC connection setup from the AS. When the cell is connected to the EPC, the second embodiment may be performed. When the cell is connected to the 5G CN, the third embodiment may be performed.

In the disclosure, the message 4 may be transmitted as an SRB0 bearer from the base station to the terminal via a CCCH, and the message 4 may include configuration information of SRB1. In addition, the terminal receives the message 4, configures SRB1, and transmits a message 5 as an SRB1 bearer to the base station via a dedicated control channel (DCCH).

In the disclosure, the message 3 may include bits indicating the structure of the message 3, an identifier (a random value, a first identifier, or a part of a second identifier), an indicator indicating an identifier (indicating whether an identifier is a random value, a first identifier, or a part of a second identifier), an cause of establishment (establishment-Cause), a MAC subheader, or the like.

Figure 1J:
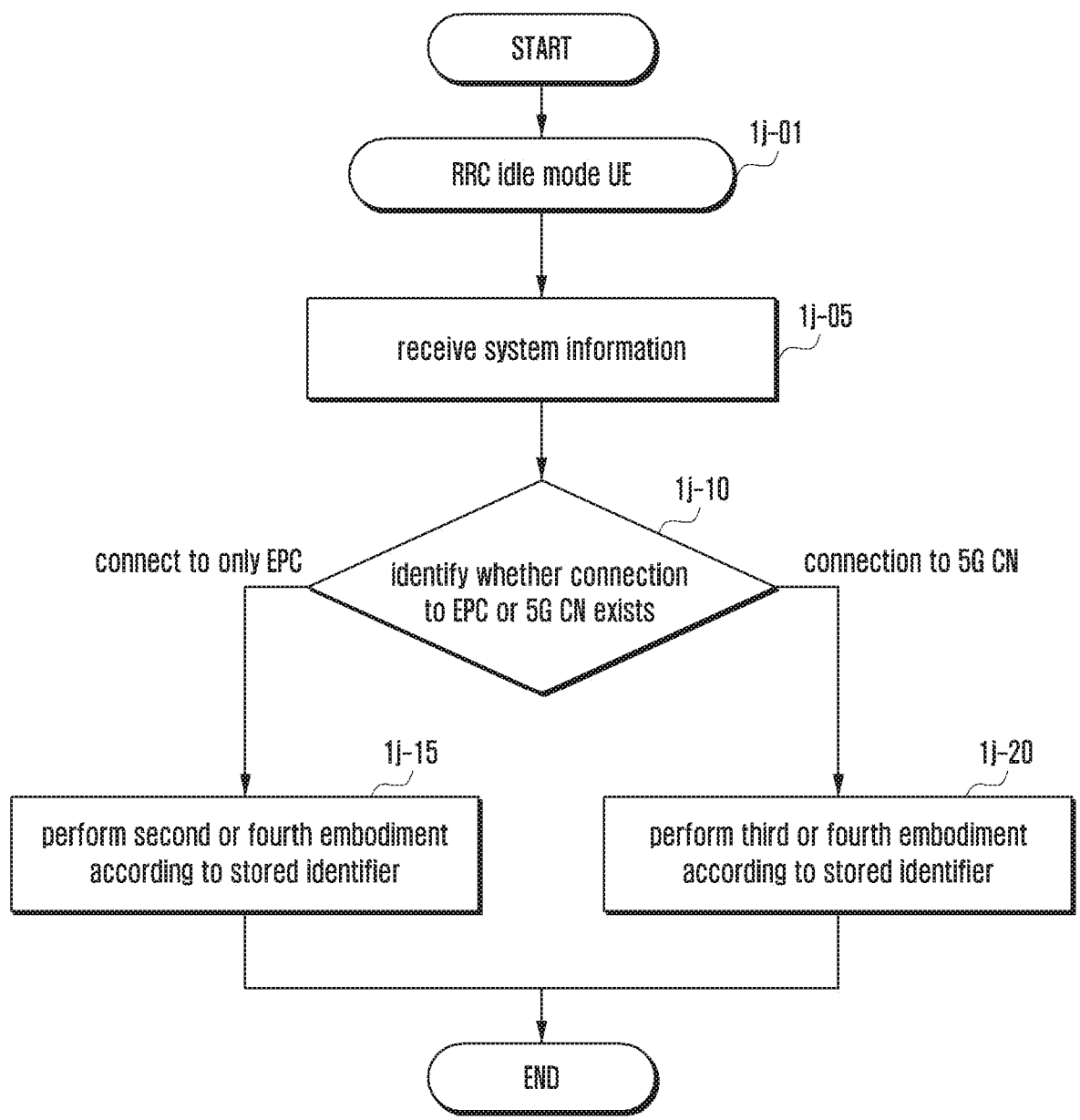
FIG. 1J is a flow diagram illustrating operations of a terminal according to various embodiments of the disclosure.

FIG. 1J is a signal diagram illustrating operations of a terminal according to various embodiments of the disclosure.

Referring to FIG. 1J, when a terminal 1j-01 in the RRC idle mode receives a paging message, needs to update a tracking area, or needs to transmit data in an uplink, the terminal may attempt connection to a network again. The terminal starts discovering a cell first, may perform cell selection/reselection to discover a suitable cell, and may camp on the suitable cell. The terminal is synchronized with the cell that the terminal camps on, and reads system information therefrom in operation 1j-05. The terminal reads the system information, identifies an indicator indicating whether the cell is connected to the 5G CN, and identifies connection relationship between the cell that the terminal currently camps on and the core network in operation 1j-10. When the connection relationship shows that the cell is connected to only the EPC, the terminal performs the first embodiment or the second embodiment of the disclosure, or may perform a procedure of connecting to the network according to the fourth embodiment in operation 1j-15. When the connection relationship shows that the cell is connected to the 5G CN, the terminal performs the first embodiment or the third embodiment of the disclosure, or may perform a procedure of connecting to the network according to the fourth embodiment in operation 1j-20.

Figure 1K:
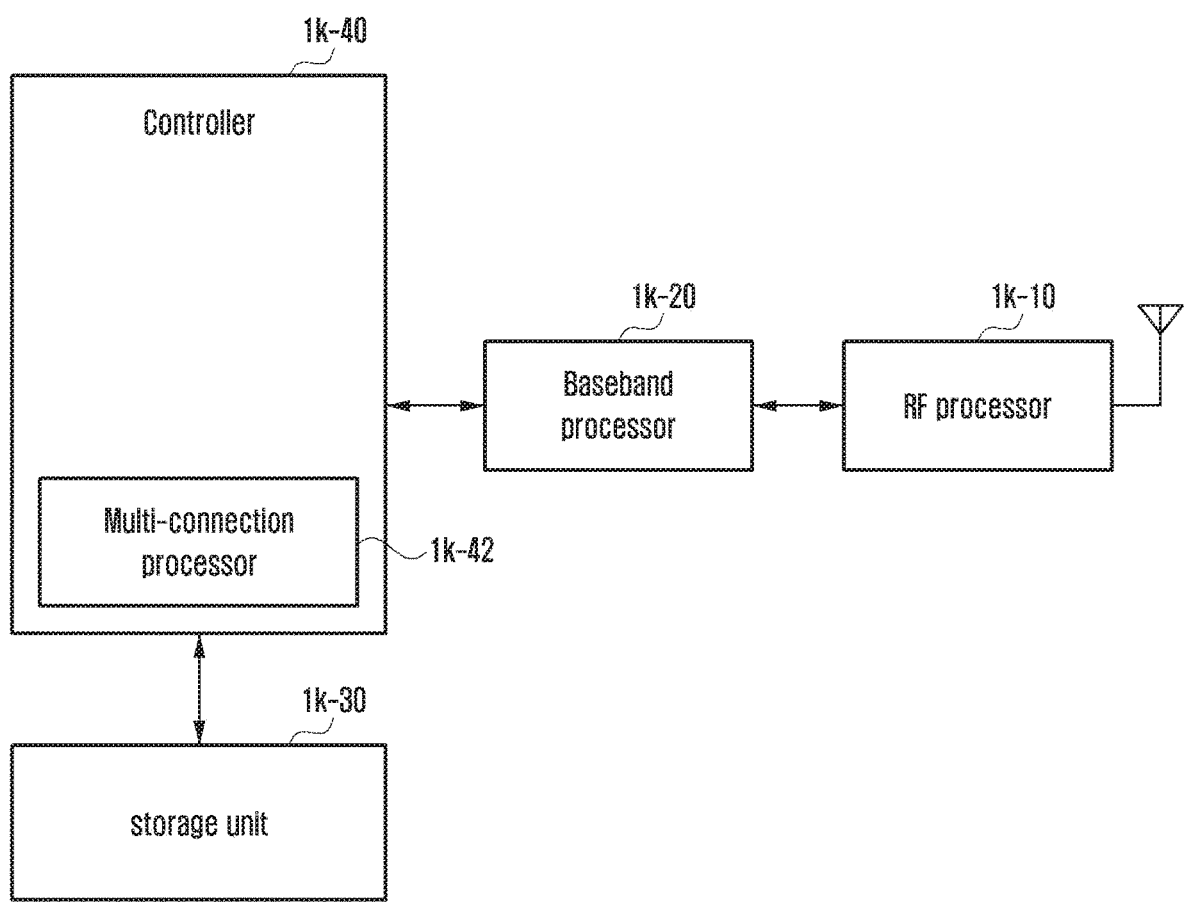
FIG. 1K is a block diagram illustrating a structure of a terminal according to various embodiments of the disclosure.

FIG. 1K is a signal diagram illustrating a structure of a terminal according to various embodiments of the disclosure.

Referring to FIG. 1K, the terminal may include a radio frequency (RF) processor 1k-10, a baseband processor 1k-20, a storage unit 1k-30, and a controller 1k-40.

The RF processor 1k-10 performs a function of transmitting and receiving a signal via a wireless channel, such as band conversion and amplification of a signal. That is, the RF processor 1k-10 up-converts a baseband signal provided from the baseband processor 1k-20 into an RF band signal, transmits the RF band signal via an antenna, and down-converts an RF band signal received via the antenna into a baseband signal. For example, the RF processor 1k-10 may include a transmission filter, a reception filter, an amplifier, a mixer, an oscillator, a digital-to-analog convertor (DAC), an analog-to-digital convertor (ADC), and the like. Although only a single antenna is illustrated in the drawing, the terminal may include a plurality of antennas. In addition, the RF processor 1k-10 may include a plurality of RF chains. Moreover, the RF processor 1k-10 may perform beamforming. For the beamforming, the RF processor 1k-10 may control a phase and a size of each signal transmitted or received via a plurality of antennas or antenna elements. In addition, the RF processor may perform MIMO, and may receive a plurality of layers while performing the MIMO operation. The RF processor 1k-10 may appropriately configure a plurality of antennas or antenna elements according to the control of the controller, so as to perform reception beam sweeping, or may control the orientation of a reception beam and a beam width so that a reception beam accords with a transmission beam.

The baseband processor 1k-20 performs a function for a conversion between a baseband signal and a bitstream according to the physical layer standard of a system. For example, in the case of data transmission, the baseband processor 1k-20 generates complex symbols by encoding and modulating a transmission bitstream. Further, in the case of data reception, the baseband processor 1k-20 reconstructs a reception bitstream by demodulating and decoding a baseband signal provided from the RF processor 1k-10. For example, in the case of data transmission, according to an OFDM (orthogonal frequency division multiplexing) scheme, the baseband processor 1k-20 generates complex symbols by encoding and modulating a transmission bitstream, mapping the complex symbols to subcarriers, and then configures OFDM symbols via an inverse fast fourier transform (IFFT) operation and cyclic prefix (CP) insertion. Further, in the case of data reception, the baseband processor 1k-20 divides a baseband signal provided from the RF processor 1k-10 in the unit of OFDM symbols, reconstructs signals mapped to the subcarriers via a fast fourier transform (FFT) operation, and then reconstructs a reception bitstream via demodulation and decoding.

The baseband processor 1k-20 and the RF processor 1k-10 transmit or receive a signal, as described above. Accordingly, the baseband processor 1k-20 and the RF processor 1k-10 may be referred to as a transmitter, a receiver, a transceiver, or a communication unit. In addition, at least one of the baseband processor 1k-20 and the RF processor 1k-10 may include a plurality of communication modules so as to support many different radio access technologies. In addition, at least one of the baseband processor 1k-20 and the RF processor 1k-10 may include different communication modules to process signals of different frequency bands. For example, the different radio access technologies may include an LTE network, an NR network, and the like. Further, the different frequency bands may include a super high frequency (SHF) (e.g., 2.2 GHz and 5 GHz) band and a millimeter (mm) wave (e.g., 60 GHz) band.

The storage unit 1k-30 stores data, such as a basic program, an application program, and setting information for the operation of the terminal. The storage unit 1k-30 may provide stored data in response to a request from the controller 1k-40.

The controller 1k-40 may include a multi-connection processor 1k-42 and may control the overall operation of the terminal. For example, the controller 1k-40 transmits or receives a signal via the baseband processor 1k-20 and the RF processor 1k-10. In addition, the controller 1k-40 writes and reads data to/from the storage unit 1k-40. To this end, the controller 1k-40 may include at least one processor. For example, the controller 1k-40 may include a communication processor (CP) that performs control for communication, and an application processor (AP) that controls a higher layer, such as an application program. The controller 1k-40 and the transceiver 1k-10 and 1k-20 may not need to be configured as separate modules, and may be configured as a single component, such as a single chip. The controller 1k-40 and the transceiver 1k-10 and 1k-20 may be electrically connected. For example, the controller 1k-40 may be a circuit, an application-specific circuit, or at least one processor. In addition, the operations of the terminal may be implemented by including a memory device storing corresponding program codes in a component of the terminal.

Figure 1L:
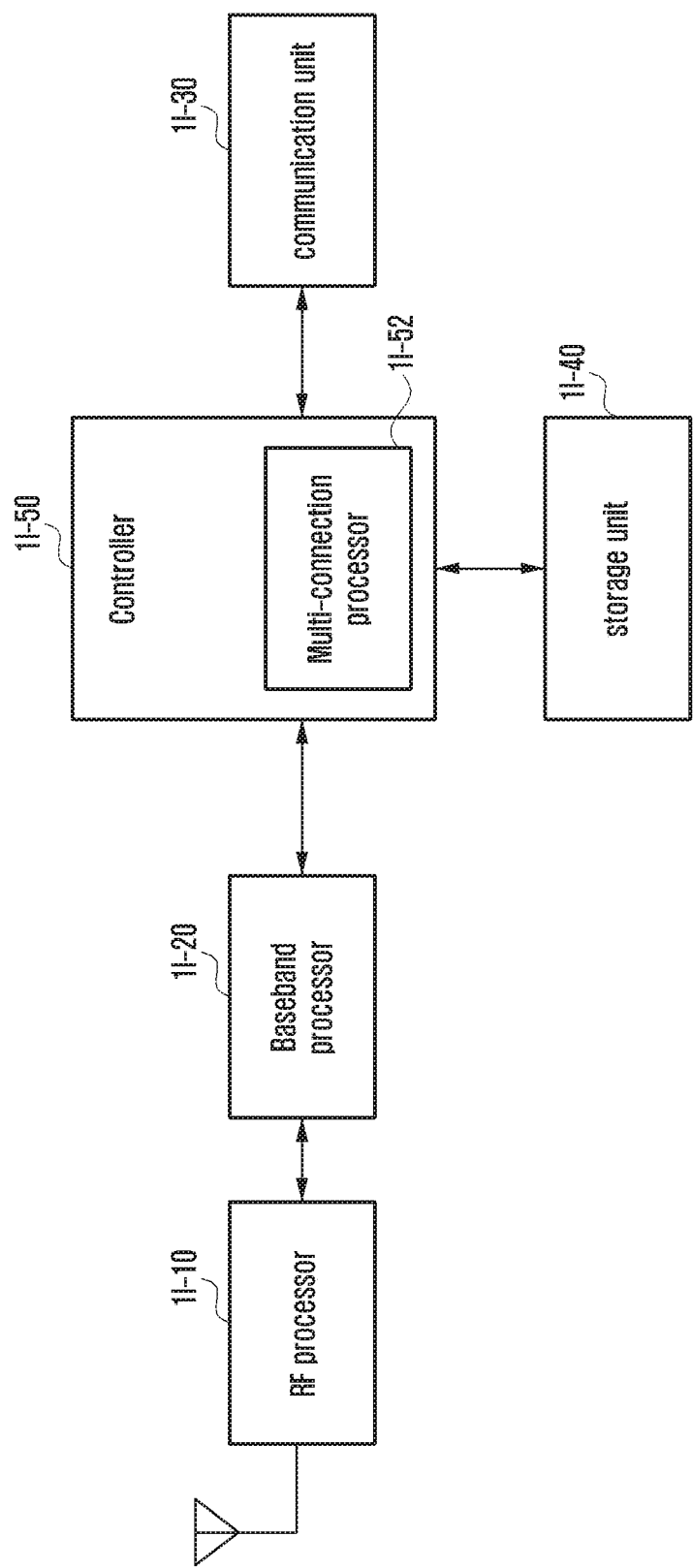
FIG. 1L is a block diagram illustrating a structure of a base station TRP in a wireless communication system according to various embodiments of the disclosure.

FIG. 1L is a block diagram illustrating a structure of a base station TRP in a wireless communication system according to various embodiments of the disclosure.

Referring to FIG. 1L, the base station may include an RF processor 1l-10, a baseband processor 1l-20, a backhaul communication unit 1l-30, a storage unit 1l-40, and a controller 1l-50.

The RF processor 1l-10 performs a function for transmitting or receiving a signal via a wireless channel, such as band conversion and amplification of a signal. For example, the RF processor 1l-10 up-converts a baseband signal provided from the baseband processor 1l-20 into an RF band signal and then transmits the converted signal via an antenna, and down-converts an RF band signal received via the antenna into a baseband signal. For example, the RF processor 1l-10 may include a transmission filter, a reception filter, an amplifier, a mixer, an oscillator, a DAC, and an ADC. Although only a single antenna is illustrated in the drawing, a first access node may include a plurality of antennas. In addition, the RF processor 1l-10 may include a plurality of RF chains. Moreover, the RF processor 1l-10 may perform beamforming. For the beamforming, the RF processor 1l-10 may control a phase and a size of each of the signals transmitted or received via a plurality of antennas or antenna elements. The RF processor may perform a downlink MIMO operation by transmitting one or more layers.

The baseband processor 1l-20 performs a function of converting between a baseband signal and a bit stream according to the physical layer standard of a first radio access technology. For example, in the case of data transmission, the baseband processor 1l-20 generates complex symbols by encoding and modulating a transmission bitstream. Further, in the case of data reception, the baseband processor 1l-20 reconstructs a reception bitstream by demodulating and decoding a baseband signal provided from the RF processor 1l-10. For example, in the case of data transmission, according to an OFDM scheme, the baseband processor 1l-20 may generate complex symbols by encoding and modulating a transmission bitstream, map the complex symbols to subcarriers, and then configure OFDM symbols via an IFFT operation and CP insertion. In addition, in the case of data reception, the baseband processor 1l-20 divides a baseband signal provided from the RF processor 1l-10 in units of OFDM symbols, reconstructs signals mapped to sub-carriers via an FFT operation, and then reconstructs a reception bit string via demodulation and decoding. The baseband processor 1l-20 and the RF processor 1l-10 transmit or receive a signal, as described above. Accordingly, the baseband processor 1l-20 and the RF processor 1l-10 may be referred to as a transmitter, a receiver, a transceiver, a communication unit, or a wireless communication unit.

The communication unit 1l-30 provides an interface for performing communication with other nodes in a network.

The storage unit 1l-40 may store data, such as, a basic program, an application program, configuration information, or the like, for the operation of main base station. Particularly, the storage unit 1l-40 may store information associated with a bearer allocated to a connected terminal, a measurement result reported from a connected terminal, and the like.

In addition, the storage unit 1l-40 may store information which is a criterion to determine whether to provide or interrupt multiple-access to a terminal. The storage unit 1l-40 may provide stored data in response to a request from the controller 1l-50.

The controller 1l-50 may include a multi-connection processor 1l-52 and may control the overall operation of the main base station. For example, the controller 1l-50 transmits or receives a signal via the baseband processor 1l-20 and the RF processor 1l-10, or via the backhaul communication unit 1l-30. In addition, the controller 1l-50 writes and reads data to/from the storage unit 1l-40. To this end, the controller 1l-50 may include at least one processor. The controller 1l-50 and the transceiver 1l-10 and 1l-20 may not need to be configured as separate modules, and may be configured as a single component, such as a single chip. The controller 1l-50 and the transceiver 1l-10 and 1l-20 may be electrically connected. For example, the controller 1l-50 may be a circuit, an application-specific circuit, or at least one processor. In addition, the operations of the base station may be implemented by including a memory device storing corresponding program codes in a component of the base station.

Embodiment B

Figure 2A:
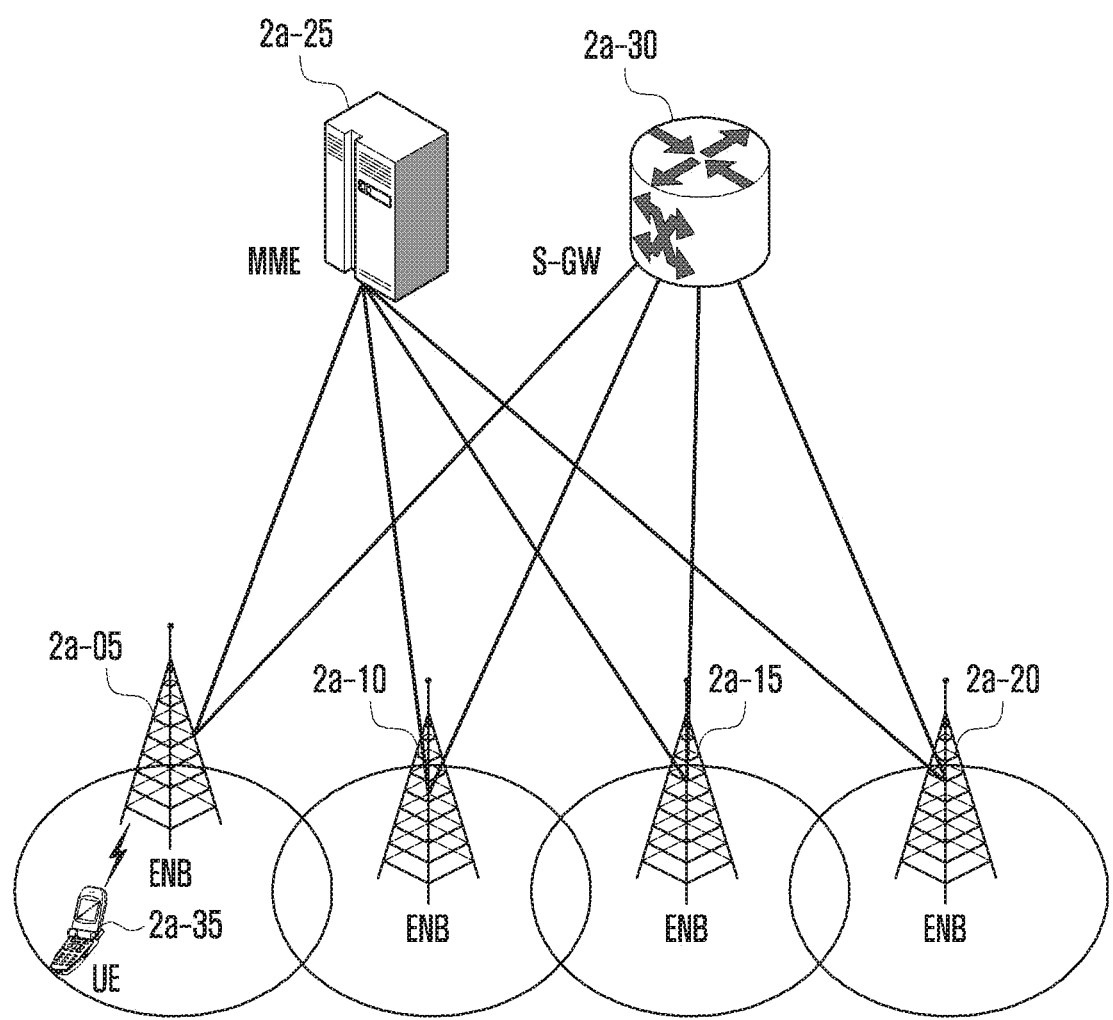
FIG. 2A is a diagram illustrating a structure of an LTE system according to various embodiments of the disclosure.

FIG. 2A is a diagram illustrating a structure of an LTE system according to various embodiments of the disclosure.

Referring to FIG. 2A, as illustrated in the drawings, a radio access network of an LTE system is configured with next generation base stations (an evolved node B (ENB), a Node B, or a base station) 2a-05, 2a-10, 2a-15, and 2a-20, a mobility management entity (MME) 2a-25, and a serving-gateway (S-GW) 2a-30. A user equipment (UE) (or a terminal) 2a-35 may access an external network via the ENB 2a-05 to 2a-20, and the S-GW 2a-30.

In FIG. 2A, the ENB 2a-05 to 3a-20 corresponds to a legacy node B in a UMTS system. An ENB is connected to the UE 2a-35 via a wireless channel, and performs a more complicated role than a legacy node B. In the LTE system, real-time services, such as a voice over IP (VoIP) via an Internet protocol, and all user traffic are provided via a shared channel. Accordingly, there is a desire for a device that performs scheduling by collecting state information of UEs, such as a buffer state, an available transmission power state, a channel state, and the like, and the ENB 2a-05 to 2a-20 may be in charge of scheduling. One ENB generally controls a plurality of cells. In order to implement a transmission rate of 100 Mbps, the LTE system uses an OFDM as a wireless access technology in a bandwidth of 20 MHz. In addition, an AMC scheme that determines a modulation scheme and a channel coding rate may be applied based on the channel state of a UE. The S-GW 2a-30 is a device for providing a data bearer, and generates or removes the data bearer according to the control of the MME 2a-25. An MME is a device that is in charge of various control functions in addition to a mobility management function associated with a UE, and may be connected to a plurality of base stations.

Figure 2B:
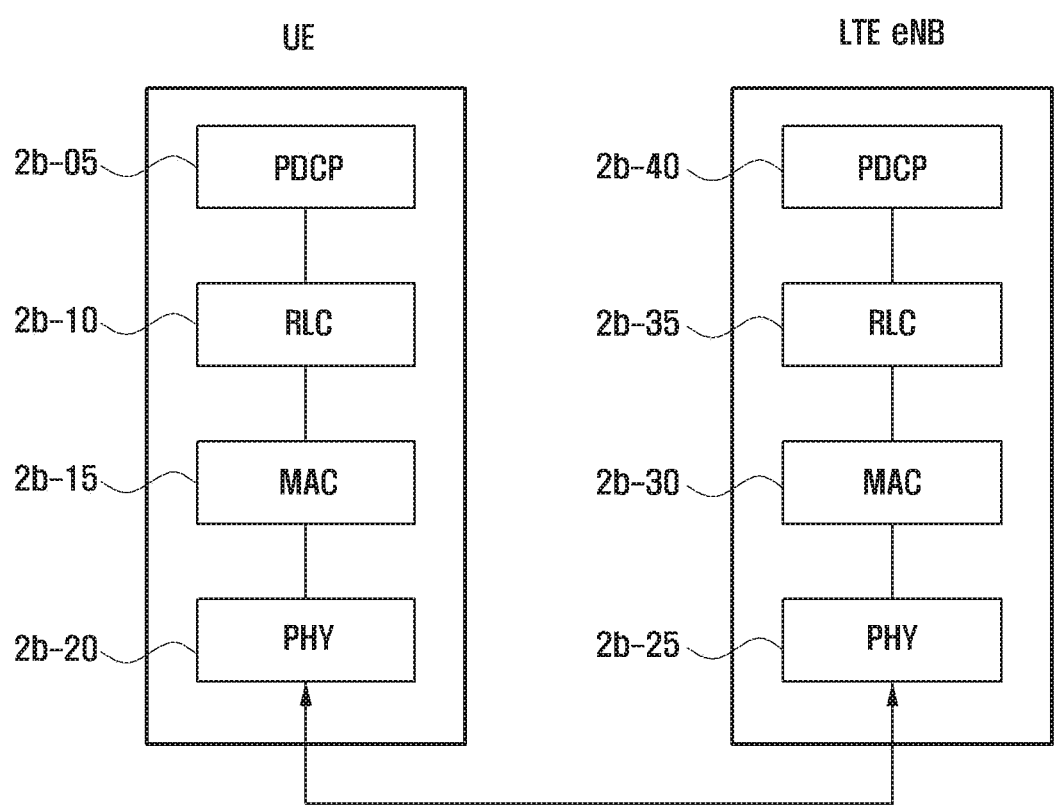
FIG. 2B is a diagram illustrating a structure of a radio protocol in an LTE system according to various embodiments of the disclosure.

FIG. 2B is a diagram illustrating a structure of a radio protocol in an LTE system according to various embodiments of the disclosure.

Figure 2C:
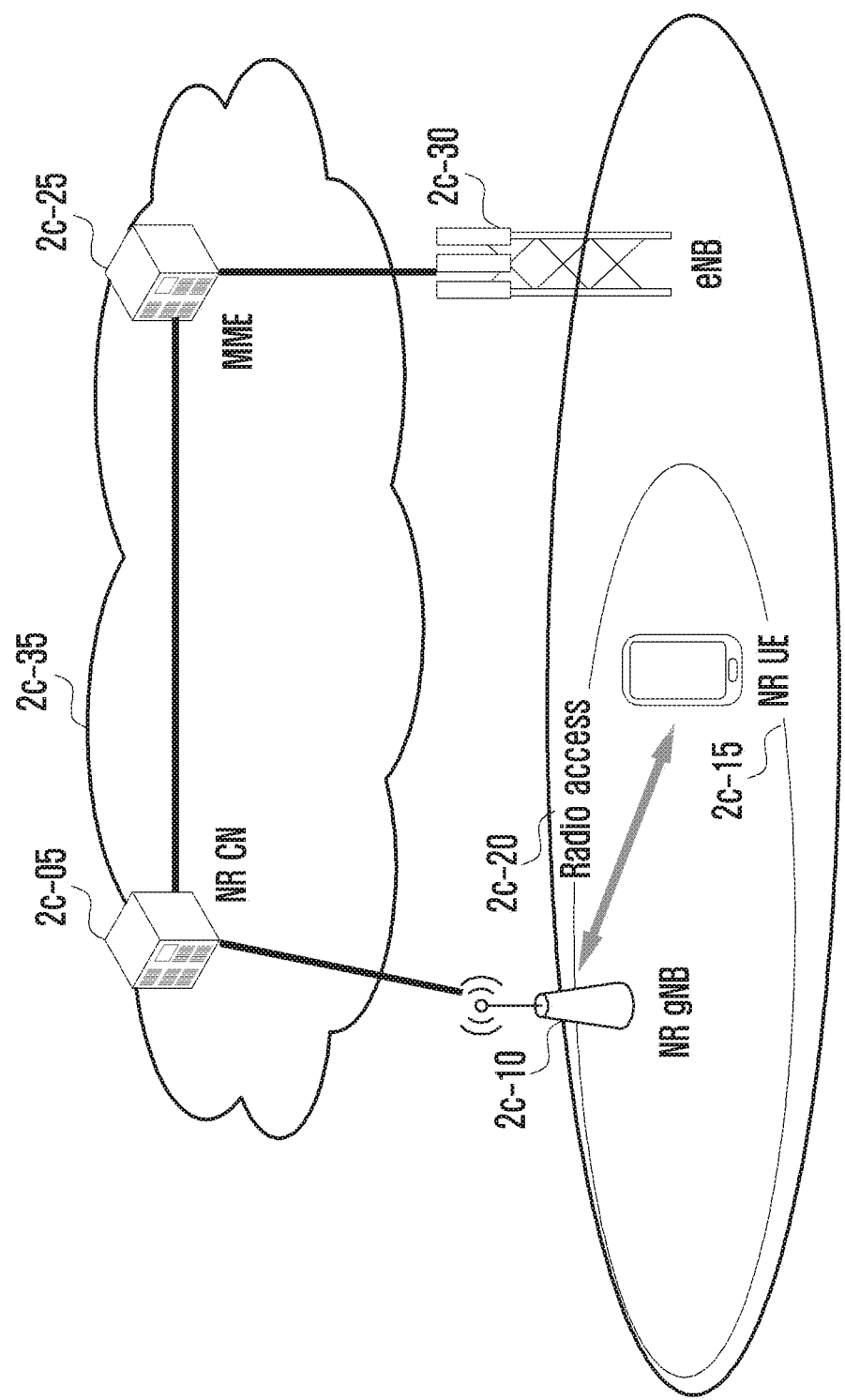
FIG. 2C is a diagram illustrating a structure of a next generation mobile communication system according to various embodiments of the disclosure.

Referring to FIG. 2B, the radio protocol of the LTE system includes a PDCP 2b-05 and 2b-40, a RLC 2b-10 and 2b-35, a medium access control (MAC) 2b-15 and 2b-30 for each of a UE and an ENB. The PDCP 2b-05 and 2b-40 may take charge of IP header compression/decompression, or the like. The main functions of a PDCP may be summarized as follows:

Header compression and decompression: ROHC only
Transfer of user data
In-sequence delivery (in-sequence delivery of upper layer PDUs at PDCP re-establishment procedure for RLC AM)
Reordering (for split bearers in DC (only support for RLC AM)): PDCP PDU routing for transmission and PDCP PDU reordering for reception)
Duplicate detection (duplicate detection of lower layer SDUs at PDCP re-establishment procedure for RLC AM)
Retransmission (retransmission of PDCP SDUs at handover and, for split bearers in DC, of PDCP PDUs at PDCP data-recovery procedure, for RLC AM)
Ciphering and deciphering
Timer-based SDU discard (Timer-based SDU discard in uplink)
A RLC 2b-10 and 2b-35 reconfigures a PDCP packet data unit (PDU) into an appropriate size, and performs ARQ or the like. The main functions of an RLC may be summarized as follows:
Transfer of data (transfer of upper layer PDUs)
ARQ (error correction through ARQ (only for AM data transfer))
Concatenation, segmentation, and reassembly (concatenation, segmentation and reassembly of RLC SDUs (only for UM and AM data transfer))
Re-segmentation (re-segmentation of RLC data PDUs (only for AM data transfer))
Reordering (reordering of RLC data PDUs (only for UM and AM data transfer)
Duplicate detection (duplicate detection (only for UM and AM data transfer))
Error detection (protocol error detection (only for AM data transfer))
RLC SDU discard (RLC SDU discard (only for UM and AM data transfer))
RLC re-establishment
The MAC 2b-15 and 2b-30 is connected to various RLC layer devices configured for one UE, and performs multiplexing of RLC PDUs to a MAC PDU and demultiplexing of RLC PDUs from a MAC PDU. The main functions of a MAC may be summarized as follows:
Mapping (mapping between logical channels and transport channels)
Multiplexing and demultiplexing (multiplexing/demultiplexing of MAC SDUs belonging to one or different logical channels into/from transport blocks (TB) delivered to/from the physical layer on transport channels)
Scheduling information reporting
HARQ (error correction through HARQ)
Priority handling between logical channels (priority handling between logical channels of one UE)
Priority handling between UEs (priority handling between UEs by means of dynamic scheduling)
MBMS service identification
Transport format selection
Padding
A PHY layer 2b-20 and 2b-25 performs an operation of channel-coding and modulating higher layer data to produce an OFDM symbol and transmitting the OFDM symbol to a wireless channel, or demodulating and channel-decoding an OFDM symbol received via a wireless channel and transmitting the demodulated and channel-decoded OFDM symbol to a higher layer.
FIG. 2C is a diagram illustrating a structure of a next generation mobile communication system according to various embodiments of the disclosure.

Referring to FIG. 2C, as illustrated in the drawing, a radio access network of the next generation mobile communication system (NR or2g) may be configured with a next generation base station (new radio node B (NR gNB or NR base station) 2c-10 and a new radio core network (NR CN) 2c-05. A new radio user equipment (NR UE or terminal) 2c-15 may access an external network 2c-35 via the NR gNB 2c-10 and the NR CN 2c-05.

In FIG. 2C, the NR gNB 2c-10 may correspond to an evolved Node B (eNB) in the legacy LTE system. An NR gNB is connected to the NR UE 2c-15 via a wireless channel, and may provide a better service compared to the legacy nodeB. In the next generation mobile communication system, all user traffics are serviced via a shared channel and thus, a device that collects status information of UEs such as a buffer status, an available transmission power status, a channel status or the like, and performs scheduling is needed, and the NR NB 2c-10 takes charge of the same. One NR gNB generally controls a plurality of cells. In order to implement high-speed data transmission when compared to the legacy LTE, a bandwidth greater than or equal to the legacy maximum bandwidth may be needed, and an orthogonal frequency division multiplexing (OFDM) may be used as a radio access technology, and beamforming technology may be additionally used. Also, an adaptive modulation & coding (AMC) scheme that determines a modulation scheme and a channel coding rate may be applied based on the channel state of a UE. The NR CN 2c-05 supports mobility, configures a bearer, or configures QoS. An NR CN is a device that is in charge of various control functions in addition to a mobility management function associated with a UE, and may be connected to a plurality of base stations. Also, the next generation mobile communication system may interoperate with the legacy LTE system, and an NR CN may be connected to the MME 2c-25 via a network interface. The MME is connected to an eNB 2c-30 which is a legacy base station.

Figure 2D:
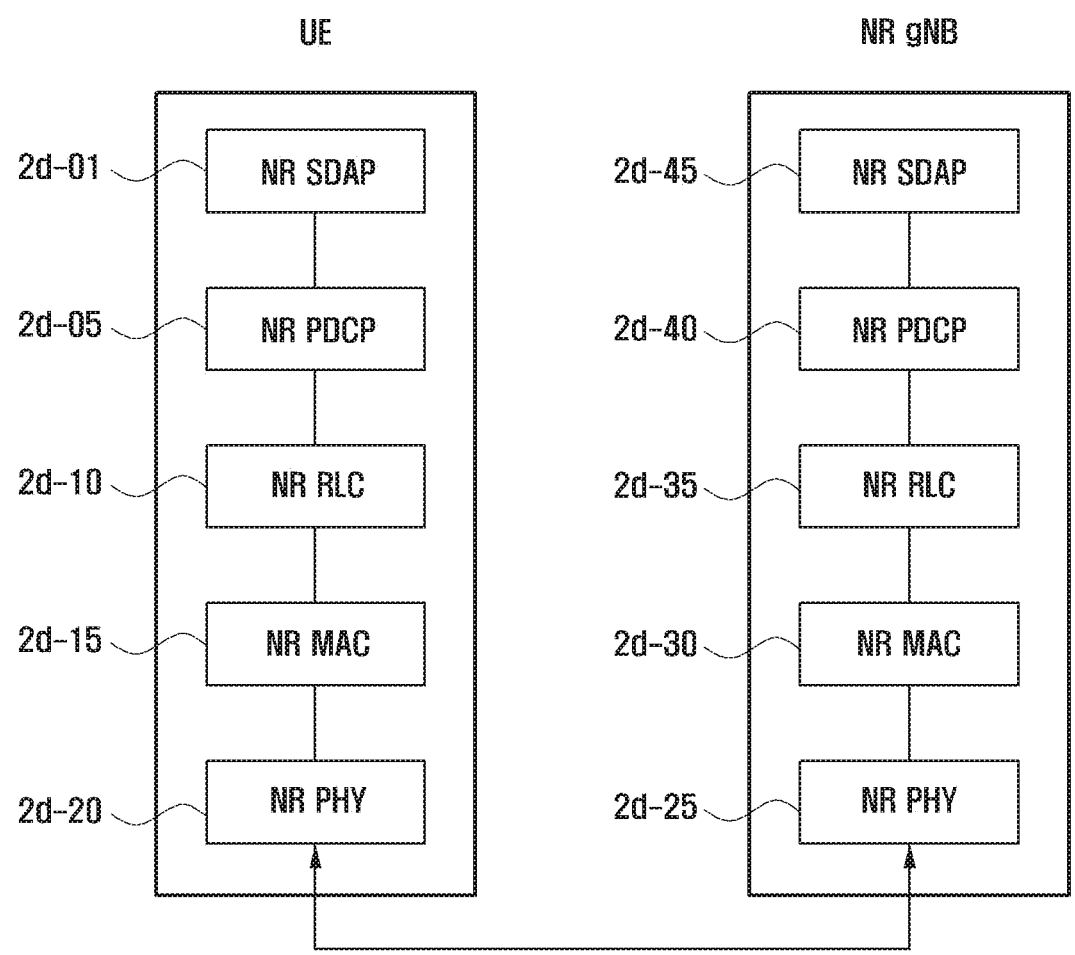
FIG. 2D is a diagram illustrating a structure of a radio protocol in a next generation mobile communication system according to various embodiments of the disclosure.

FIG. 2D is a diagram illustrating a structure of a radio protocol in a next generation mobile communication system according to various embodiments of the disclosure.

Referring to FIG. 2D, the radio protocol of the next generation mobile communication system is configured with an NR SDAP 2d-01 and 2d-45, an NR PDCP 2d-05 and 2d-40, an NR RLC 2d-10 and 2d-35, and an NR MAC 2d-15 and 2d-30 for each of a UE and an NR base station.

The main functions of the NR SDAP 2d-01 and 2d-45 may include a part of the functions as follows:
Transfer of user data (transfer of user plane data)
Mapping between a QoS flow and a DRB for both DL and UL
Marking QoS flow ID for both DL and UL (marking QoS flow ID in both DL and UL packets)
Mapping a reflective QoS flow to DRB for UL SDAP PDUs (reflective QoS flow to DRB mapping for the UL SDAP PDUs)

A UE may receive, via an RRC message, a configuration associated with whether to use a header of the SDAP layer device or whether to use a function of the SDAP layer device, for each PDCP layer device, or for each bearer, or for each logical channel. When a SDAP header is configured, the UE is directed, by a one-bit NAS reflective QoS indicator (NAS reflective QoS) and a one-bit AS reflective QoS indicator (AS reflective QoS), to update or reconfigure mapping information between a data bearer and a QoS flow of an uplink and a downlink. The SDAP header may include QoS flow ID information indicating QoS. The QoS information may be used as data processing priority for supporting smooth services, scheduling information or the like.

The main functions of the NR PDCP 2d-05 and 2d-40 may include a part of the functions as follows:
Header compression and decompression: ROHC only
Transfer of user data
In-sequence delivery (in-sequence delivery of upper layer PDUs)
Out-of-sequence delivery (out-of-sequence delivery of upper layer PDUs)
Reordering (PDCP PDU reordering for reception)
Duplicate detection (duplicate detection of lower layer SDUs)
Retransmission (retransmission of PDCP SDUs)
Ciphering and deciphering
Timer-based SDU discard (timer-based SDU discard in uplink)

The reordering function of the NR PDCP device may indicate a function of reordering PDCP PDUs received from a lower layer sequentially according to a PDCP SN. The reordering function may include a function of sequentially transferring reordered data to a higher layer, may include a function of immediately transferring data without considering order, may include a function of performing reordering and recording lost PDCP PDUs, may include a function of reporting the states of lost PDCP PDUs to a transmission side, and may include a function of requesting retransmission of lost PDCP PDUs.

The main functions of the NR RLC 2d-10 and 2d-35 may include a part of the functions as follows:
Transfer of data (transfer of upper layer PDUs)
In-sequence delivery (in-sequence delivery of upper layer PDUs)
Out-of-sequence delivery (out-of-sequence delivery of upper layer PDUs)
ARQ (error correction through ARQ)
Concatenation, segmentation, and reassembly (concatenation, segmentation and reassembly of RLC SDUs)
Re-segmentation (re-segmentation of RLC data PDUs)
Reordering (reordering of RLC data PDUs)
Duplicate detection
Error detection (protocol error detection)
RLC SDU discard
RLC re-establishment The in-sequence delivery function of the NR RLC device may indicate a function of sequentially transferring RLC SDUs, received from a lower layer, to a higher layer. The in-sequence delivery function may include a function of reassembling RLC SDUs, which are segmented from an originally single RLC SDU, and transferring an RLC SDU, may include a function of reordering received RLC PDUs based on an RLC sequence number (SN) or PDCP sequence number (SN), may include a function of performing reordering and recording lost RLC PDUs, may include a function of reporting the states of lost RLC PDUs to a transmission side, may include a function of requesting retransmission of lost RLC PDUs, may include a function of sequentially transferring, to a higher layer, only RLC SDUs before a lost RLC SDU if a lost RLC SDU exists, may include a function of sequentially transferring, to a higher layer, all RLC SDU received before a timer starts if the timer expires although a lost RLC SDU exists, or may include a function of sequentially transferring, to a higher layer, all RLC SDUs received up to date, if a predetermined timer expires, although a lost RLC SDU exists. The RLC PDUs may be processed in order of arrival (irrespective of a sequence number) and may be transferred to a PDCP device randomly (out-of sequence delivery). In the case of segments, a single RLC PDU is reconfigured by receiving segments which are stored in a buffer or are to be received in the future, and the RLC PDU may be transferred to the PDCP device. The NR RLC layer may not include a concatenation function, and the function may be performed by the NR MAC layer or may be replaced with the multiplexing function of the NR MAC layer.

The out-of-sequence deliver function of the NR RLC device may indicate a function of immediately transferring RLC SDUs, received from a lower layer, to a higher layer in any order. The out-of sequence delivery function may include a function of reassembling RLC SDUs which are segmented from an originally single RLC SDU, and transferring an RLC SDU, and may include a function of storing an RLC SN or PDCP SN of received RLC PDUs, performing reordering, and recording lost RLC PDUs.

The NR MAC 2d-15 and 2d-30 may be connected to a plurality of NR RLC layer devices configured for a single UE, and the main functions of the NR MAC may include a part of the functions as follows:
Mapping (mapping between logical channels and transport channels)
Multiplexing/demultiplexing (multiplexing/demultiplexing of MAC SDUs)
Scheduling information reporting
HARQ (error correction through HARQ)
Priority handling between logical channels (priority handling between logical channels of one UE)
Priority handling between UEs (priority handling between UEs by means of dynamic scheduling)
MBMS service identification
Transport format selection
Padding An NR PHY layer 2d-20 and 2d-25 performs an operation of channel-coding and modulating higher layer data to produce an OFDM symbol and transmitting the OFDM symbol to a wireless channel, or demodulating and channel-decoding an OFDM symbol received via a wireless channel and transmitting the demodulated and channel-decoded OFDM symbol to a higher layer.

In the disclosure, the 5G core network (5G CN) of the next generation mobile communication system may register a terminal with the network, and allocate a unique identifier (e.g., 5G-GUTI) to the terminal. The disclosure provides a procedure in which a terminal connects to a cell or a base station using a part (e.g., lower 48 bits, 5G-S-TMSI) of the unique identifier in an RRC idle mode, and a procedure of effectively performing contention resolution. In addition, when a base station changes the state of a terminal to an RRC inactive mode, the base station may allocate, to the terminal, a terminal identifier (e.g., I-RNTI) for an inactive mode terminal so that the base station is capable of identifying RRC inactive mode terminals. The disclosure provides a procedure in which a terminal connects to a cell or a base station using a part (e.g., lower 48 bits, 5G-S-TMSI) of the unique identifier in an RRC inactive mode, and a procedure of effectively performing contention resolution. The size of the terminal identifier for an inactive mode terminal may be provided in a predetermined size, for example, a size of 41 bits or 52 bits.

Figure 2E:
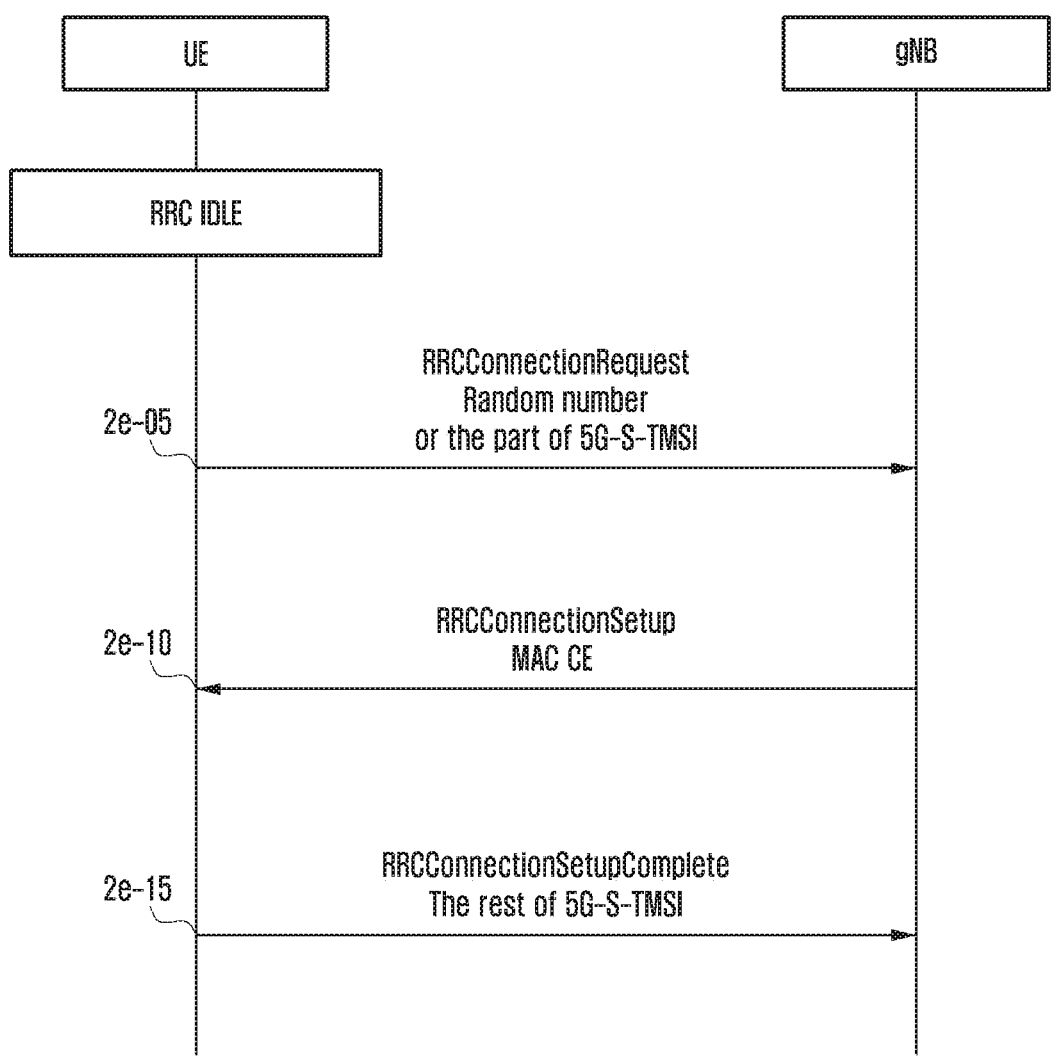
FIG. 2E is a signal diagram illustrating a method in which a radio resource control (RRC) idle terminal sets up connection to a next generation communication system network according to various embodiments of the disclosure.

FIG. 2E is a signal diagram illustrating a method in which an RRC idle terminal sets up connection to a next generation communication system network according to various embodiments of the disclosure.

The next generation mobile communication system may introduce an identifier having a large space as a unique identifier (5G-GUTI) to be allocated to a terminal, in order to identify and manage a larger number of wireless communication devices, and to support connection to a network.

In the disclosure, since a message 3 is transmitted to a CCCH, and is important for the terminal to set up connection to the network, coverage is a significantly important issue. The coverage may be increased when data in a size as small as possible is transmitted. Accordingly, the disclosure may limit the size of the message 3 to the minimum transport block size, so as to maximize the coverage. For example, the size of the message 3 may be 56 bits. However, as the unique identifier (5G-GUTI) having a large space is used in the disclosure, the terminal may use an NR terminal identifier (e.g., 5G-S-TMSI) having a larger space when accessing a network. That is, when the minimum transport block size is used, the transport block size may be insufficient to include a new NR terminal identifier (e.g., 5G-S-TMSI). Therefore, according to a method provided by the disclosure, when the terminal attempts to connect to the network using the new NR terminal identifier, the terminal uses an indicator of the message 3 so as to indicate that a part of the new NR terminal identifier is included in the message 3 and is transmitted, and to indicate that the remaining part of the new NR terminal identifier is included in a message 5 and is transmitted, so that the base station normally receives the new large NR terminal identifier.

In FIG. 2E, when an RRC idle mode terminal receives a paging message, needs to update a tracking area, or needs to transmit data in an uplink, the terminal may attempt connection to a network again. The terminal starts discovering a cell first, may perform cell selection/reselection to discover a suitable cell, and may camp on the suitable cell. The terminal is synchronized with the cell that the terminal camps on, and performs a random access procedure. In the random access procedure, when the terminal transmits the message 3 (e.g., 56 bits (a MAC header of 8 bits and a CCCH SDU of 48 bits)) to a CCCH, the terminal includes an identifier in the message 3 so that a base station is capable of solving contention (contention resolution) among terminals. In this instance, when the terminal has never accessed the network before and connects to the network for the first time, random values having a predetermined size (e.g., a random value of 40 bits) may be included as an identifier and may be transmitted. However, when the terminal has accessed the network before and has been assigned with a unique identifier (e.g., 5G-GUTI), a part of the unique identifier (e.g., 5G-GUTI) that the NR system has allocated to the terminal is defined as an NR terminal identifier (e.g., 5G-S-TMSI) that enables base stations to identify the UE, and is included and transmitted. However, the size of the NR terminal identifier (e.g., 5G-S-TMSI) may be large, for example, 48 bits, and thus, the terminal may divide the NR terminal identifier (e.g., 5G-S-TMSI) between message 3 and message 5, for transmission to a base station. That is, lower bits (e.g., the lower 40 bits (LSB)) of the NR terminal identifier (e.g., 48 bits, 5G-S-TMSI) that the terminal has been storing may be included in the message 3 (CCCH SDU) and may be transmitted in operation 2e-05. Whether indicators indicating whether a value corresponding to the identifier included in the message 3 is a random value, an LTE terminal identifier (e.g., S-TMSI), or a part of an NR terminal identifier (e.g., a part of 5G-S-TMSI (40-bit LSB)) may be defined and included in the message 3 so that a base station identifies a random value, an LTE terminal identifier (e.g., S-TMSI), or an NR terminal identifier (e.g., 5G-S-TMSI). For example, a 2-bit indicator may be used to indicate each of a random value, an LTE terminal identifier (e.g., S-TMSI), or an NR terminal identifier (e.g., 40-bit LSB of 5G-S-TMSI). In addition, the fact that the part (e.g., 40-bit LSB) of the NR terminal identifier is included in the message 3, indicated by the indicator of the message 3, may indicate that the remaining part (e.g., 8-bit MSB) of the NR terminal identifier may be included in the message 5 and may be transmitted by the terminal. As another example, when the terminal desires to connect to the network using an NR identifier (5G-S-TMSI) having a large size, the terminal may use an indicator of the message 3 to indicate that a part of the NR identifier (5G-S-TMSI) is included in the message 3 and is transmitted. The part of the NR identifier (5G-S-TMSI) may be a combination of, for example, a network identifier and a terminal identifier, according to a predetermined rule, may be defined as a truncated 5G-S-TMSI, and may be used as an identifier having a small size (in this instance, the remaining part of the NR identifier (5G-S-TMSI) may not need to be transmitted via the message 5).

To solve contention, a base station that receives the message 3 may duplicate first 6 bytes (48 bits) of the received message 3 (CCCH SDU), and may include the same in MAC control information (MAC control element, contention resolution MAC CE), and may transmit the same to the terminal via a message 4 in operation 2e-10. The terminal that receives the message 4 may identify contention resolution, and may transmit the message 5 to the base station in operation 2e-15. The terminal may include, in the message 5, the remaining part (e.g., 8-bit MSB) of the NR terminal identifier, remaining after excluding the part of the NR terminal identifier which was included in the message 3 and was transmitted, and may transmit the same. In addition, the terminal may contain the unique identifier (e.g., 5G-GUTI), which has been allocated from the NR system and has been stored by the terminal, in a NAS container (dedicatedInfoNAS) of the message 5, and may transmit the same to the network, so that the network identifies the identifier and identifies the terminal.

The base station may identify the NR terminal identifier (5G-S-TMSI) which is divided between the message 3 and message 5, may identify network information from the message 5, and may route a message of the terminal to the core network. The base station may contain the NAS container information included in the message 5 in a NAS message (e.g., INITIAL CONTEXT REQUEST or SERVICE REQUEST) and may transmit the same to the core network (EPC or 5G CN). When the base station identifies the NR terminal identifier, and identifies that the terminal is a registered terminal and reconnects to request a service, the base station may transmit a SERVICE REQUEST message to the core network. The core network may identify the terminal's unique identifier, that is, the network system (LTE system or NR system) identifies the terminal, may identify context, may include the context in a NAS message (e.g., INITIAL CONTEXT SETUP) to allow the terminal to access, and may transmit the NAS message to the base station. When required, the base station may transmit the message to the terminal. When the base station transmits an RRC Connection Reconfiguration message for RRC connection configuration, the terminal receives the RRC message, receives each bearer configuration information, completes configuration, and transmits an RRC Connection Reconfiguration Complete message to the base station so as to complete connection configuration. When the base station completes configuration of connection to the terminal, the base station transmits a response indicating that initial connection and context setup has been completed to the core network. The terminal completes setup of connection to the network and may exchange data When dividing the NR terminal identifier between messages, the UE may include a lower part (lower 40 bits) of the NR terminal identifier (e.g., 48 bits) in the message 3 and transmit the same, and may include an upper part (upper 8 bits) of the NR terminal identifier (e.g., 48 bits) in the message 5 and transmit the same. The lower part of the NR terminal identifier includes a terminal identifier, and the upper part includes a network identifier. Accordingly, via the division of the NR terminal identifier between messages, a possibility of contention resolution of the message 4 may be improved when the base station desires to solve contention using the message 3.

Figure 2F:
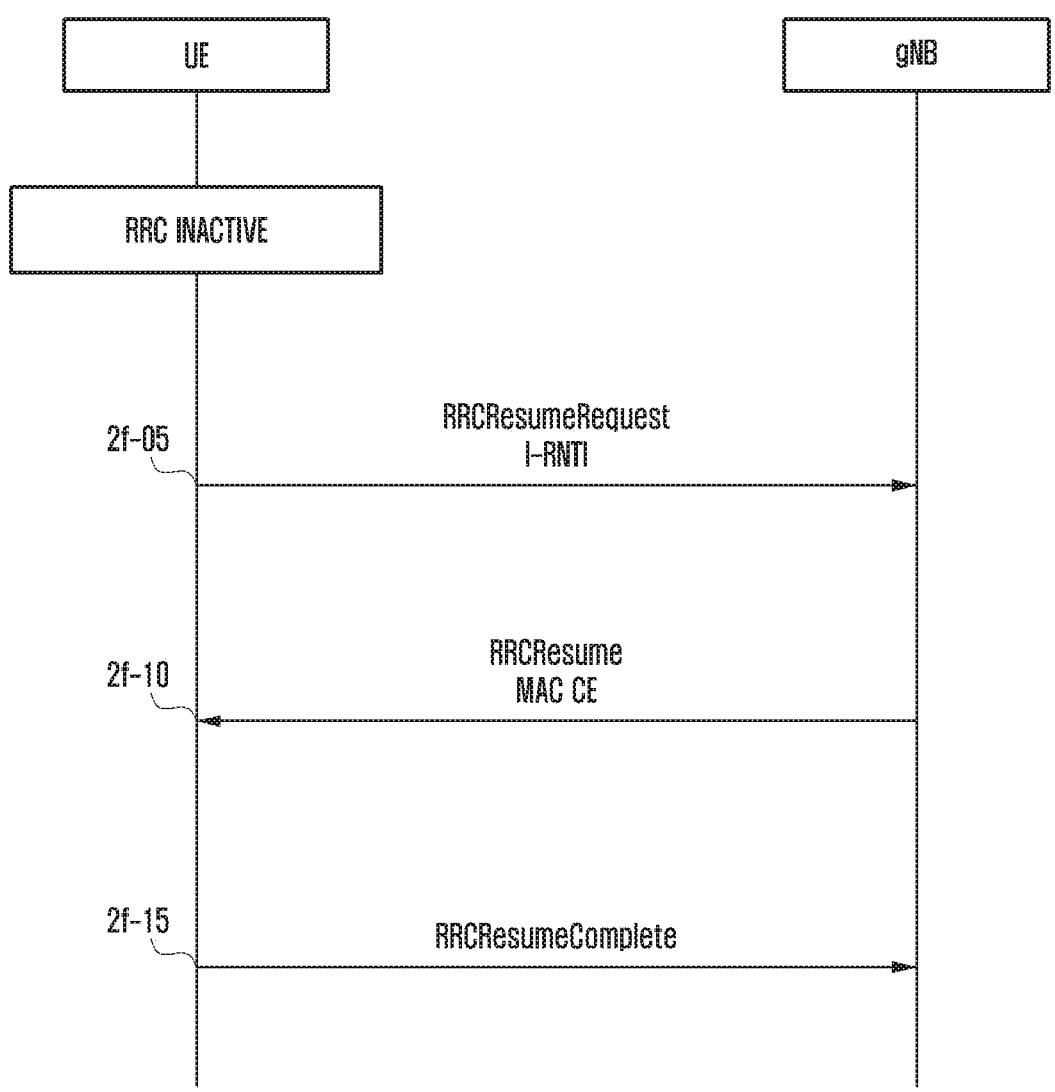
FIG. 2F is a signal diagram illustrating a method in which an RRC inactive terminal sets up connection to a next generation communication system network according to various embodiments of the disclosure.

FIG. 2F is a signal diagram illustrating a method in which an RRC inactive terminal sets up connection to a next generation communication system network according to various embodiments of the disclosure.

The next generation mobile communication system may introduce an identifier having a large space as a unique identifier (5G-GUTI) to be allocated to a terminal, in order to identify and manage a larger number of wireless communication devices, and to support connection to a network. That is, the same may be used as an identifier when a NAS area or a core network identifies a terminal.

In addition, a next generation mobile communication base station may introduce an identifier having a large space as an inactive terminal identifier (e.g., I-RNTI) to be allocated to a terminal, in order to identify and manage a larger number of wireless communication devices, and to support connection to a network. Therefore, to include the inactive terminal identifier which has a large size, the size of a message of RRCResumeRequest transmitted as a message 3 may be defined to have a large size (e.g., 72 bits or 80 bits). That is, the same may be used as an identifier when an access stratum area or base stations identify a terminal.

Referring to FIG. 2F, when an RRC inactive mode (RRC INACTIVE) terminal receives a paging message, needs to update a tracking area, or needs to transmit data in an uplink, the terminal may attempt connection to a network again. The terminal starts discovering a cell first, may perform cell selection/reselection to discover a suitable cell, and may camp on the suitable cell. The terminal is synchronized with the cell that the terminal camps on, and performs a random access procedure. In the random access procedure, when the terminal transmits a message 3 (e.g., 72 or 80 bits) to a CCCH, the terminal may transmit the message 3 by including an identifier in the message 3, so that a base station is capable of solving contention (contention resolution) among terminals. In this instance, when the terminal has accessed the network and has been assigned with an inactive terminal identifier (e.g., I-RNTI) from a base station while changing to the RRC inactive mode, the terminal may include the inactive terminal identifier (I-RNTI) in an RRCResumeRequest message and may transmit the same so that base stations identify the terminal in operation 2f-05. As another example, when the terminal desires to connect to the network using an inactive terminal identifier (I-RNTI) having a large size, the terminal may use an indicator of the message 3 to indicate that a part of the inactive terminal identifier (I-RNTI) is included in the message 3 and is transmitted. The part of the inactive terminal identifier (I-RNTI) may be a combination of, for example, a network identifier and a terminal identifier, according to a predetermined rule, may be defined as a truncated identifier (truncated I-RNTI), and may be used as an identifier having a small size (in this instance, the remaining part of the inactive terminal identifier (I-RNTI) may not need to be transmitted via a message 5). As another example, like the method of connecting to the network using an NR terminal identifier (5G-S-TMSI) of FIG. 2E, FIG. 2F provides a method of transmitting a part of an inactive terminal identifier (I-RNTI) via a message 3, indicating the same, and transmitting the remaining part of the inactive terminal identifier (I-RNTI) via the message 5.

To solve contention, a base station that receives the message 3 may duplicate a first predetermined size (e.g., 6, 7, or 8 bytes) of the received message 3 (CCCH SDU), may include the same in MAC control information (MAC control element, contention resolution MAC CE), and may transmit the same to the terminal via a message 4 in operation 2f-10. The terminal that receives the message 4 may identify contention resolution, and may transmit the message 5 to the base station in operation 2f-15. In addition, the terminal may contain the unique identifier (e.g., 5G-GUTI), which has been allocated from the NR system and has been stored by the terminal, in a NAS container (dedicatedInfoNAS) of the message 5, and may transmit the same to the network, so that the network identifies the identifier and identifies the terminal. In the case in which the terminal performs a connection resumption procedure with respect to the network by transmitting an RRCResumeRequest message including the inactive terminal identifier, and the base station fails to recognize the inactive terminal identifier or fails to retrieve terminal context, when the base station transmits an RRCConnectionSetup message as opposed to an RRCResume message so as to fall back the terminal to an RRC idle mode terminal and to direct the terminal to set up connection like an RRC idle mode terminal, the terminal may contain a unique identifier (e.g., 5G-GUTI), which has been allocated from the NR system of the network and has been stored by the terminal, in a NAS container (dedicatedInfoNAS) of the message 5, and may transmit the same so that the network identifies the identifier and identifies the terminal. In addition, the terminal may contain the unique identifier (e.g., 5G-GUTI) or a part (e.g., lower 48 bits, 5G-S-TMSI (NR terminal identifier)) of the unique identifier in an AS message, as opposed to in the NAS container of the message 5, and transmit the same so that the base station identifies the NR terminal identifier, identifies the terminal, and performs routing. The unique identifier is an identifier identified by the 5G CN, and the NR terminal identifier is an identifier identified by a base station.

The base station may identify an inactive terminal identifier (I-RNTI), may identify network information from the message 5, and may route a message of the terminal to the core network. The base station may contain the NAS container information included in the message 5 in a NAS message (e.g., INITIAL CONTEXT REQUEST or SERVICE REQUEST) and may transmit the same to the core network (EPC or 5G CN). When the base station identifies the NR terminal identifier, and identifies that the terminal is a registered terminal and reconnects to request a service, the base station may transmit a SERVICE REQUEST message to the core network. The core network may identify the terminal's unique identifier, that is, the network system (LTE system or NR system) identifies the terminal, may identify context, may include the context in a NAS message (e.g., INITIAL CONTEXT SETUP) to allow the terminal to access, and may transmit the NAS message to the base station. When required, the base station may transmit the message to the terminal. When the base station transmits an RRC Connection Reconfiguration message for RRC connection configuration, the terminal receives the RRC message, receives each bearer configuration information, completes configuration, and transmits an RRC Connection Reconfiguration Complete message to the base station so as to complete connection configuration. When the base station completes configuration of connection to the terminal, the base station transmits a response indicating that initial connection and context setup has been completed to the core network. The terminal completes setup of connection to the network and may exchange data.

In the disclosure, since the message 3 is transmitted to a CCCH, and is important for the terminal to set up connection to the network, coverage is a significantly important issue. The coverage may be increased when data in a size as small as possible is transmitted. Accordingly, the disclosure may limit the size of the message 3 to the minimum transport block size, so as to maximize the coverage. For example, the size of the message 3 may be 56 bits. However, the disclosure introduces an inactive terminal identifier (I-RNTI) having a large space, and may use the same when an RRC inactive mode terminal connects to a network. That is, when the minimum transport block size is used, the transport block size may be insufficient to include the RRC inactive mode terminal identifier (e.g., I-RNTI). Therefore, when the terminal desires to connect to the network using an inactive terminal identifier, like the method of FIG. 2E by limiting the size of the message 3 to a predetermined size (e.g., 56 bits), as opposed to extending the size of the message 3 as described in FIG. 2F, the terminal uses an indicator of the message 3 to indicate that a part of the inactive terminal identifier is included in the message 3 and is transmitted, and to indicate that the remaining part of the inactive terminal identifier is included in the message 5 and is transmitted, so that the base station normally receives the large inactive terminal identifier. In this instance, an indicator that indicates a random value, an LTE terminal identifier, an NR terminal identifier, or an inactive terminal identifier may be included in the message 3.

In the disclosure, the message 4 may be transmitted from the base station to the terminal as an SRB0 bearer via a CCCH, and the message 4 may include configuration information of SRB1. In addition, the terminal receives the message 4, configures SRB1, and transmits a message 5 to the base station as an SRB1 bearer via a dedicated control channel (DCCH).

In the disclosure, the message structure of RRCConnectionRequest transmitted via the message 3 may include bits indicating a message structure, an identifier (a random value, an LTE terminal identifier, or a part of an NR terminal identifier), an indicator indicating an identifier (indicating whether an identifier is a random value, an LTE terminal identifier, or a part of an NR terminal identifier), a cause of establishment (establishmentCause), a MAC subheader, or the like.

The message structure of RRCResumeRequest transmitted via the message 3 may include bits indicating the message structure, an identifier (a random value, an LTE terminal identifier, a part of an NR terminal identifier, an inactive terminal identifier, or a part of an inactive terminal identifier), an indicator indicating an identifier (indicating whether an identifier is a random value, an LTE terminal identifier, or a part of an NR terminal identifier, an inactive terminal identifier, or a part of an inactive terminal identifier), a cause of reestablishment (resumeCause), a public land mobile network (PLMN) identifier, a short MAC-I for integrity protection and verification, slice information, a MAC subheader, or the like.

In addition, the RRCResumeRequest message may be defined as a message separate from the RRCConnectionRequest message, and may be used. As another example, the RRCResumeRequest message may be defined to be a part of the RRCConnectionRequest message structure so that the RRCResumeRequest message is included in the RRCConnectionRequest message. An indicator may be defined to distinguish the RRCResumeRequest message and the RRCConnectionRequest message, and may be used.

Hereinafter, the disclosure will provide a method of effectively performing contention resolution using the message 4 2e-10 of FIG. 2E and the message 4 2f-10 of FIG. 2F.

Figure 2G:
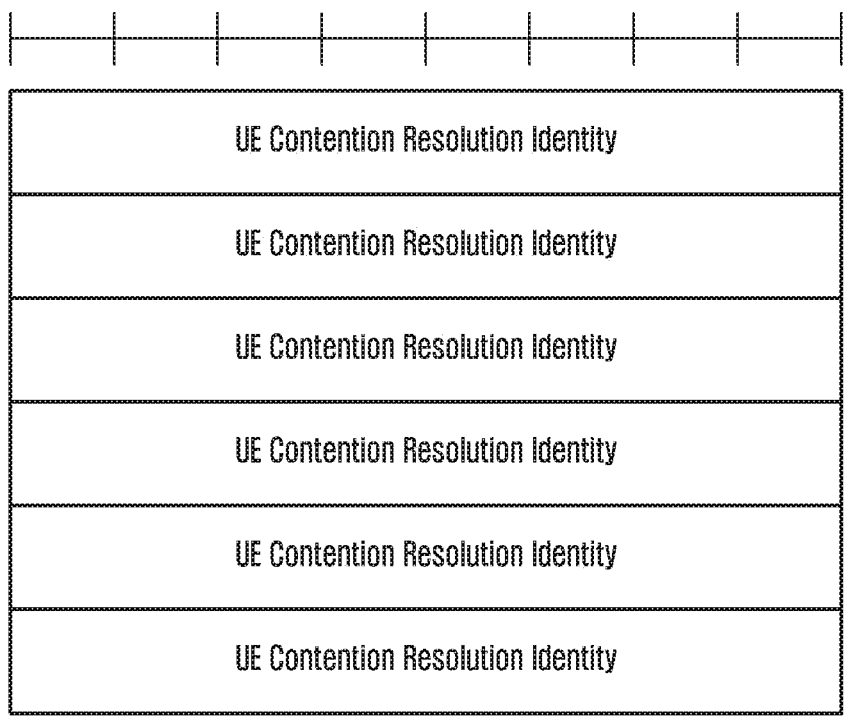
FIG. 2G is a diagram illustrating a first embodiment for effectively performing contention resolution according to various embodiments of the disclosure.

FIG. 2G is a diagram illustrating a first embodiment for effectively performing competition resolution according to various embodiments of the disclosure.

According to the first embodiment of the disclosure, contention resolution identity MAC control information (contention resolution identity MAC control element, CR MAC CE) is defined as shown in diagram 2g-01 of FIG. 2G, the contention resolution identity MAC CE is included in the message 4 2e-10 of FIG. 2E and the message 4 2f-10 of FIG. 2F, and is transmitted, so that the terminal performs contention resolution. The contention resolution identity MAC CE may have a predetermined fixed size, for example, a size of 6 bytes. In addition, the contention resolution identity MAC CE may be defined to be fit for the minimum transport block size (e.g., 56 bits) of a message 3 for supporting the maximum coverage, and may have a predetermined fixed size (e.g., 48 bits excluding a MAC subheader of 8 bits). The contention resolution identity MAC CE may be identified by a logical channel identifier of a MAC subheader, and may be configured as a single field having a predetermined size (e.g., 6 bytes).

The single field having a predetermined size may be defined as a UE contention resolution identity, and may include a data part (UL CCCH SDU) of an uplink common channel of the message 3 that the terminal transmits. The data part (UL CCCH SDU) of the uplink common channel exceeds the size (e.g., 48 bits) of the contention resolution identity MAC CE, the contention resolution identity may include a first predetermined size (e.g., 48 bits, that is, the size of the defined contention resolution identity MAC CE) of the data part (UL CCCH SDU) of the uplink common channel of the message 3. Alternatively, the UE contention resolution identity may include a 48-bit MSB or first 48 bits of the UL CCCH. Since a terminal identifier is included in the front part of the message 3, the contention resolution identity includes the first predetermined size (e.g., 48 bits) to enable the terminal identifier of the message 3 to be included in the predetermined size of the proposed MAC CE, so that contention resolution among terminals may be effectively performed.

Referring to FIG. 2E, when the terminal transmits a random value having a predetermined size or a part (e.g., 40 bits) of an NR terminal identifier using an RRCConnectionRequest (or RRCRequest) message via the message 3, a base station may configure a UE contention resolution identity MAC CE proposed in the first embodiment of the disclosure, may include the same in a message 4, and may transmit the same to the terminal. When the base station configures the UE contention resolution identity MAC CE, an UE contention resolution identity may be configured to include the UL CCCH SDU of the message 3 as it is, which has the same size. When the terminal receives the UE contention resolution identity MAC CE via the message 4, the terminal compares the UE contention resolution identity with the UL CCCH SDU transmitted via the message 3. When they are identical to each other, the terminal determines that contention is solved, and proceeds with a connection setup procedure. That is, the terminal may configure and transmit a message 5 (RRC connection setup complete or RRCSetupComplete). When the terminal receives the contention resolution identity MAC CE via the message 4, and the result of comparison between the UE contention resolution identity and the UL CCCH SDU transmitted via the message 3 shows that they are not identical to each other, the terminal determines that the contention is not solved. That is, the terminal determines that the terminal is not selected by the base station, and resumes a random access procedure within a predetermined period of time or reselects another cell.

As illustrated in FIG. 2F, when the terminal transmits an inactive terminal identifier (e.g., 41-bit I-RNIT) having a predetermined size using an RRCResume Request message via the message 3, a base station may configure a UE contention resolution identity MAC CE proposed in the first embodiment of the disclosure, may include the same in a message 4, and may transmit the same to the terminal. When the UE contention resolution identity MAC CE is configured, RRCResumeRequest may have a large size. Accordingly, a UE contention resolution identity may be configured to include a first predetermined size (e.g., 48 bits) of the UL CCCH SDU of the message 3 (a part remaining after excluding an 8-bit MAC subheader of the message 3). When the terminal receives the UE contention resolution identity MAC CE via the message 4, the terminal compares the UE contention resolution identity with the first predetermined size (e.g., 48 bits) of the UL CCCH SDU transmitted via the message 3. When they are identical to each other, the terminal determines that contention is solved, and proceeds with a connection setup procedure. That is, the terminal may configure and transmit a message 5 (RRC connection setup complete or RRCSetupComplete). When the terminal receives the UE contention resolution identity MAC CE via the message 4, and the result of comparison between the UE contention resolution identity and the first predetermined size (e.g., 48 bits) of the UL CCCH SDU transmitted via the message 3 shows that they are not identical to each other, the terminal determines that the contention is not solved. That is, the terminal determines that the terminal is not selected by the base station, and resumes a random access procedure within a predetermined period of time, or reselects another cell.

Figure 2H:
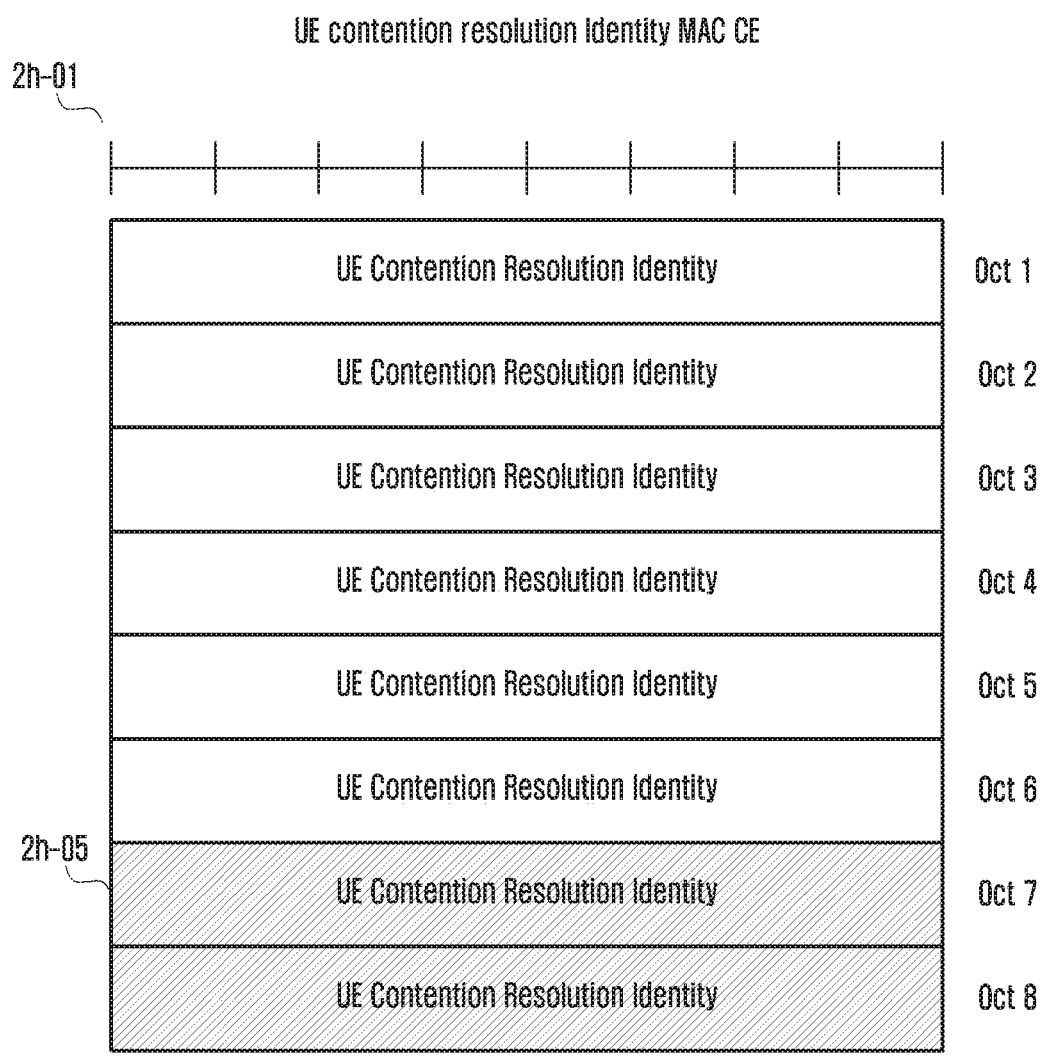
FIG. 2H is a diagram illustrating a second embodiment for effectively performing contention resolution according to various embodiments of the disclosure.

FIG. 2H is a diagram illustrating a second embodiment for effectively performing contention resolution according to various embodiments of the disclosure.

Referring to FIG. 2H, according to the second embodiment of the disclosure, when a contention resolution identity MAC control information (contention resolution identity MAC Control Element, CR MAC CE) is defined as shown in diagram 2h-01 of FIG. 2H, the contention resolution identifier MAC control information may be defined to have a large size as shown in diagram 2h-05. For example, the first embodiment defines the size of the MAC CE to have the minimum transport block size of a message 3, which is a fixed size. However, the second embodiment defines MAC control information to have a predetermined size larger than the minimum transport block size of the message 3. In FIG. 2F, although an RRCResumeRequest message has a large size, the whole UL CCCH SDU of the message 3 may be included as a UE contention resolution identity, and a UE contention resolution identity MAC CE may be transmitted via a message 4. According to the second embodiment of the disclosure, the contention resolution identity MAC CE may be included in the message 4 2e-10 of FIG. 2E and the message 4 2f-10 of FIG. 2F, and may be transmitted, so that the terminal may perform contention resolution. The above-described contention resolution identity MAC CE may have a predetermined fixed size, for example, a size of 8 bytes. In addition, the contention resolution identity MAC CE may be defined to be greater than the minimum transport block size (e.g., 56 bits) of the message 3 and to be fit for the size of an RRCResumeRequest message, and may have a predetermined fixed size (e.g., 64 bits excluding a 8-bit MAC subheader). The contention resolution identity MAC CE may be identified by a logical channel identifier of a MAC subheader, and may be configured as a single field having a predetermined size (e.g., 8 bytes).

The single field having a predetermined size may be defined as a UE contention resolution identity, and may include a data part (UL CCCH SDU) of an uplink common channel of the message 3 that the terminal transmits. The data part (UL CCCH SDU) of the uplink common channel exceeds the size (e.g., 64 bits) of the contention resolution identity MAC CE, the contention resolution identity may include a first predetermined size (e.g., 64 bits, that is, the size of the defined contention resolution identity MAC CE) of the data part (UL CCCH SDU) of the uplink common channel of the message 3. When the data part (UL CCCH SDU) of the uplink common channel is smaller than the size (e.g., 64 bits) of the contention resolution identity MAC CE, the contention resolution identity may include all (e.g., 48 bits) of the data part (UL CCCH SDU) of the uplink common channel of the message 3, and may fill the remaining part (e.g., 16 bits) of the contention resolution identity with paddings. For example, the UE contention resolution identity may include a 64-bit MSB or first 64 bits of the UL CCCH. Since a terminal identifier is included in the front part of the message 3, the contention resolution identity includes the first predetermined size (e.g., 64 bits) to enable the terminal identifier of the message 3 to be included in the predetermined size of the proposed MAC CE, so that contention resolution among terminals may be effectively performed. In addition, when the size of the UL CCCH SDU is smaller than the UE contention resolution identity, paddings are used in order to satisfy the size of the MAC CE, which is a fixed size.

As illustrated in FIG. 2E, when the terminal transmits a random value having a predetermined size or a part (e.g., 40 bits) of an NR terminal identifier using an RRCConnectionRequest (or RRCRequest) message via the message 3, the base station may configure a UE contention resolution identity MAC CE proposed in the second embodiment of the disclosure, may include the same in the message 4, and may transmit the same to the terminal. When the base station configures the UE contention resolution identity MAC CE, the UE contention resolution identity may be configured to include the UL CCCH SDU of the message 3 as it is, which has the same size. When the data part (UL CCCH SDU) of the uplink common channel is smaller than the size (e.g., 64 bits) of the contention resolution identity MAC CE, the contention resolution identity may include all (e.g., 48 bits) of the data part (UL CCCH SDU) of the uplink common channel of the message 3, and may fill the remaining part (e.g., 16 bits) of the contention resolution identity with paddings. When the terminal receives the UE contention resolution identity MAC CE via the message 4, the terminal compares a first predetermined size (e.g., 48 bits or the size of the UL CCCH SDU of the message 3) of the UE contention resolution identity with the UL CCCH SDU transmitted via the message 3. When they are identical to each other, the terminal determines that contention is solved, and proceeds with a connection setup procedure. For example, the terminal may configure and transmit a message 5 (RRC connection setup complete or RRCSetupComplete). When the terminal receives the UE contention resolution identity MAC CE via the message 4, and the result of comparison between the first predetermined size (e.g., 48 bits or the size of the UL CCCH SDU of the message 3) of the UE contention resolution identity and the UL CCCH SDU transmitted via the message 3 shows that they are not identical to each other, the terminal determines that the contention is not solved. That is, the terminal determines that the terminal is not selected by the base station, and resumes a random access procedure within a predetermined period of time, or reselects another cell.

As illustrated in FIG. 2F, when the terminal transmits an inactive terminal identifier (e.g., 41-bit I-RNIT or 52-bit I-RNTI) having a predetermined size using an RRCResumeRequest message via the message 3, the base station may configure a UE contention resolution identity MAC CE proposed in the second embodiment of the disclosure, may include the same in the message 4, and may transmit the same to the terminal. When the UE contention resolution identity MAC CE is configured, RRCResumeRequest may have a large size. Accordingly, a UE contention resolution identity may be configured to include a first predetermined size (e.g., 64 bits) of the UL CCCH SDU of the message 3 (a part remaining after excluding an 8-bit MAC subheader of the message 3). In addition, when the size of the UL CCCH SDU of the RRCResumeRequest message and the size of the UE contention resolution identity are the same, the whole UL CCCH SDU may be included in the UL contention resolution identity. When the terminal receives the UE contention resolution identity MAC CE via the message 4, the terminal compares the UE contention resolution identity with the first predetermined size (e.g., 64 bits) of the UL CCCH SDU transmitted via the message 3 or the whole UL CCCH SDU. When they are identical to each other, the terminal determines that contention is solved, and proceeds with a connection setup procedure. For example, the terminal may configure and transmit the message 5 (RRC connection setup complete or RRCSetupComplete). When the terminal receives the UE contention resolution identity MAC CE via the message 4, and the result of comparison between the UE contention resolution identity and the first predetermined size (e.g., 48 bits) of the UL CCCH SDU transmitted via the message 3 or the whole UL CCCH SDU shows that they are not identical to each other, the terminal determines that the contention is not solved. For example, the terminal determines that the terminal is not selected by the base station, and resumes a random access procedure within a predetermined period of time, or reselects another cell.

Figure 2I:
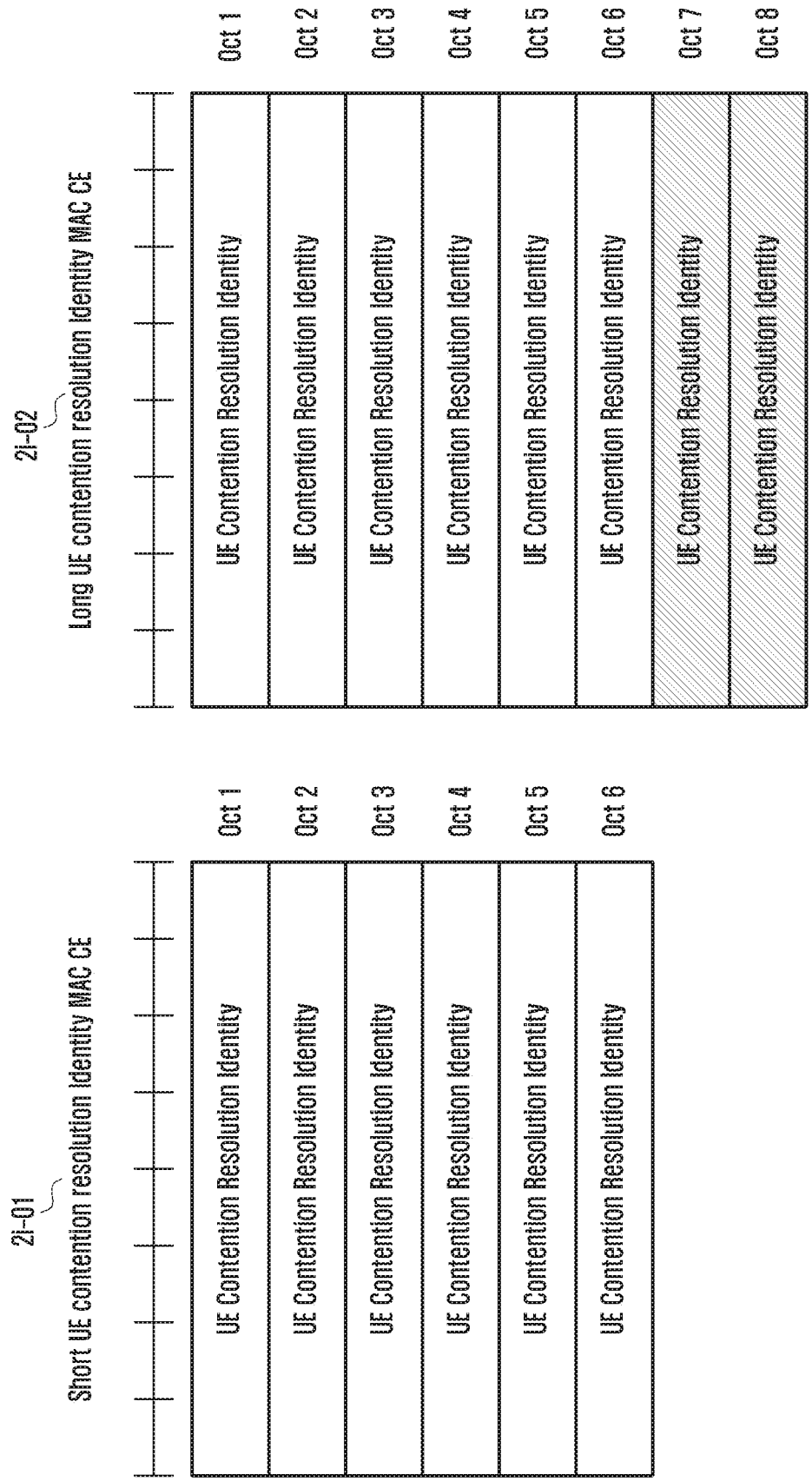
FIG. 2I is a diagram illustrating a third embodiment for effectively performing contention resolution according to various embodiments of the disclosure.

FIG. 2I is a diagram illustrating a third embodiment for effectively performing contention resolution according to various embodiments of the disclosure.

Referring to FIG. 2I, according to the third embodiment of the disclosure, when contention resolution identity MAC control information (contention resolution identity MAC control element, CR MAC CE) is defined as shown in diagrams 2*i*-01 and 2*i*-02 of FIG. 2I, a first MAC CE (short UE contention resolution identity MAC CE) 2*i*-01 is defined to have a fixed size corresponding to the minimum transport block size of the message 3 for supporting the maximum coverage according to the first embodiment of the disclosure, and a second MAC CE (long UE contention resolution identity MAC CE) 2*i*-02 is defined to have a predetermined fixed size greater than the minimum transport block size of the message 3 according to the second embodiment. In this manner, like the RRCResumeRequest message of FIG. 2F, when a message 3 is large, the whole UL CCCH SDU of the message 3 may be included as a UE contention resolution identity using the second MAC CE, and the UE contention resolution identity MAC CE may be transmitted via a message 4. In addition, like the RRCRequest message of FIG. 2E, when the message 3 is small, the whole UL CCCH SDU of the message 3 may be included as a UE contention resolution identity using the first MAC CE, and the UE contention resolution identity MAC CE may be transmitted via the message 4. According to the third embodiment of the disclosure, the first contention resolution identity MAC CE and the second contention resolution identity MAC CE may be included in the message 4 2*e*-10 of FIG. 2E and the message 4 2*f*-10 of FIG. 2F, and may be transmitted, so that the terminal may perform contention resolution. The above-described contention resolution identity MAC CEs may have predetermined fixed sizes, for example, a size of 6 bytes and a size of 8 bytes, respectively. The first contention resolution identity MAC CE may be defined to be fit for the minimum transport block size (e.g., 56 bits) of the message 3, that is, the RRCRequest message, and may have a predetermined fixed size (e.g., 48 bits excluding a 8-bit MAC subheader). In addition, the second contention resolution identity MAC CE may be defined to be a size (e.g., 72 bits) greater than the minimum transport block size of the message 3 and fit for the RRCResumeRequest message, and may have a predetermined fixed size (e.g., 64 bits excluding a 8-bit MAC subheader). The first contention resolution identity MAC CE and the second contention resolution identity MAC CE may be identified by a logical channel identifier of a MAC subheader, and each may be configured as a single field having a predetermined size (e.g., 6 bytes and 8 bytes).

The single field having a predetermined size may be defined as a UE contention resolution identity, and may include a data part (UL CCCH SDU) of an uplink common channel of the message 3 that the terminal transmits.

As illustrated in FIG. 2E, when the terminal transmits a random value having a predetermined size or a part (e.g., 40 bits) of an NR terminal identifier using an RRCConnectionRequest (or RRCRequest) message via the message 3, the base station may configure the first UE contention resolution identity MAC CE proposed in the third embodiment of the disclosure, may include the same in the message 4, and may transmit the same to the terminal. When the base station configures the UE contention resolution identity MAC CE, the UE contention resolution identity may be configured to include the UL CCCH SDU of the message 3 as it is, which has the same size. When the terminal receives the UE contention resolution identity MAC CE via the message 4, the terminal compares the UE contention resolution identity with the UL CCCH SDU transmitted via the message 3. When they are identical to each other, the terminal determines that contention is solved, and proceeds with a connection setup procedure. That is, the terminal may configure and transmit a message 5 (RRC connection setup complete or RRCSetupComplete). When the terminal receives the contention resolution identity MAC CE via the message 4, and the result of comparison between the UE contention resolution identity and the UL CCCH SDU transmitted via the message 3 are not identical to each other, the terminal determines that the contention is not solved. That is, the terminal determines that the terminal is not selected by the base station, and resumes a random access procedure within a predetermined period of time, or reselects another cell.

As illustrated in FIG. 2F, when the terminal transmits an inactive terminal identifier (e.g., 41-bit I-RNIT or 52-bit I-RNTI) having a predetermined size using an RRCResumeRequest message via the message 3, the base station may configure the second UE contention resolution identity MAC CE proposed in the third embodiment of the disclosure, may include the same in the message 4, and may transmit the same to the terminal. When the base station configures the UE contention resolution identity MAC CE, the UE contention resolution identity may be configured to include the UL CCCH SDU of the message 3 as it is, which has the same size. When the terminal receives the UE contention resolution identity MAC CE via the message 4, the terminal compares the UE contention resolution identity with the UL CCCH SDU transmitted via the message 3. When they are identical to each other, the terminal determines that contention is solved, and proceeds with a connection setup procedure. That is, the terminal may configure and transmit a message 5 (RRC connection setup complete or RRCSetupComplete). When the terminal receives the contention resolution identity MAC CE via the message 4, and the result of comparison between the UE contention resolution identity and the UL CCCH SDU transmitted via the message 3 are not identical to each other, the terminal determines that the contention is not solved. That is, the terminal determines that the terminal is not selected by the base station, and resumes a random access procedure within a predetermined period of time, or reselects another cell.

Figure 2J:
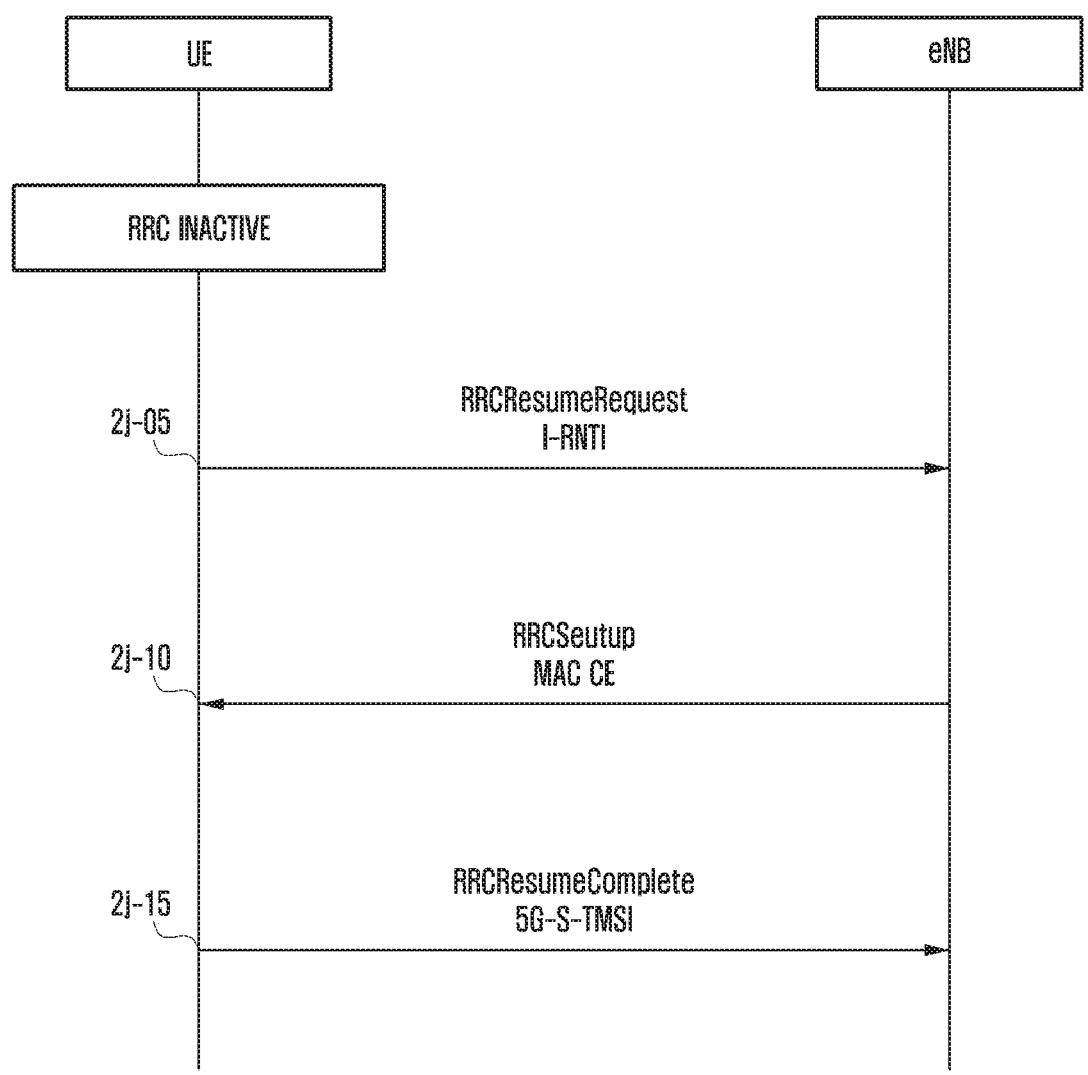
FIG. 2J is a signal diagram illustrating a method in which an RRC inactive terminal performs connection, according to various embodiments of the disclosure.

FIG. 2J is a signal diagram illustrating a method in which an RRC inactive terminal, which has been setting up connection to a next generation communication system network, falls back to an RRC idle mode and performs connection, according to various embodiments of the disclosure.

Referring to FIG. 2J, the next generation mobile communication system may introduce an identifier having a large space as a unique identifier (5G-GUTI) to be allocated to a terminal, in order to identify and manage a larger number of wireless communication devices, and to support connection to a network. For example, the same may be used as an identifier when a NAS area or a core network identifies a terminal In addition, the next generation mobile communication base station may introduce an identifier having a large space as an inactive terminal identifier (e.g., I-RNTI) to be allocated to a terminal, in order to identify and manage a larger number of wireless communication devices, and to support connection to a network. Therefore, to include the inactive terminal identifier which has a large size, the size of a message of RRCResumeRequest transmitted as a message 3 may be defined to have a large size (e.g., 72 bits or 80 bits). For example, the same may be used as an identifier when an access stratum (AS) area or base stations identify a terminal.

Referring to FIG. 2J, when an RRC inactive mode terminal (RRC INACTIVE) receives a paging message, needs to update a tracking area, or needs to transmit data in an uplink, the terminal may attempt connection to a network again. The terminal starts discovering a cell first, may perform cell selection/reselection to discover a suitable cell, and may camp on the suitable cell. The terminal is synchronized with the cell that the terminal camps on, and performs a random access procedure. In the random access procedure, when the terminal transmits a message 3 (e.g., 72 or 80 bits) to a CCCH, the terminal includes an identifier in the message 3, so that a base station is capable of solving contention (contention resolution) among terminals. In this instance, if the terminal has accessed the network and has been assigned with an inactive terminal identifier (e.g., I-RNTI) from the base station when changing to the RRC inactive mode, the terminal may include the inactive terminal identifier (e.g., I-RNTI) in an RRCResumeRequest message and may transmit the same so that base stations identify the terminal in operation 2j-05.

In the case in which the terminal transmits an RRCResumeRequest message including the inactive terminal identifier so as to resume a procedure of connecting to the network, when the base station fails to recognize the inactive terminal identifier (e.g., I-RNTI) or fails to retrieve terminal context, the base station transmits an RRC Connection Setup message (or RRCSetup message) in operation 2j-10, as opposed to an RRCResume message, so as to fall back the terminal to an RRC idle mode terminal, and to direct the terminal to perform connection setup like an RRC idle mode terminal. Then, the terminal may contain a unique identifier (e.g., 5G-GUTI), which has been allocated from the NR system of the network and has been stored by the terminal, in a NAS container (dedicatedInfoNAS) of the message 5, and may transmit the same, so that the network identifies the identifier and identifies the terminal in operation 2j-15. In addition, the terminal may contain the unique identifier (e.g., 5G-GUTI) or a part (e.g., lower 48 bits, 5G-S-TMSI (NR terminal identifier)) of the unique identifier in an AS message, as opposed to in the NAS container of the message 5, and transmit the same, so that the base station identifies the NR terminal identifier, identifies the terminal, and performs routing. The unique identifier is an identifier identified by the 5G CN, and the NR terminal identifier is an identifier identified by a base station.

Figure 2K:
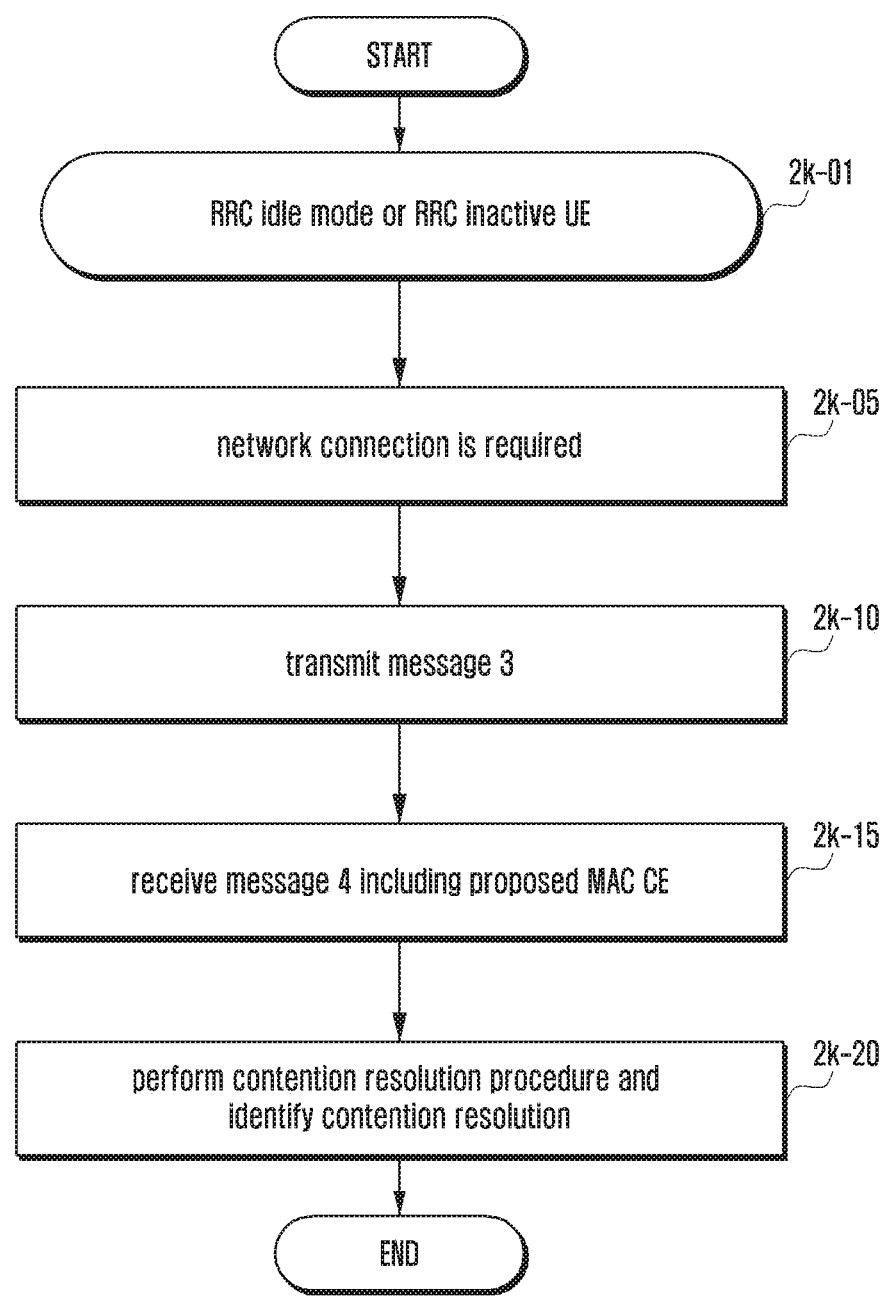
FIG. 2K is a signal diagram illustrating operations of a terminal according to various embodiments of the disclosure.

FIG. 2K is a signal diagram illustrating operations of a terminal according to various embodiments of the disclosure.

Referring to FIG. 2K, when an RRC idle mode or RRC inactive mode terminal 2k-01 receives a paging message, needs to update a tracking area, or needs to transmit data in an uplink, the terminal may attempt connection to a network again in operation 2k-05. The terminal starts discovering a cell first, may perform cell selection/reselection to discover a suitable cell, and may camp on the suitable cell. The terminal is synchronized with the cell that the terminal camps on, and performs a random access procedure. In the random access procedure, when the terminal transmits a message 3 to a CCCH, the terminal includes an identifier in the message 3, so that a base station is capable of solving contention (contention resolution) among terminals in operation 2k-10. Using the transmitted identifier, the base station may configure a terminal contention resolution identity MAC CE according to an embodiment of the disclosure, and may transmit the same to the terminal via a message 4. The terminal may receive the same, in operation 2k-15. The terminal identifies whether the contention is solved based on the terminal contention resolution identity MAC CE, according to the above-described method, in operation 2k-20.

Figure 2L:
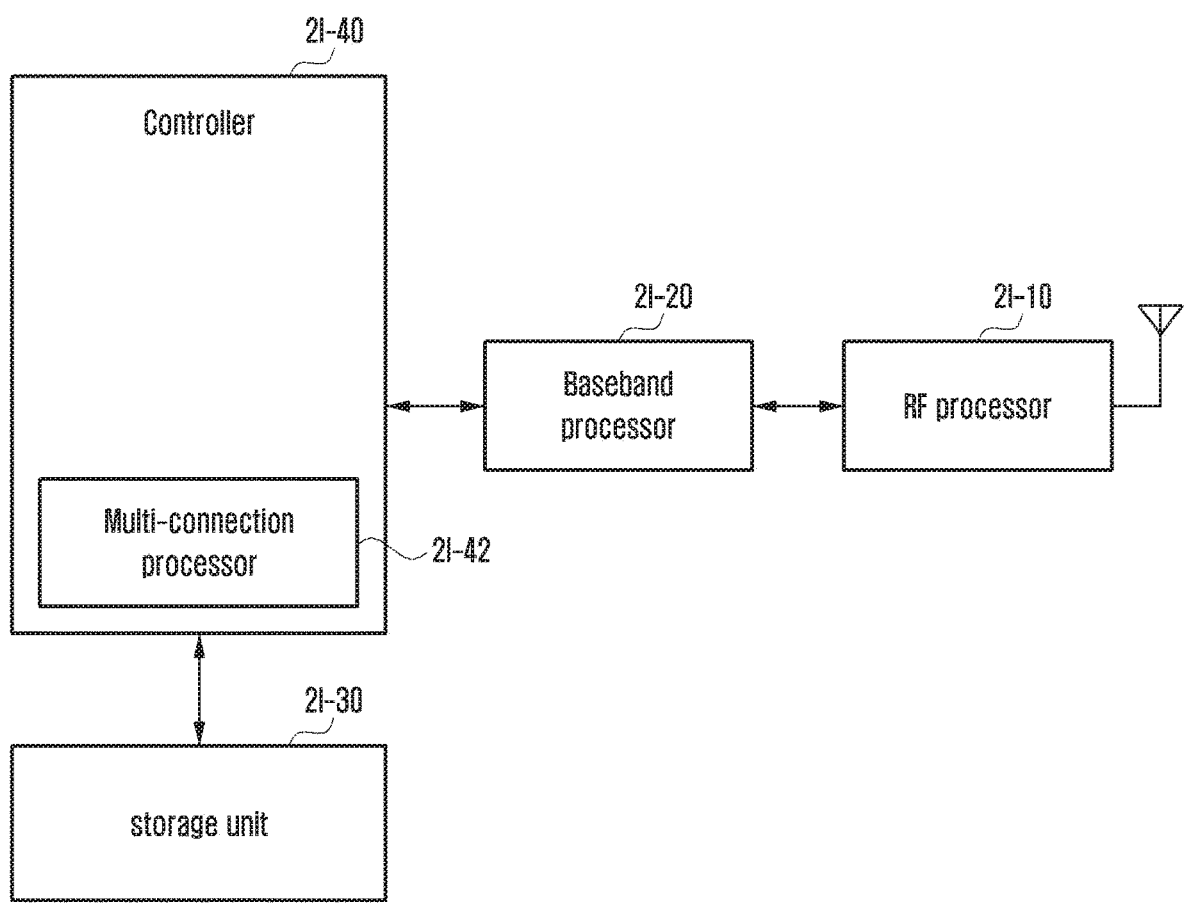
FIG. 2L is a signal diagram illustrating a structure of a terminal according to various embodiments of the disclosure.

FIG. 2L is a signal diagram illustrating a structure of a terminal to according to various embodiments of the disclosure.

Referring to FIG. 2L, the terminal may include a RF processor 2l-10, a baseband processor 2l-20, a storage unit 2l-30, and a controller 2l-40.

The RF processor 2l-10 performs a function for transmitting or receiving a signal via a wireless channel, such as band conversion and amplification of a signal. For example, the RF processor 2l-10 up-converts a baseband signal provided from the baseband processor 2l-20 into an RF band signal, transmits the RF band signal via an antenna, and down-converts the RF band signal received via the antenna into a baseband signal. For example, the RF processor 2l-10 may include a transmission filter, a reception filter, an amplifier, a mixer, an oscillator, a DAC, an ADC, and the like. Although only a single antenna is illustrated in the drawing, the terminal may include a plurality of antennas. In addition, the RF processor 2*l*-10 may include a plurality of RF chains. Moreover, the RF processor 2*l*-10 may perform beamforming. For the beamforming, the RF processor 2*l*-10 may control a phase and a size of each signal transmitted or received via a plurality of antennas or antenna elements. In addition, the RF processor may perform MIMO, and may receive a plurality of layers while performing the MIMO operation. The RF processor 2*l*-10 may appropriately configure a plurality of antennas or antenna elements according to the control of the controller, so as to perform reception beam sweeping, or may control the orientation of a reception beam and a beam width such that a reception beam accords with a transmission beam.

The baseband processor 2*l*-20 performs a function of conversion between a baseband signal and a bitstream according to the physical layer standard of a system. For example, in the case of data transmission, the baseband processor 2*l*-20 generates complex symbols by encoding and modulating a transmission bitstream. Further, in the case of data reception, the baseband processor 2*l*-20 reconstructs a reception bitstream by demodulating and decoding a baseband signal provided from the RF processor 2*l*-10. For example, according to an OFDM (orthogonal frequency division multiplexing) scheme, in the data transmission, the baseband processor 2*l*-20 generates complex symbols by encoding and modulating a transmission bitstream, mapping the complex symbols to subcarriers, and then configures OFDM symbols via an IFFT operation and CP insertion. Further, in the case of data reception, the baseband processor 2*l*-20 divides the baseband signal provided from the RF processor 2*l*-10 in the unit of OFDM symbols, reconstructs signals mapped to the subcarriers via a fast FFT operation, and then reconstructs a reception bitstream via demodulation and decoding.

The baseband processor 2*l*-20 and the RF processor 2*l*-10 transmit and receive a signal, as described above. Accordingly, the baseband processor 2*l*-20 and the RF processor 2*l*-10 may be referred to as a transmitter, a receiver, a transceiver, or a communication unit. In addition, at least one of the baseband processor 2*l*-20 and the RF processor 2*l*-10 may include a plurality of communication modules so as to support many different radio access technologies. In addition, at least one of the baseband processor 2*l*-20 and the RF processor 2*l*-10 may include different communication modules to process signals of different frequency bands. For example, the different radio access technologies may include an LTE network, an NR network, and the like. Further, the different frequency bands may include a super high frequency (SHF) (e.g., 2.2 GHz and 5 GHz) band and a millimeter (mm) wave (e.g., 60 GHz) band.

The storage unit 2*l*-30 stores data, such as a basic program, an application program, and configuration information for the operation of the terminal. The storage unit 2*l*-30 may provide stored data in response to a request from the controller 2*l*-40.

The controller 2*l*-40 may include a multi-connection processor 2*l*-42 and controls the overall operation of the terminal. For example, the controller 2*l*-40 transmits or receives a signal via the baseband processor 2*l*-20 and the RF processor 2*l*-10. In addition, the controller 2*l*-40 writes and reads data to/from the storage unit 2*l*-40. To this end, the controller 2*l*-40 may include at least one processor. For example, the controller 2*l*-40 may include a (communication processor) that performs control for communication, and an AP (application processor) that controls a higher layer, such as an application program. The controller 2*l*-50 and the transceiver 2*l*-10 and 2*l*-20 may not need to be configured as separate modules, and may be configured as a single component, such as a single chip. The controller 2*l*-50 and the transceiver 2*l*-10 and 2*l*-20 may be electrically connected. For example, the controller 2*l*-50 may be a circuit, an application-specific circuit, or at least one processor. In addition, the operations of the terminal may be implemented by including a memory device storing corresponding program codes in a component of the terminal.

Figure 2M:
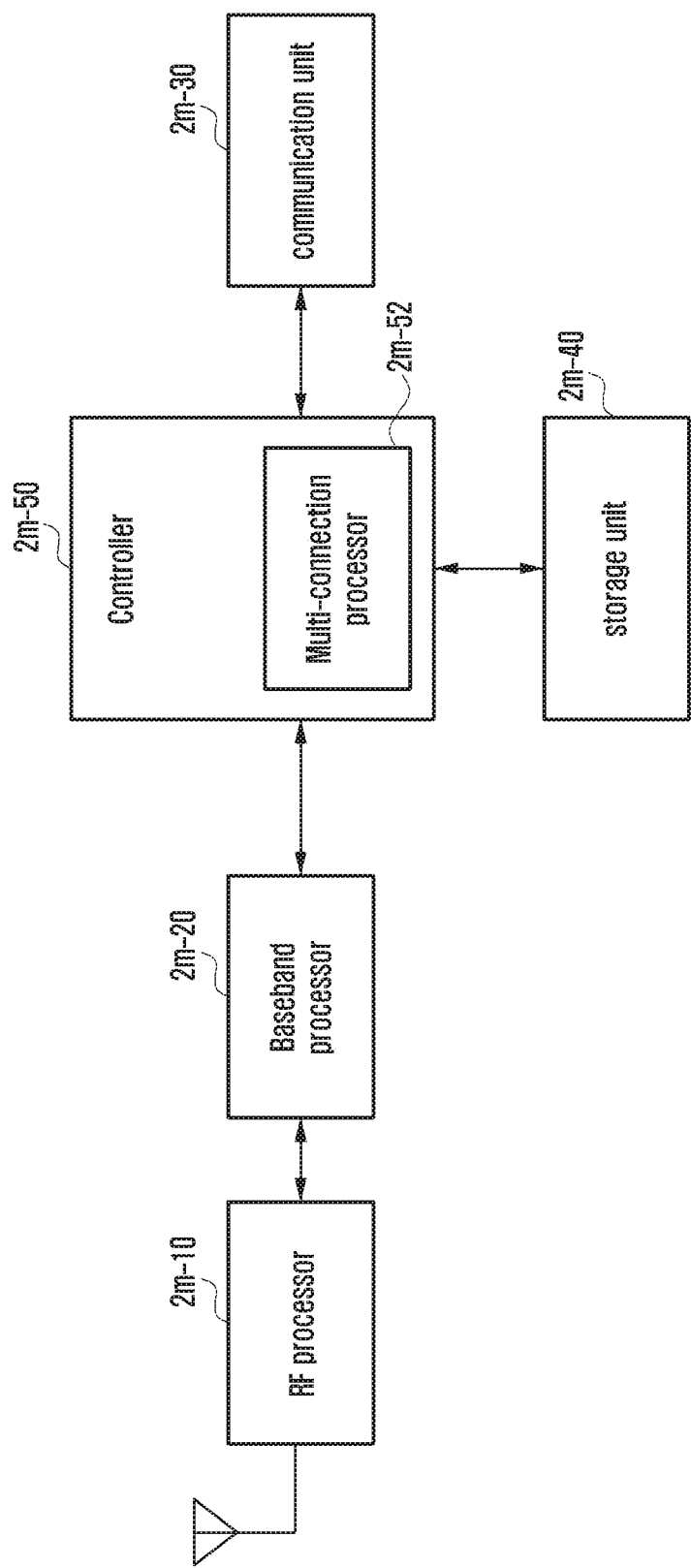
FIG. 2M is a block diagram illustrating a base station in a wireless communication system according to various embodiments of the disclosure.

FIG. 2M is a block diagram illustrating a base station in a wireless communication system according to various embodiments of the disclosure.

Referring to FIG. 2M, a base station may include an RF processor 2*m*-10, a baseband processor 2*m*-20, a backhaul communication unit 2*m*-30, a storage unit 2*m*-40, and a controller 2*m*-50.

The RF processor 2*m*-10 performs a function for transmitting or receiving a signal via a wireless channel, such as band conversion and amplification of a signal. For example, the RF processor 2*m*-10 up-converts a baseband signal provided from the baseband processor 2*m*-20 into an RF band signal and then transmits the converted signal via an antenna, and down-converts an RF band signal received via the antenna into a baseband signal. For example, the RF processor 2*m*-10 may include a transmission filter, a reception filter, an amplifier, a mixer, an oscillator, a DAC, and an ADC. Although only a single antenna is illustrated in the drawing, a first access node may include a plurality of antennas. In addition, the RF processor 2*m*-10 may include a plurality of RF chains. Moreover, the RF processor 2*m*-10 may perform beamforming. For the beamforming, the RF processor 2*m*-10 may control a phase and a size of each of the signals transmitted or received via a plurality of antennas or antenna elements. The RF processor may perform downlink MIMO operation by transmitting one or more layers.

The baseband processor 2*m*-20 performs a function of conversion between a baseband signal and a bit stream according to the physical layer standard of a first radio access technology. For example, in the case of data transmission, the baseband processor 2*m*-20 generates complex symbols by encoding and modulating a transmission bitstream. Further, in the case of data reception, the baseband processor 2*m*-20 reconstructs a reception bitstream by demodulating and decoding a baseband signal provided from the RF processor 2*m*-10. For example, according to an OFDM scheme, in the case of data transmission, the baseband processor 2*m*-20 may generate complex symbols by encoding and modulating the transmission bitstream, map the complex symbols to subcarriers, and then configure OFDM symbols via an IFFT operation and CP insertion. In addition, in the case of data reception, the baseband processor 2*m*-20 divides a baseband signal provided from the RF processor 2*m*-10 in units of OFDM symbols, restores signals mapped to sub-carriers via an FFT operation, and then restores a reception bit string via demodulation and decoding. The baseband processor 2*m*-20 and the RF processor 2*m*-10 transmit or receive a signal, as described above. Accordingly, the baseband processor 2*m*-20 and the RF processor 2*m*-10 may be referred to as a transmitter, a receiver, a transceiver, a communication unit, or a wireless communication unit.

The communication unit 2*m*-30 provides an interface for performing communication with other nodes in a network.

The storage unit 2m-40 may store data, such as, a basic program, an application program, configuration information, or the like, used for operating the main base station. Particularly, the storage unit 2m-40 may store information associated with a bearer allocated to a connected terminal, a measurement result reported from a connected terminal, and the like. In addition, the storage unit 2m-40 may store information which is a criterion to determine whether to provide or interrupt multiple-access to a terminal. The storage unit 2m-40 may provide stored data in response to a request from the controller 2m-50.

The controller 2m-50 may include a multi-connection processor 2m-52 and may control the overall operation of the main base station. For example, the controller 2m-50 transmits and receives a signal via the baseband processor 2m-20 and the RF processor 2m-10, or via the backhaul communication unit 2m-30. In addition, the controller 2m-50 writes and reads data to/from the storage unit 2m-40. To this end, the controller 2m-50 may include at least one processor. The controller 2m-50 and the transceiver 2m-10 and 2m-20 may not need to be configured as separate modules, and may be configured as a single component, such as a single chip. The controller 2m-50 and the transceiver 2m-10 and 2m-20 may be electrically connected. For example, the controller 2m-50 may be a circuit, an application-specific circuit, or at least one processor. In addition, the operations of the base station may be implemented by including a memory device storing corresponding program codes in a component of the base station.

While the disclosure has been shown and described with reference to various embodiments thereof, it will be understood by those skilled in the art that various changes in form and details may be made therein without departing from the spirt and scope of the disclosure as defined by the appended claims and their equivalents.

What is claimed is:

1. A terminal in a wireless communication system, the terminal comprising:
a transceiver; and
a controller configured to:
receive, from a base station via the transceiver, system information indicating whether a cell of the base station is connected to an evolved packet core (EPC) or connected to a 5th generation (5G) core (5GC),
identify whether to connect to the EPC or the 5GC based on the system information,
in case of connecting to the 5GC based on a result of the identification,
transmit, to the base station via the transceiver, a first message for requesting radio resource control (RRC) connection establishment, wherein the first message includes a first part of a first identifier of the terminal, and the first identifier of the terminal has been assigned to the terminal from the 5GC,
receive, from the base station via the transceiver, a second message for the RRC connection establishment as a response to the first message, and
transmit, to the base station via the transceiver, a third message for confirming the RRC connection establishment as a response to the second message, wherein the third message includes a second part of the first identifier of the terminal, and wherein the first identifier consists of the first part of the first identifier and the second part of the first identifier, and in case of connecting to the EPC based on the result of the identification,
transmit, to the base station via the transceiver, a fourth message for requesting the RRC connection establishment, wherein the fourth message includes a third identifier of the terminal, and the third identifier of the terminal has been assigned to the terminal from the EPC,
receive, from the base station via the transceiver, a fifth message for the RRC connection establishment as a response to the fourth message, and
transmit, to the base station via the transceiver, a sixth message for confirming the RRC connection establishment as a response to the fifth message, wherein the sixth message for confirming the RRC connection establishment is different from the third message for confirming the RRC connection establishment.

2. The terminal of claim 1,
wherein the first part of the first identifier of the terminal is a first number of predetermined rightmost bits of the first identifier of the terminal, and
wherein the second part of the first identifier of the terminal is a second number of predetermined leftmost bits of the first identifier of the terminal.

3. The terminal of claim 1,
wherein the first identifier of the terminal is included in a second identifier assigned to the terminal,
wherein the second identifier is a 5G globally unique temporary identifier (5G-GUTI) and the first identifier of the terminal is a 5G S-temporary mobile subscription identifier (5G-S-TMSI), and
wherein the 5G-GUTI has been assigned upon a successful registration of the terminal.

4. The terminal of claim 1, wherein the first message is transmitted on a common control channel (CCCH).

5. The terminal of claim 1, wherein the first message includes a random value in case of connecting to the 5GC and the first identifier of the terminal is not provided.

6. A base station in a wireless communication system, the base station comprising:
a transceiver; and
a controller configured to: transmit system information indicating whether a cell
is connected to an evolved packet core (EPC) or connected to a 5th generation (5G) core (5GC),
in case that a terminal is in an idle state:
in case that the terminal is connecting to the 5GC,
receive, from the terminal via the transceiver, in case a first identifier of the terminal has been assigned to the terminal from the 5GC, a first message for requesting radio resource control (RRC) connection establishment, wherein the first message includes a first part of the first identifier of the terminal,
transmit, to the terminal via the transceiver, a second message for the RRC connection establishment as a response to the first message, and
receive, from the terminal via the transceiver, a third message for confirming the RRC connection establishment as a response to the second message, wherein the third message includes a second part of the first identifier of the terminal, wherein the first identifier consists of the first part of the first identifier and the second part of the first identifier, and
in case that the terminal is connecting to the EPC,
receive, from the terminal via the transceiver, in case a third identifier of the terminal has been assigned to the terminal from the EPC, a fourth message for requesting the RRC connection establishment, wherein the fourth message includes the third identifier of the terminal, transmit, to the terminal via the transceiver, a fifth message for the RRC connection establishment as a response to the fourth message, and receive, from the terminal via the transceiver, a sixth message for confirming the RRC connection establishment as a response to the fifth message, wherein the sixth message for confirming the RRC connection establishment is different from the third message for confirming the RRC connection establishment, in case that the terminal is in an inactive state:

receive, from the terminal via the transceiver, a seventh message for requesting a resumption of a suspended RRC connection, the seventh message including an inactive state radio network temporary identifier (I-RNTI) or a part of the I-RNTI, transmit, to the terminal via the transceiver, one of an eighth message for performing an RRC setup procedure or a ninth message to resume the suspended RRC connection, as a response to the seventh message, receive, from the terminal via the transceiver, a tenth message for confirming an RRC connection establishment, the tenth message including the first identifier, in case that the eighth message is the one of the eighth message or the ninth message transmitted to the terminal as a response to the seventh message, and receive, from the terminal via the transceiver, an eleventh message for confirming an RRC connection resumption, in case that the ninth message is the one of the eighth message or the ninth message transmitted to the terminal as a response to the seventh message.

7. The base station of claim 6,
wherein the first part of the first identifier of the terminal is a first number of predetermined rightmost bits of the first identifier of the terminal, and
wherein the second part of the first identifier of the terminal is a second number of predetermined leftmost bits of the first identifier of the terminal.

8. The base station of claim 6,
wherein the first identifier of the terminal is included in a second identifier assigned to the terminal,
wherein the second identifier is a 5G globally unique temporary identifier (5G-GUTI) and the first identifier of the terminal is a 5G S-temporary mobile subscription identifier (5G-S-TMSI), and
wherein the 5G-GUTI has been assigned upon a successful registration of the terminal.

9. The base station of claim 6, wherein the first message is received on a common control channel (CCCH).

10. The base station of claim 6, wherein the first message includes a random value in case that the terminal is connecting to the 5GC and the first identifier of the terminal is not provided to the terminal.

11. The terminal of claim 1, wherein the third identifier of the terminal is a S-temporary mobile subscription identifier (S-TMSI).

12. The base station of claim 6, wherein the third identifier of the terminal is a S-temporary mobile subscription identifier (S-TMSI).

13. The base station of claim 6, wherein the seventh message indicates whether the seventh message includes the I-RNTI or the part of the I-RNTI.

* * * * *